(12) United States Patent
Matsumoto et al.

(10) Patent No.: US 9,454,002 B2
(45) Date of Patent: Sep. 27, 2016

(54) WAVELENGTH SELECTION SWITCH

(75) Inventors: Koji Matsumoto, Tokyo (JP); Satoshi Watanabe, Tokyo (JP)

(73) Assignee: Lumentum Operations LLC, Milpitas, CA (US)

( * ) Notice: Subject to any disclaimer, the term of this patent is extended or adjusted under 35 U.S.C. 154(b) by 99 days.

(21) Appl. No.: 14/365,052

(22) PCT Filed: Mar. 2, 2012

(86) PCT No.: PCT/JP2012/001472
§ 371 (c)(1),
(2), (4) Date: Dec. 15, 2014

(87) PCT Pub. No.: WO2013/088586
PCT Pub. Date: Jun. 20, 2013

(65) Prior Publication Data
US 2015/0241690 A1    Aug. 27, 2015

(30) Foreign Application Priority Data

Dec. 13, 2011 (JP) .................................. 2011-271822
Dec. 13, 2011 (JP) .................................. 2011-272189
Jan. 12, 2012 (JP) .................................. 2012-004432

(51) Int. Cl.
G02B 6/34 (2006.01)
G02B 26/08 (2006.01)
G02B 6/35 (2006.01)

(52) U.S. Cl.
CPC ......... *G02B 26/0816* (2013.01); *G02B 6/3518* (2013.01); *G02B 6/3534* (2013.01)

(58) Field of Classification Search
None
See application file for complete search history.

(56) References Cited

U.S. PATENT DOCUMENTS

| | | | |
|---|---|---|---|
| 7,233,716 B2 | 6/2007 | Akashi | ............................ 385/18 |
| 7,302,133 B2 | 11/2007 | Akashi | ............................ 385/18 |
| 7,630,599 B2 | 12/2009 | McLaughlin et al. | |
| 2006/0239608 A1 | 10/2006 | Akashi | ............................ 385/18 |
| 2007/0211988 A1 | 9/2007 | Akashi | ............................ 385/18 |

(Continued)

FOREIGN PATENT DOCUMENTS

| | | | |
|---|---|---|---|
| EP | 2299309 | 3/2011 | ............. G02B 26/08 |
| JP | 2006276216 | 10/2006 | ............. G02B 26/08 |

(Continued)

OTHER PUBLICATIONS

PCT/JP2012/001472 Search Report dated Mar. 22, 2012.

*Primary Examiner* — Hemang Sanghavi
(74) *Attorney, Agent, or Firm* — Harrity & Harrity, LLP

(57) ABSTRACT

A wavelength selection switch (1) equipped with: an input/output unit (10) having multiple input/output ports that input/output signal light; a light-collecting mirror (14) arranged in the light path of the signal light from the input/output unit; a dispersion element (13) having a dispersion part and a non-dispersion part that does not have a dispersion effect; and multiple deflection elements (16) arranged in the direction in which the signal light is dispersed. The light-collecting mirror (14) causes the signal light from the input/output unit (10) to enter the dispersion part of the dispersion element (13), and the light that is dispersed by the dispersion element (13) is collected in the deflection elements (16) through the non-dispersion part of the dispersion element (13). Furthermore, the deflection elements (16) deflect the collected light such that the light is emitted from a prescribed input/output port of the multiple input/output ports.

27 Claims, 43 Drawing Sheets

(56) References Cited

U.S. PATENT DOCUMENTS

| | | | |
|---|---|---|---|
| 2009/0154876 A1* | 6/2009 | McLaughlin | G02B 6/29398 385/36 |
| 2009/0304328 A1* | 12/2009 | Presley | G02B 6/29311 385/16 |
| 2011/0103739 A1 | 5/2011 | Nishizawa et al. | 385/18 |
| 2015/0208143 A1* | 7/2015 | Frisken | G02B 6/3512 398/48 |

FOREIGN PATENT DOCUMENTS

| | | | |
|---|---|---|---|
| JP | 4445373 B2 | 4/2010 | |
| JP | 4842915 B2 | 12/2011 | |
| JP | 5726407 B2 | 6/2015 | |
| WO | 2010/001734 | 7/2010 | G02B 26/08 |

* cited by examiner

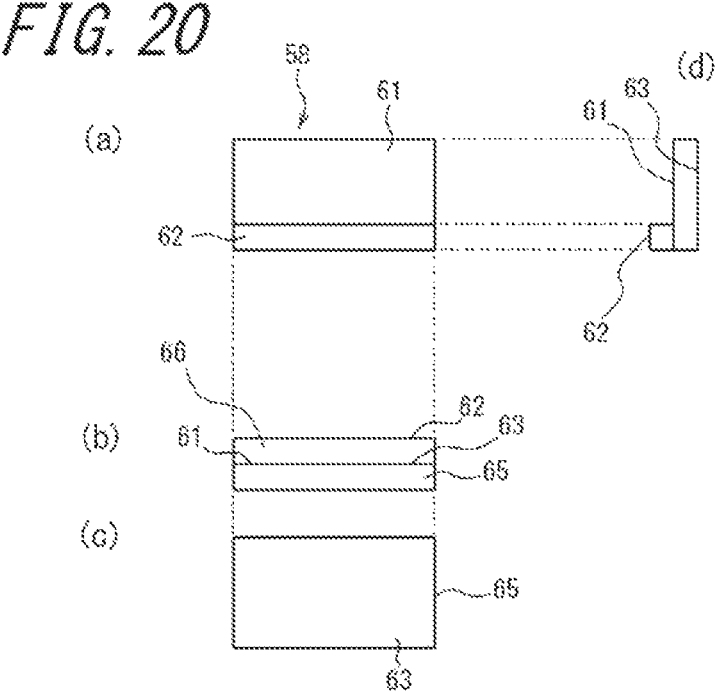
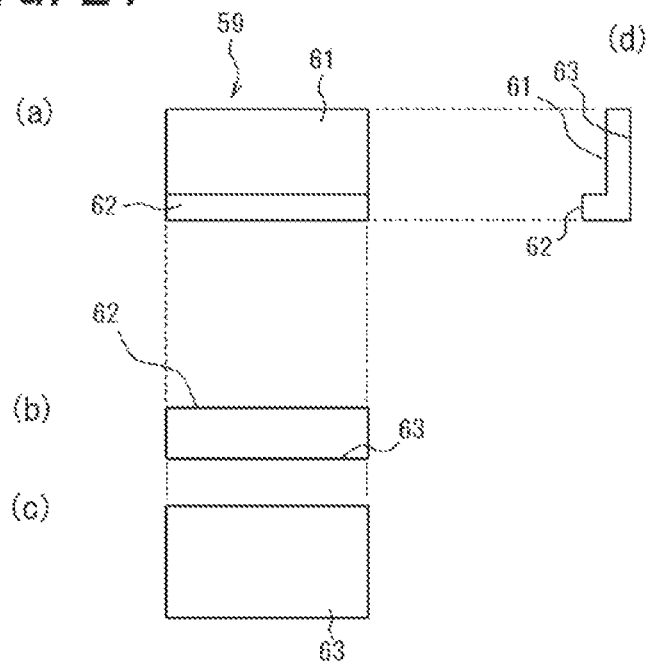

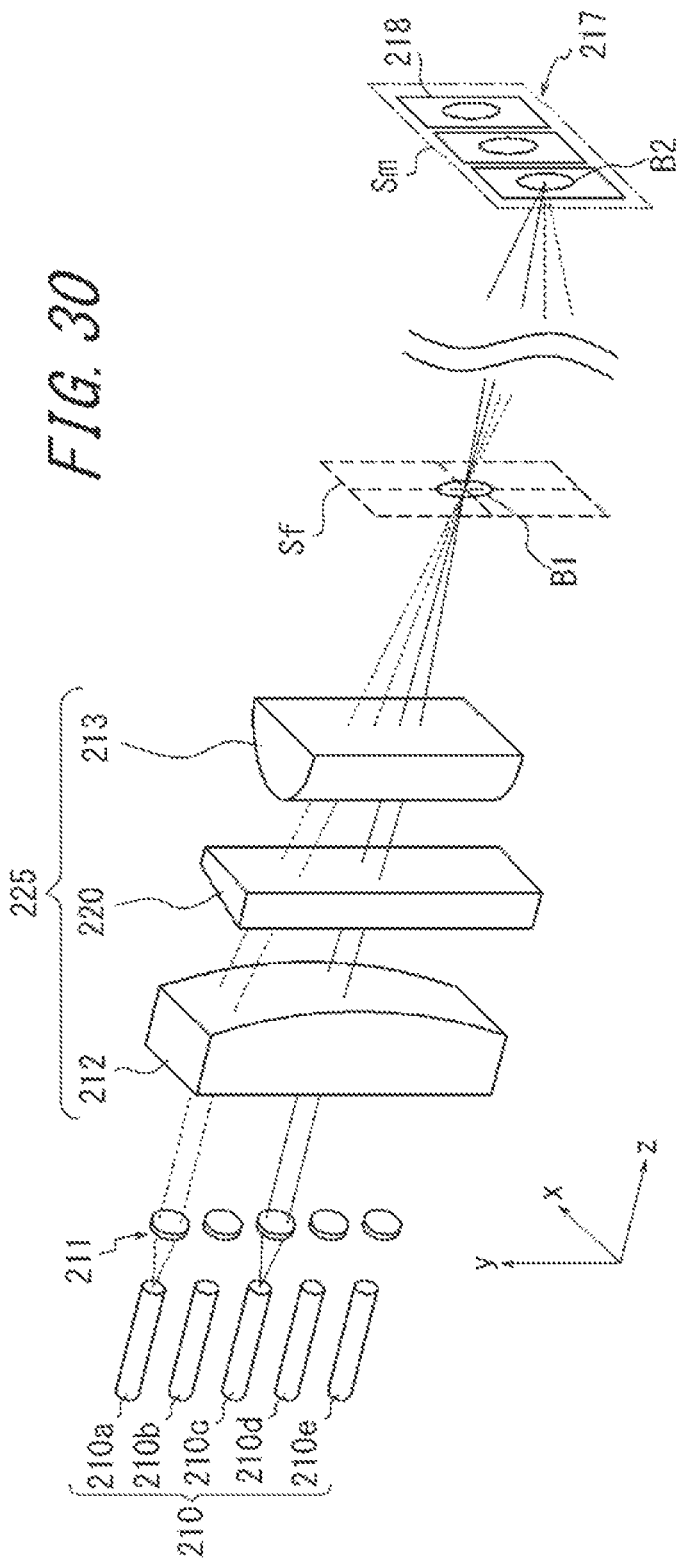

WAVELENGTH SELECTION SWITCH

CROSS-REFERENCE TO RELATED APPLICATIONS

This application is the national stage entry of International Appl. No. PCT/JP2012/001472, filed Mar. 2, 2012, which claims priority to Japanese Patent Application No. 2011-272189 filed on Dec. 13, 2011, Japanese Patent Application No. 2011-271822 filed on Dec. 13, 2011, and Japanese Patent Application No. 2012-004432 filed on Jan. 12, 2012, and the entire disclosure of those applications is incorporated herein by reference for all purposes.

TECHNICAL FIELD

The present invention relates to a wavelength selection switch.

BACKGROUND ART

Conventionally, as a wavelength selection switch used in optical wavelength multiplex communication, for instance, as described in Patent Document 1 and Patent Document 2, a device including input/output ports configured by at least one input port and at least one output port, a dispersion element, a light collecting element and a deflector is known.

For instance, a wavelength selection switch described in Patent Document 1 is configured as illustrated in a top view in FIG. 44. The wavelength selection switch includes a plurality of input/output ports 1110, a microlens array 1111, a light collecting lens 1112, a dispersion element 1113, a light collecting element (light collecting mirror) 1114, a deflection prism 1115, and a deflector 1116. FIG. 45 is a side view developing and illustrating the wavelength selection switch along an optical path. In FIG. 45, the dispersion element 1113, which is actually a reflection type, is illustrated by a form of a transmission-type dispersion element, and the light collecting element 1114 of the reflection type is illustrated by a form of a lens. A signal luminous flux made incident from one of the input/output ports 1110 is collected at a primary light collecting point P through the light collecting lens 1112, then advances while diverging, is turned into a parallel luminous flux by the light collecting element 1114, and is dispersed in an x direction (in FIG. 45, a direction vertical to a paper surface) in the dispersion element 1113. The light of a prescribed wavelength of the dispersed signal light is collected to a deflection element 1117 corresponding to the prescribed wavelength of the deflector 1116 by the light collecting element 1114. The deflection element 1117 deflects the incident light of the prescribed wavelength in an array direction (y direction) of the input/output ports 1110. Thus, the light of the prescribed wavelength of the signal light is emitted from a prescribed input/output port 1110 through respective optical elements in an order opposite to the time of incidence.

PRIOR ART DOCUMENT

Patent Document

Patent Document 1: U.S. Pat. No. 7,630,599
Patent Document 2: Japanese Patent No. 4445373

SUMMARY OF THE INVENTION

Problem to be Solved by the Invention

Here, in the wavelength selection switch described in Patent Document 1, the deflection prism 1115 is provided in order to correct light collecting positions of the dispersed light of the respective wavelengths and to make the dispersed signal light be vertically incident on the deflection element 1117 of the deflector 1116 viewed from the y direction. In order to prevent obstruction of the signal light reflected by the light collecting element 1114 and made incident on the dispersion element 1113, and the light of each wavelength dispersed in the dispersion element 1113 and directing toward the light collecting element 1114 by the deflection prism 1115, the deflection prism 1115 needs to be disposed as close as possible to the deflector 1116.

Furthermore, while only a center light beam emitted from the input/output port is illustrated in FIG. 44, when the spread of the luminous flux of the signal light is taken into consideration as illustrated in FIG. 46, position where the deflection prism 1115 can be disposed needs to be brought as close as possible to the deflector 1116.

However, by this arrangement, as illustrated in FIG. 47, there is a concern that multiple reflection occurs between the deflection prism 1115 and the deflection element 1117, and noise light as indicated by a broken line is outputted to the input/output port 1110 for output. When the noise light is outputted to the input/output port 1110 which is the same as the one for normal light having the same wavelength, interference occurs since there is an optical path difference from each other and intensity modulation occurs or an intensity amplitude to the wavelength occurs. In FIG. 45, an example that the normal light indicated by a solid line and the noise light indicated by a broken line are outputted to the same input/output port 1110 is illustrated. Also, when the noise light is emitted to the input/output port 1110 different from the normal light, there is a concern about crosstalk occurrence. Thus, it is desirable that the crosstalk occurrence can be suppressed even in a small-sized configuration with a light collecting mirror disposed in an optical path between the dispersion element and the deflector.

In the meantime, in the wavelength selection switch described in Patent Document 2, a shape of a MEMS mirror array (movable reflector) is formed into different shapes at least on a long-wavelength side and on a short-wavelength side so as to be suited to dispersion characteristics of the dispersion element. Thus, when a plurality of wavelengths having a fixed frequency interval df are inputted as wavelength multiplexed light, the light of each wavelength is made incident on an almost center of the corresponding MEMS mirror. A deviation from the center of the MEMS mirror at this time is called "a center wavelength deviation." When the center wavelength deviation becomes large, reduction of a transmission band or the like occurs, and a performance as the wavelength selection switch is degraded.

The wavelength selection switch inputs light from input ports at different positions of the wavelength selection switch and outputs light from output ports at different positions, respectively. Typically, the input ports and the output ports are arrayed such that end faces thereof are in series, and input or output the light into the wavelength selection switch. Therefore, a distance from an optical axis, in relation to an array direction of the input/output ports, of the light passing through each of the input ports and the output ports is different for each input port and output port. Thus, on a deflection element surface of the deflection element which is a light collecting position, the center wavelength deviation due to the distance from the optical axis for each port is generated. In other words, it is clear that port dependency of the center wavelength deviation becomes evident as the input/output ports are increased.

In Patent Document 2, while it is described that the generation of the center wavelength deviation affects the characteristics of the wavelength selection switch, the port dependency of the center wavelength deviation generated when the input/output ports are increased in number is not described nor suggested. Actually, the configuration is not effective in relation to the port dependency of the center wavelength deviation.

As described above, when the port dependency of the center wavelength deviation is generated on the deflection element surface, a transmission band width is reduced, coupling efficiency declines since the input ports and the output ports deviate from respective optically conjugate points, and thus communication quality is degraded. Furthermore, in order to multiplex modulated optical signals to a higher speed using one optical fiber in the future, a wider transmission bandwidth for the respective wavelengths is needed. Therefore, it is requested to reduce the port dependency of the center wavelength deviation. Thus, it is preferable to correct the port dependency of the center wavelength deviation in a deflection part.

Therefore, the present invention which has been made focusing on these points has an object to provide a wavelength selection switch which solves at least one of the problems described above and improves the communication quality.

Means for Solving the Problem

A wavelength selection switch according to the present invention which achieves the object includes:

an input/output part including a plurality of input/output ports for inputting and outputting wavelength-multiplexed signal light;

a reflection-type light collecting element disposed on an optical path of the signal light from the input/output part;

a dispersion element including a dispersion part for dispersing the signal light into a plurality of light beams having different wavelengths and a non-dispersion part without a dispersion action; and a plurality of deflection elements arrayed in a dispersion direction of the signal light from the dispersion element, in which the light collecting element makes the signal light from the input/output part be incident on the dispersion part of the dispersion element, and collects the plurality of light beams dispersed by the dispersion part to the deflection elements through the non-dispersion part of the dispersion element, respectively, and the deflection elements deflect at least one of the plurality of light beams collected to the deflection elements so as to be emitted from a prescribed input/output port of the plurality of input/output ports.

With such a configuration, since the dispersion element includes the dispersion part for dispersing the signal light into the plurality of light beams having different wavelengths and the non-dispersion part without the dispersion action, the signal light from the input/output part is made incident on the dispersion part of the dispersion element, and the light of each wavelength dispersed by the dispersion part is collected to the deflection element through the non-dispersion part of the dispersion element, a prism for light collecting position correction is not needed, and thus, the wavelength selection switch capable of suppressing the crosstalk occurrence although in a small-sized configuration with a light collecting mirror disposed in the optical path between the dispersion element and the deflector can be provided.

Another wavelength selection switch according to the present invention which achieves the object includes:

an input/output part including a plurality of input/output ports for inputting and outputting wavelength-multiplexed signal light, of which incident/emission surfaces are arrayed in a first direction;

a first reflection-type light collecting element disposed on an optical path of the signal light from the input/output part;

a dispersion element for dispersing the signal light reflected by the first light collecting element into a plurality of light beams having different wavelengths; and a plurality of deflection elements arrayed in a dispersion direction of the signal light by the dispersion element, on a side different from a side where the first light collecting element is disposed with respect to the dispersion element, in which the first light collecting element reflects the plurality of light beams dispersed by the dispersion element and collects the plurality of light beams to the deflection elements, respectively, the deflection elements deflect at least one of the plurality of light beams collected to the deflection elements so as to be emitted from a prescribed input/output port of the plurality of input/output ports, and when a virtual plane which includes light collecting points on the deflection elements to which the plurality of light beams are collected respectively, and is orthogonal to the first direction is defined as a first plane, the dispersion element is disposed only in one of two spaces separated by the first plane.

With such a configuration, when the virtual plane which includes the light collecting points on the deflection elements to which the plurality of light beams are collected respectively, and is orthogonal to the first direction is defined as the first plane, since the dispersion element is disposed only in one of the two spaces separated by the first plane, the prism for light collecting position correction is not needed, and thus, the wavelength selection switch capable of suppressing the crosstalk occurrence although in the small-sized configuration with a light collecting mirror disposed in the optical path between the dispersion element and the deflector can be provided.

Yet another wavelength selection switch according to the present invention which achieves the object includes:

at least one input port;

a dispersion part for dispersing wavelength-multiplexed input light inputted from the input port into light of each wavelength;

a light collecting element for collecting the light of each wavelength dispersed by the dispersion part;

a deflection part where a plurality of deflection elements for deflecting the light of each wavelength collected by the light collecting element are arrayed;

at least one output port for outputting the light of each wavelength deflected in the deflection part as output light; and an incident position deviation correction element disposed in an optical path of the input light inputted from the input port, for correcting a deviation of an incident position in an array direction of the deflection elements of the light of each wavelength with respect to the deflection elements which is caused on the basis of arrangement of the input port.

With such a configuration, since the port dependency of the center wavelength deviation on the deflection element surface which is caused on the basis of the arrangement of the input port, is corrected using the incident position deviation correction element, the center wavelength deviation on the deflection element surface is corrected, and the communication quality is improved.

Effect of the Invention

According to the present invention, the wavelength selection switch which improves the communication quality can be provided.

BRIEF DESCRIPTION OF THE DRAWINGS

FIG. 20 is a diagram illustrating a sixth modification of the dispersion element of the wavelength selection switch according to the fifth embodiment.

FIG. 21 is a diagram illustrating a seventh modification of the dispersion element of the wavelength selection switch according to the fifth embodiment.

FIG. 30 is a diagram for describing a function of a beam shaping optical system in the wavelength selection switch of the tenth embodiment.

MODE FOR CARRYING OUT THE INVENTION

Hereinafter, embodiments of the present invention will be described with reference to the diagrams.

First Embodiment

Prior to detailed descriptions of the first embodiment, basic arrangement of optical elements will be described.

Figure 1:
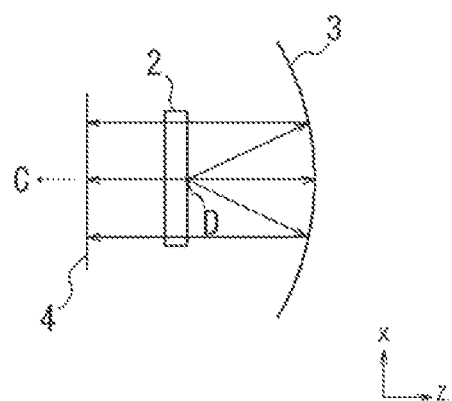
FIG. 1 is a diagram for describing basic arrangement of a dispersion element, a light collecting mirror and a light collecting surface.

FIG. 1 is a diagram for describing the basic arrangement of a dispersion element 2 which disperses signal light into light of each wavelength, a reflection-type light collecting element 3 and a light collecting surface 4 where the light of each wavelength reflected by the light collecting element 2 is collected. The light collecting surface 4 is a surface where deflection elements of a deflector of a wavelength selection switch are disposed. In FIG. 1, reference character x denotes a direction of the light dispersed by the dispersion element 2. A dispersion point D of the dispersion element 2 is disposed roughly at a focal distance from the light collecting element 3, and the wavelength selection switch is configured such that the light of each wavelength dispersed at the dispersion point D includes light advancing so as to be made incident roughly vertically on a reflection surface of the light collecting element 3. In such a configuration, the light reflected by the light collecting element 3 is made incident roughly vertically to an x direction of the light collecting surface 4. The arrangement like FIG. 1 is possible if a reflection surface of a spherical mirror is positioned on an extension line connecting a center position C of a curvature radius of the spherical mirror and the dispersion point D. Usually, in such an arrangement, the dispersion element 2 obstructs an optical path of the light of each wavelength from the light collecting element 3 to the light collecting surface 4, however, the respective following embodiments have such configurations that the dispersion element 2 includes a dispersion part and a non-dispersion part to be described later, and the light of each wavelength reflected by the light collecting element 3 reaches the deflection elements of the deflector positioned on the light collecting surface 4 through the non-dispersion part without passing through the dispersion part. Details will be described below.

Figure 2:
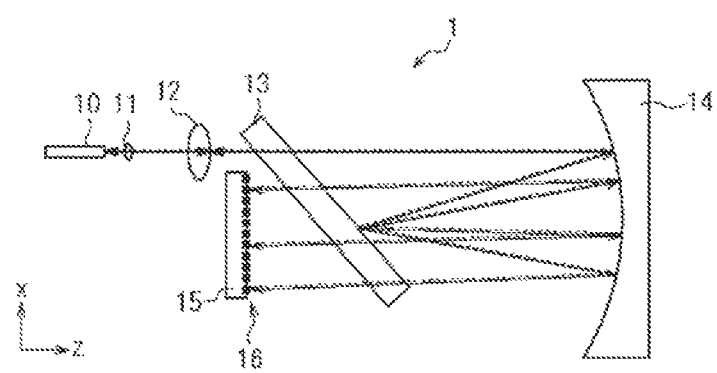
FIG. 2 is a top view illustrating a configuration of a wavelength selection switch according to a first embodiment.
Figure 3:
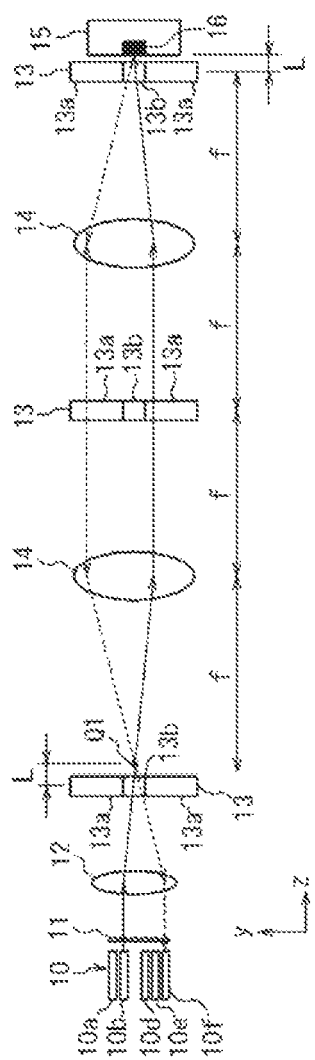
FIG. 3 is a side view developing and illustrating the wavelength selection switch in FIG. 2 along an optical path.
Figure 4:
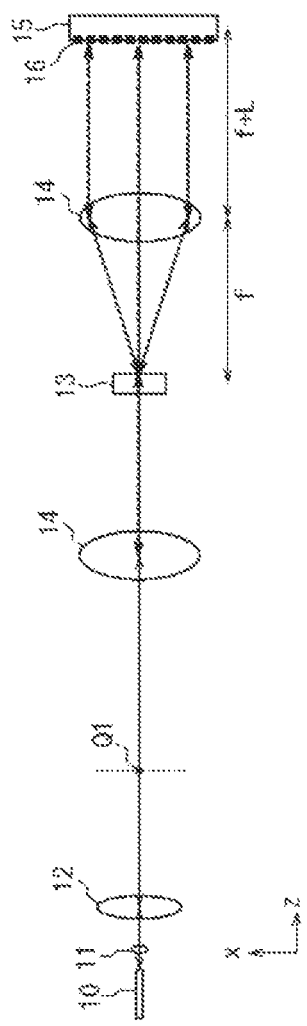
FIG. 4 is a top view developing and illustrating the wavelength selection switch in FIG. 2 along the optical path.
Figure 5:
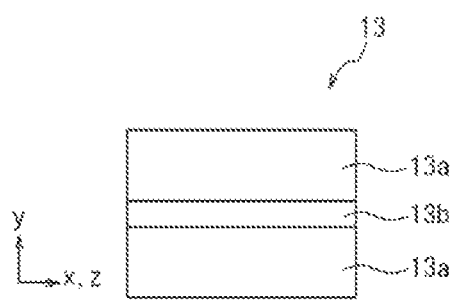
FIG. 5 is a front view of a dispersion element in FIG. 2.

The wavelength selection switch according to the first embodiment will be described with reference to FIGS. 2 to 5. FIG. 2 is a top view illustrating a configuration of the wavelength selection switch according to the first embodiment. Also, FIG. 3 is a side view developing and illustrating a wavelength selection switch 1 in FIG. 1 along an optical path, and FIG. 4 is a top view developing and illustrating the wavelength selection switch 1 in FIG. 2 along the optical path. Furthermore, FIG. 5 is a front view of a dispersion element 13 in FIG. 2. The wavelength selection switch 1 includes an input/output part 10, a microlens array 11, a light collecting lens (second light collecting element) 12, the dispersion element 13, a light collecting mirror (first light collecting element) 14, and a deflector 15.

As illustrated in FIG. 2, the input/output part 10, the microlens array 11, and the light collecting lens 12 are disposed in series along the optical path, and a part of a mirror surface of the light collecting mirror 14 crosses an extension line on the side of the light collecting lens 12. Also, the deflector 15 is disposed facing the light collecting mirror 14 at a position shifted so as not to interfere with the signal light which has passed through the light collecting lens 12 on the light collecting mirror 14 side of the light collecting lens 12. Furthermore, on the light collecting mirror 14 side of the deflector 15, the dispersion element 13 is disposed. A part of the dispersion element 13 overlaps with the optical path of the signal light between the light collecting lens 12 and the light collecting mirror 14. Here, the dispersion element 13 and the light collecting mirror 14 are separated by a focal distance f of the light collecting mirror 14. However, according to accuracy demanded for the wavelength selection switch 1, the dispersion element 13 and the light collecting mirror 14 may be separated longer than or shorter than the focal distance f of the light collecting mirror 14.

As illustrated in FIG. 3, the input/output part 10 includes input/output ports 10a, 10b, and 10d to 10f composed of optical fibers whose end faces are disposed in series in a vertical direction (y direction). As described later, between the input/output ports 10b and 10d, an input/output port 10c which is not to be used is provided, or a space for one port is provided. The input/output ports 10a, 10b, and 10d to 10f serve to input the wavelength-multiplexed signal light from the outside of the wavelength selection switch 1 and output the signal light to the outside. FIG. 3 illustrates an example of using the input/output port 10b as a port for input and emitting the dispersed light of a specific wavelength from the input/output port 10f. In FIG. 3, the signal light which is made incident from the input/output port 10b and reflected by a deflection element 16 is indicated by a solid line, and the light which is reflected by the deflection element 16 and emitted to the input/output port 10f is indicated by a broken line. Which input/output ports 10a, 10b, and 10d- to 10f is to be used for input or for output can be appropriately designed. It is not necessary to use all the input/output ports 10a, 10b, and 10d to 10f as an input port or an output port, and an input/output port which is not functioning as the input port or the output port may be present. One end of each optical fiber is present inside the wavelength selection switch 1, and another end is connected with the outside of the wavelength selection switch 1. The number of the input/output ports may be various numbers, 10 or more, for instance, however, an example of five input/output ports is illustrated for simplicity.

Also, the respective input/output ports 10a, 10b, and 10d to 10f and respective microlenses inside the microlens array 11 are paired. The respective microlenses convert the light inputted from the respective input/output ports 10a, 10b, and 10d to 10f into a parallel luminous flux (collimated light), and couple the parallel luminous flux outputted to the input/output ports 10a, 10b, and 10d-10f to the optical fibers. The respective microlenses are not limited to have a spherical surface and may be an aspherical surface. Also, the light inputted into the wavelength selection switch 1 through the input/output ports 10a, 10b, and 10d to 10f and the microlenses of the microlens array 11 and the light outputted from the wavelength selection switch 1 through the input/output ports 10a, 10b, and 10d to 10f are respectively turned into the luminous fluxes that are parallel to each other.

In the following first to sixth embodiments, an advancing direction of the parallel light which has transmitted through the input/output ports 10a, 10b, and 10d to 10f and the microlens array 11 is defined as an optical axis direction (z direction). The optical axis direction is also an optical axis direction of the light collecting lens 12. Also, an array direction of the end faces of the input/output ports 10a, 10b, and 10d to 10f and the microlens array 11 is defined as a first direction (y direction). The optical axis direction and the first direction are orthogonal to each other. Furthermore, a direction orthogonal to the optical axis direction and the first direction (y direction) respectively is called a second direction (x direction). The second direction (x direction) is the dispersion direction of the signal light by the dispersion element. When a deflection member such as a mirror or a prism, not illustrated in the figure, is disposed in an optical path of the actual wavelength selection switch 1 in order to bend the optical path, descriptions of the x direction and the y direction are to be used on the premise of a virtual optical system in which such a deflection member is not provided.

The light collecting lens 12 is disposed on the optical path of the signal light made incident from the input/output ports 10a, 10b, and 10d to 10f of the input/output part 10, and collects the parallel luminous fluxes thereof to a primary light collecting point (beam waist position) Q1.

The light collecting mirror 14 reflects the signal light which passes through the primary light collecting point Q1 and is diffused, and makes the signal light be incident on the dispersion element 13. A reflection surface of the light collecting mirror 14 is a concave surface having a shape of a part of the spherical surface. In such a configuration, by using the light collecting mirror 14, the optical path can be returned, the number of components can be reduced, and compact arrangement in a narrow area is made possible.

The dispersion element 13 includes dispersion parts 13a for dispersing the signal light reflected by the light collecting mirror 14 into a plurality of light beams having different wavelengths, and a non-dispersion part 13b without the dispersion action. As illustrated in FIG. 5, the non-dispersion part 13b is provided as a thin and long area crossing the center part of the first direction (y direction). Then, the dispersion parts 13a are provided on both sides (upper and lower sides where the first direction is the vertical direction) of the first direction (y direction) so as to interpose the non-dispersion part 13b therebetween. The dispersion part 13a comprises a reflection-type diffraction grating having many grooves extending in the first direction (y direction) at equal intervals, for instance, and disperses the signal light from the light collecting mirror 14 in the x direction. In the meantime, the non-dispersion part 13b comprises a transparent member (transmission member) for transmitting the light of each wavelength included in the signal light inputted from the input/output part 10. A dispersion surface of the dispersion part 13a of the dispersion element 13 and an incident surface of the non-dispersion part 13b are formed on the same plane.

Figure 6:
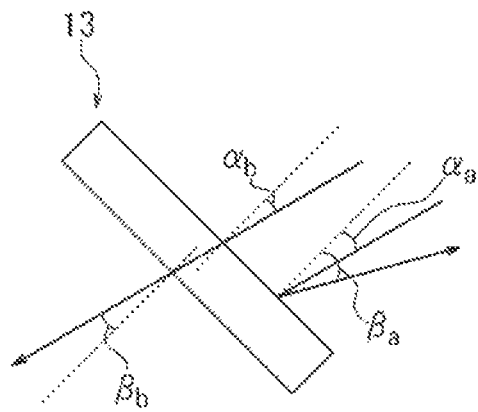
FIG. 6 is a diagram describing the angle relationship of light which is transmitted or dispersed through the dispersion element in FIG. 2.

As illustrated in FIG. 2, for the dispersion element 13, the dispersion surface is disposed so as to be inclined to the x direction within an xz plane with respect to the optical path of the signal light reflected by the light collecting mirror. FIG. 6 is a diagram describing angle relationship of light which is transmitted through or dispersed by the dispersion element 13 within the xz plane. The diagram indicates an incident angle $\alpha_a$ and an emission angle $\beta_a$ of the light dispersed by the dispersion part 13a of the dispersion element 13, and an incident angle $\alpha_b$ and the emission angle $\beta_b$ of the light transmitted through the non-dispersion part 13b. In the dispersion part 13a, the emission angle $\beta_a$ depends on the dispersed wavelength, and is indicated by the following formula.

[Formula 1]

$$\sin\beta_a = \frac{m\lambda}{d} - \sin\alpha_a \quad \text{(Formula 1)}$$

Here, reference character m denotes a diffraction order, reference character d denotes a pitch of the diffraction grating, and reference character λ denotes a wavelength. In such a manner, the light made incident on the dispersion part 13a of the dispersion element 13 is dispersed at a different angle according to the wavelength in the second direction (x direction).

In the meantime, for the light transmitted through the non-dispersion part 13b when the dispersion element 13 is in a planar shape, the incident angle and the emission angle are equal. That is, the following formula is established.

$$\beta_b = \alpha_b \quad \text{(Formula 2)}$$

While a part of the dispersion element 13 overlaps with the optical path of the signal light from the light collecting lens 12 to the light collecting mirror 14 as described above, since the signal light is transmitted through the non-dispersion part provided on the center part in the first direction (y direction) of the dispersion element 13 by the close arrangement of the primary light collecting point Q1 and the dispersion element 13 as illustrated in FIG. 3, the signal light is not obstructed by the dispersion element 13. In this embodiment, the dispersion element 13 overlaps with the optical path of the signal light from the light collecting lens 12 to the light collecting mirror 14 as illustrated in FIG. 2 in consideration of convenience of actual arrangement of the dispersion element 13, however, the dispersion element 13 may be disposed so as not to overlap with the optical path of the signal light at all.

The signal light reflected by the light collecting mirror 14 is made incident on the dispersion part 13a of the dispersion element 13 as illustrated in FIG. 3. It is because that, since the input/output port 10c close to the optical axis of the light collecting lens 12 is not used or is not provided in the input/output part 10, the signal light from any of the input/output ports 10a, 10b, and 10d to 10f obliquely crosses the optical axis at the primary light collecting point Q1, and is then made incident on the dispersion element 13 at a part on the opposite side of the first direction (y direction). Also, a position and a width in the first direction (y direction) of the non-dispersion part 13b of the dispersion element 13 are designed such that the signal light from the input/output ports 10a, 10b, and 10d to 10f is reflected by the light collecting mirror 14 and is then made incident on the dispersion part 10a of the dispersion element 13.

Figure 7:
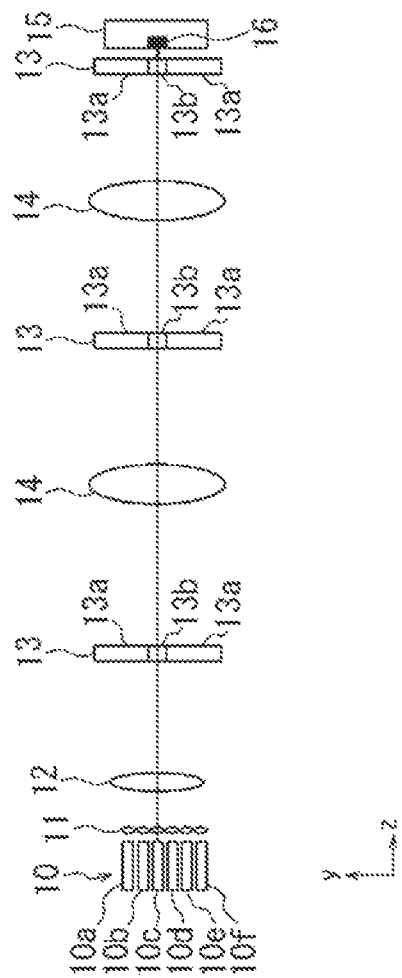
FIG. 7 is a side view illustrating the optical path when signal light is made incident from an unused port of the wavelength selection switch in FIG. 2.

For reference, the optical path of the signal light when assuming that the signal light is made incident from the unused port (input/output port 10c) of the wavelength selection switch in FIG. 2 is illustrated in FIG. 7. The signal light emitted from the input/output port 10c positioned roughly on the optical axis advances along the optical axis, is reflected by the light collecting mirror 14, and is then transmitted through the non-dispersion part 13b of the dispersion element 13. Therefore, the signal light from the input/output port 10c is made incident on the deflector 15 without being dispersed in the dispersion element 13. There may be a case where the light is reflected by the deflection element 16 of the deflector 15, is made incident on one of the input/output ports 10a, 10b, 10d to 10f, and becomes noise. Thus, in this configuration of the present embodiment, the input/output port 10c is not used, or the input/output port is not provided on the position of the input/output port 10c.

When the signal light is dispersed into the plurality of light beams having different wavelengths in the dispersion part 13a of the dispersion element 13, the dispersed light of each wavelength is reflected again at the light collecting mirror 14, transmitted through the non-dispersion part 13b of the dispersion element 13, and made incident on the corresponding deflection element 16 of the deflector 15.

The deflector 15 includes the plurality of deflection elements 16 arrayed in the second direction (x direction) which is the dispersion direction. The deflector 15 is a MEMS mirror array, for instance, and the deflection elements 16 are micromirrors configuring the MEMS mirror array. For the deflection elements 16, the respective mirrors can be independently controlled to change inclination. Especially, by changing the inclination in the y Direction in FIG. 3, the incident light of each wavelength is reflected in a height direction different from an incident direction. Also, as illustrated in FIG. 4, in the view from the first direction (y direction), the dispersed light of each wavelength is made incident on the deflection element 16 roughly vertically, and is reflected vertically when it is desired to output the signal light to the input/output part 10 with as small loss as possible. Also, the number of the deflection elements 16 is not specially limited. Also, the interval, shape, or area of the respective deflection elements 16 may be the same or different.

Next, details of the arrangement of the dispersion element 13, the light collecting mirror 14 and the deflector 15 will be described.

As described above, the dispersion element 13 and the light collecting mirror 14 are separated by the focal distance f of the light collecting mirror 14. Therefore, when the light of each wavelength dispersed in the dispersion element 13 is reflected by the light collecting mirror 14, the light is collected near the non-dispersion part 13b of the dispersion element 13, respectively. Here, since the deflector 15 cannot be disposed at the same position as the dispersion element 13, as illustrated in FIG. 3, the deflector 15 is disposed at a position separated further from a focal position of the light collecting mirror 14 (that is, a position separated from the light collecting mirror 14 by f) by L. In this case, since it the beam waist position, which is the position where beams are narrowed the most, is needed to be the position of the deflection element 16 of the deflector 15 when collecting the light of each wavelength to the deflector 15, the light collecting mirror 14 is installed such that the position of the primary light collecting point Q1, which is a conjugate point with the deflection element 16, is positioned to the light collecting mirror 14 side by L from the focal position of the light collecting mirror 14.

By disposing the dispersion element 13 between the light collecting mirror 14 and the deflector 15 in such a manner, of the light of each wavelength dispersed by the dispersion element 13, the light near the center wavelength of the range of the wavelength to be dispersed can be made incident almost vertically to the second direction (x direction).

With the above-described configuration, the signal light made incident from the input/output ports 10a, 10b and 10d to 10f passes through the light collecting mirror 14 twice in total before and after the dispersion by the dispersion element 13 until the light is made incident on the deflection element 16. Also, the signal light passes through the dispersion element 13 at least twice before the light is made incident on the deflection element 16 similarly. The signal light is reflected by the light collecting mirror 14, and then passes through the dispersion element 13 in the first time, and the light of each wavelength dispersed in the dispersion element 13 passes through the dispersion element 13 after the light is transmitted through the light collecting mirror 14 and before the light is made incident on the deflector 15, in the second time.

The light of each wavelength reflected by each deflection element 16 returns to the optical path, and is outputted to the prescribed input/output ports 10a, 10b, and 10d to 10f of the input/output part 10 successively through the non-dispersion part 13b of the dispersion element 13, the light collecting mirror 14, the dispersion part 13a of the dispersion element 13, the light collecting mirror 14, and the non-dispersion part 13b of the dispersion element 13.

According to this embodiment, since the dispersion element 13 includes the dispersion part 13a for dispersing the signal light into the plurality of light beams having different wavelengths and the non-dispersion part 13b without the dispersion action, the signal light from the input/output part 10 is made incident on the dispersion part 13a of the dispersion element 13, and the light of each wavelength dispersed by the dispersion part 13a is collected to the deflection element 16 of the deflector 15 through the non-dispersion part 13b of the dispersion element 13, the dispersion element 13 does not obstruct the optical path between the light collecting mirror 14 and the deflector 15. Thus, the wavelength selection switch 1 according to this embodiment allows the configuration like FIG. 1 when viewing the optical path from the first direction while using the light collecting mirror 14 as the light collecting element. Thus, there is no need to eccentrically dispose the light collecting mirror 14 to the dispersion element 13. If eccentrically disposing the light collecting mirror 14, a need occurs to dispose a prism for light collecting position correction in order to make the light to be incident on the deflection element 16 roughly vertically when viewed from the array direction (y direction) of the ports. In this embodiment, for the configuration, the light to be made incident on the deflection element can be made incident roughly vertically when viewed from the first direction (y direction) as in FIG. 1 without using the prism for the light collecting position correction. Thus, the generation of noise light due to arrangement of a deflection prism can be avoided.

Also, since the dispersion element 13 is disposed so as to be inclined in the second direction (x direction) to the reflection surface of the deflection element 16 of the deflector 15, it is possible to suppress multiple reflection of the light transmitted through the non-dispersion part 13b of the dispersion element 13 between the deflection element 16 and the dispersion element 13 to cause noise generation.

Second Embodiment

Figure 8:
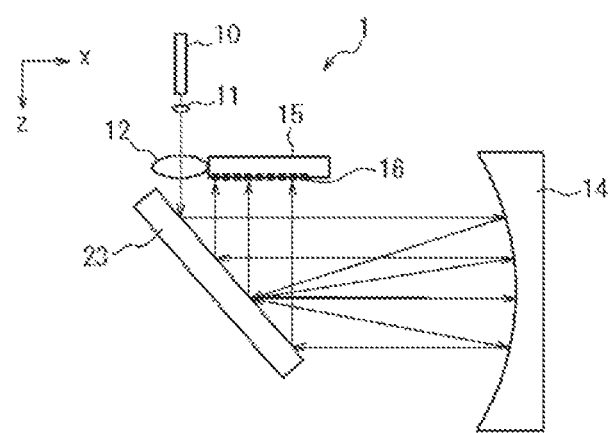
FIG. 8 is a top view illustrating a configuration of a wavelength selection switch according to a second embodiment.
Figure 9:
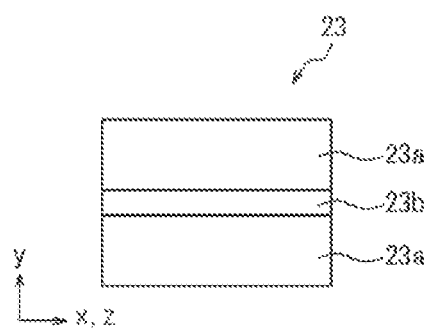
FIG. 9 is a top view of a dispersion element in FIG. 8.

FIG. 8 is a top view illustrating a configuration of the wavelength selection switch 1 according to the second embodiment, and FIG. 9 is a front view of a dispersion element in FIG. 8.

In this embodiment, differently from the wavelength selection switch of the first embodiment, the input/output part 10, the microlens array 11, the light collecting lens 12 and the deflector 15 are provided in a direction roughly perpendicularly bent from the direction of the light collecting element 14 within the xz plane when viewed from a dispersion element 23 (an upper side in FIG. 8). Also, instead of the dispersion element 13 in the first embodiment, the dispersion element 23 is used. The dispersion element 23 has a non-dispersion part 23b comprising a reflection member which reflects the signal light instead of the transmission-type non-dispersion part 13b of the dispersion element 13. The non-dispersion part 23b is disposed in an elongated manner at the center part in the first direction (y direction) of the dispersion element 23, and a dispersion part 23a similarly configured to the dispersion part 13a of the dispersion element 13 in the first embodiment is disposed on both sides of the first direction (y direction). The dispersion surface of the dispersion part 23a and the reflection surface of the non-dispersion part 23b are disposed on the same plane. In such a manner, the optical system is easily designed.

Thus, the signal light emitted from the input/output part 10 passes through the light collecting lens 12, and is then reflected by the non-dispersion part 23b of the dispersion element 23. The signal light reflected by the non-dispersion part 23b is thereafter reflected by the light collecting mirror 14 similarly to the first embodiment, and is dispersed in the dispersion part 23a of the dispersion element 23. The dispersed light of each wavelength is reflected again by the light collecting mirror 14. The light of each wavelength reflected by the light collecting mirror 14 is reflected by the non-dispersion part 23b of the dispersion element 23, and is collected to the deflection element 16 of the deflector 15. The other configurations and operations are similar to those of the first embodiment so that the same reference signs are assigned to the same components and descriptions are omitted.

According to this embodiment, since the non-dispersion part 23b is the reflection member which reflects the signal light, effects similar to that of the first embodiment can be obtained. Also, since the optical path from the input/output part 10 is bent about 90 degrees at the dispersion element 23, a configuration can be made smaller in size compared to that of the first embodiment.

Third Embodiment

Figure 10:
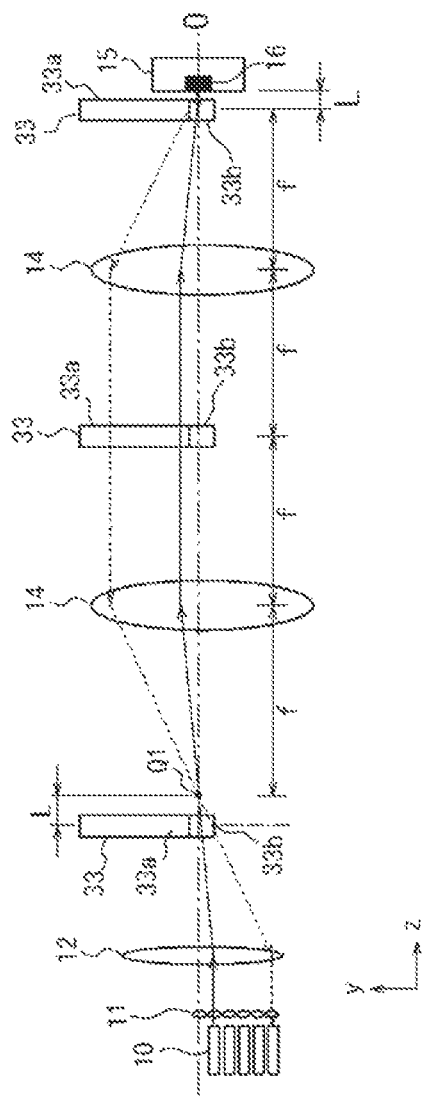
FIG. 10 is a side view developing and illustrating a wavelength selection switch according to a third embodiment along an optical path.
Figure 11:
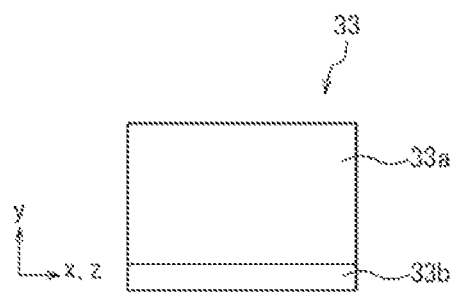
FIG. 11 is a front view of a dispersion element in FIG. 10.

FIG. 10 is a side view developing and illustrating a wavelength selection switch according to the third embodiment along the optical path. Also, FIG. 11 is a front view of a dispersion element 33 in FIG. 10. The wavelength selection switch 1 has the input/output ports of the input/output part 10 only on a lower side of an optical axis O in the first direction (y direction), in the wavelength selection switch of the first embodiment. Also, the dispersion element 33 has a non-dispersion part 33b which transmits the signal light only at a lower end part in the first direction (y direction) and the other part is a dispersion part 33a. The dispersion element 33 is disposed only on an upper side of the optical axis O including the optical axis in the first direction (y direction).

As illustrated in FIG. 10, the signal light made incident from the input/output part 10 on the lower of the optical axis O crosses the primary light collecting point Q1 on the optical axis by the light collecting lens 12, then passes through the upper side of the optical axis O, is made incident on the dispersion part 33a of the dispersion element 33 by the light collecting mirror 14, and is dispersed into the plurality of light beams having different wavelengths. The dispersed light of each wavelength passes through the upper side of the optical axis, is reflected by the light collecting mirror 14, passes through the non-dispersion part 33b of the dispersion element 33, is collected to the deflection element 16 of the deflector 15, and is deflected by the deflection element 16. At the time, the deflection element 16 deflects the incident light toward the upper side of the optical axis O. Thus, the deflected light returns to the optical path, passes through the primary light collecting point Q1, and is emitted from a selected input/output port of the input/output part 10 on the lower side of the optical axis O. The other configurations and operations are similar to those of the first embodiment so that the same reference signs are assigned to the same components and descriptions are omitted.

According to this embodiment, in addition to the effects of the wavelength selection switch according to the first embodiment, the dispersion element 33 comprises one dispersion part 33a and one non-dispersion part 33b, and can be manufactured more easily than the dispersion element 13 of the first embodiment, and also the position in the first direction (y direction) of the dispersion element 33 is easily adjusted.

In this embodiment, while the input/output part 10 is disposed on the lower side of the optical axis and the dispersion element 33 is disposed on the upper side of the optical axis, the input/output part 10 may be on the upper side of the optical axis and the dispersion element 33 may be on the lower side of the optical axis. In this case, the non-dispersion part 33b is disposed at the upper part of the deflection element 33. Also, not only is the non-dispersion part 33b formed only near the optical axis but may be extended to the opposite side of the dispersion part 33a and formed.

Fourth Embodiment

Figure 12:
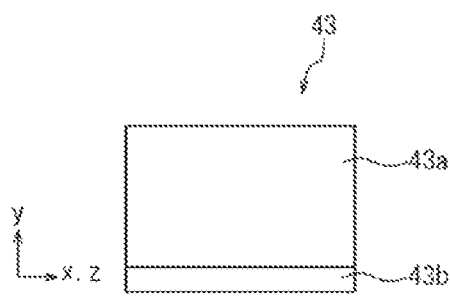
FIG. 12 is a front view of a dispersion element of a wavelength selection switch according to a fourth embodiment.

For a wavelength selection switch according to the fourth embodiment, in the wavelength selection switch of the second embodiment, the input/output ports of the input/output part 10 are provided only on the lower side of the optical axis in the first direction (y direction), and as illustrated in FIG. 12, a dispersion element 43 has a non-dispersion part 43b which reflects the signal light only at the lower end part in the first direction (y direction) and the other part is a dispersion part 43a. The dispersion element 43 is disposed only on the upper side of the optical axis including the optical axis in the first direction (y direction). Therefore, a development view of the optical system of this embodiment is similar to FIG. 10 except that the dispersion element 43 whose non-dispersion part 43b comprises a member that reflects the signal light is used instead of the dispersion element 33. Thus, FIG. 10 is referred to as the development view of the optical system of this embodiment.

By such a configuration, the signal light made incident from the input/output part 10 on the lower side of the optical axis O passes through the light collecting lens 12, is then reflected by the non-dispersion part 43b of the dispersion element 43, passes through the upper side of the optical axis O, is made incident on the dispersion part 43a of the dispersion element 43 by the light collecting mirror 14, and is dispersed into the plurality of light beams having different wavelengths. The dispersed light of each wavelength passes through the upper side of the optical axis O, is reflected by the light collecting mirror 14, is reflected by the non-dispersion part 43b of the dispersion element 43, is collected to the deflection element 16 of the deflector 15, and is deflected by the deflection element 16. At this time, in the development view of FIG. 10, the deflection element 16 deflects the incident light toward the upper side of the optical axis O. Thus, the deflected light returns to the optical path, and is emitted from the input/output part 10 on the lower side of the optical axis O. The other configurations and operations are similar to those of the second embodiment so that the same reference signs are assigned to the same components and descriptions are omitted.

According to this embodiment, in addition to the effects of the wavelength selection switch according to the second embodiment, the dispersion element 43 comprises one dispersion part 43a and one non-dispersion part 43b, and can be manufactured more easily than the dispersion element 23 according to the second embodiment, and also the position in the first direction (y direction) of the dispersion element 43 is easily adjusted.

In this embodiment, while the input/output part 10 is disposed on the lower side of the optical axis and the dispersion element 43 is disposed on the upper side of the optical axis, the input/output part 10 may be on the upper side of the optical axis and the dispersion element 43 may be on the lower side of the optical axis. In this case, the non-dispersion part 43b is disposed at the upper part of the dispersion element 43.

Fifth Embodiment

Figure 13:
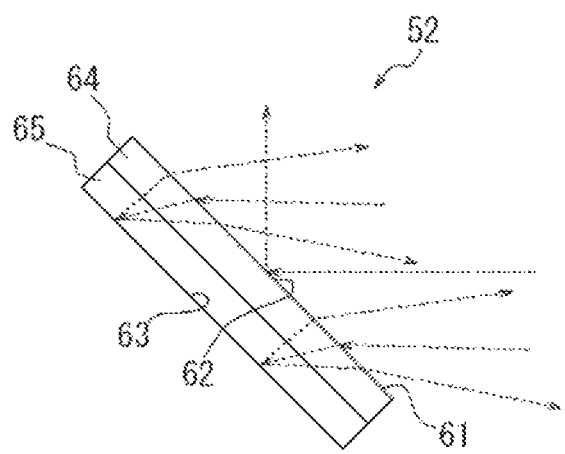
FIG. 13 is a top view of a dispersion element of a wavelength selection switch according to a fifth embodiment.
Figure 14:
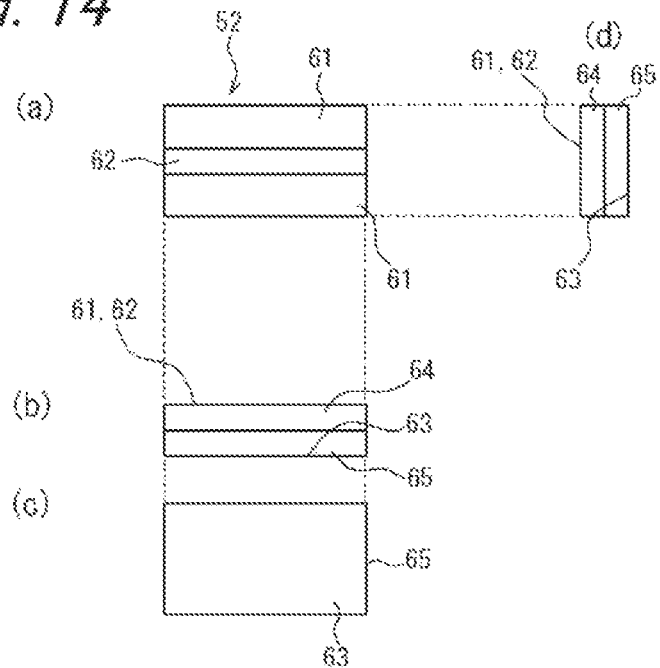
FIG. 14 is a diagram illustrating a configuration of the dispersion element in FIG. 13.

For the wavelength selection switch according to the fifth embodiment, the dispersion element 23 of the wavelength selection switch according to the second embodiment is replaced with a dispersion element 52 whose top view is illustrated in FIG. 13. Also, FIG. 14 is a diagram illustrating a configuration of the dispersion element 52, in which (a) is a front view, (b) is a top view, (c) is a back view, and (d) is a side view.

The dispersion element 52 is configured by sticking together two planar members that are a reflection/transmission member 64 and a diffraction member 65. The reflection/transmission member 64 is a member which reflects and transmits the signal light, and on its surface (first surface), a reflection surface 62 which reflects the signal light at the center part in the first direction (y direction) of the dispersion element 52 is formed in an elongated manner in the second direction (x direction), and both sides thereof in the first direction (y direction) are a transmission surface 61 which transmits the signal light. The reflection surface 62 can be formed by a method of vapor-depositing a metal thin film onto a transparent substrate or the like, for instance. Also, for the diffraction member 65, a reflection-type dispersion surface 63 is formed over the entire surface (second surface) on the opposite side of the surface bonded to the reflection/transmission member 64. The dispersion surface 63 is configured by providing a number of diffraction grooves that are long in the first direction (y direction) at equal pitches, for instance.

The dispersion element 52 is disposed so that the signal light is made incident from the side of the reflection/transmission member 64 as illustrated in FIG. 13. As the optical path illustrated in FIG. 13, the signal light made incident on the reflection surface 62 of the reflection/transmission member 64 is regularly reflected. In the meantime, the signal light made incident on the transmission surface 61 passes through the reflection/transmission member 64, is made incident on the diffraction member 65, is dispersed by the dispersion surface 63, passes through the insides of the diffraction member 65 and the reflection/transmission member 64 again, and is emitted from the transmission surface 61. Thus, the dispersion element 52 is configured such that the center part in the first direction (y direction) is the non-dispersion part and the dispersion part is provided on both sides thereof, similarly to the dispersion element 23 of the second embodiment. However, it is different at the point that the reflection surface 62 of the non-dispersion part and the dispersion surface 63 of the dispersion part are not on the same plane.

According to this embodiment, by using the dispersion element 52, effects similar to that of the second embodiment can be obtained. Also, since the dispersion surface 63 of the dispersion part and the reflection surface 62 of the non-dispersion part can be formed separately, the dispersion element 52 is easily manufactured compared to the dispersion element 23 according to the second embodiment in which the diffraction grating of the dispersion part and a reflection film of the non-dispersion part need to be formed on the same surface. Also, the dispersion surface of the diffraction member 65 is provided on the surface on the opposite side of the surface bonded to the reflection/transmission member 64, however, the dispersion surface may be provided on a surface in contact with the reflection/transmission member 64. Although the two planar members are the reflection/transmission member 64 and the diffraction member 65, at least one of the reflection/transmission member 64 and the diffraction member 65 may serve as a prism shape.

Also, for this embodiment, various modifications are possible for the configuration that the dispersion part and the non-dispersion part of the dispersion element are not provided on the same plane. The modifications will be indicated hereinafter.

(Modification 1)

Figure 15:
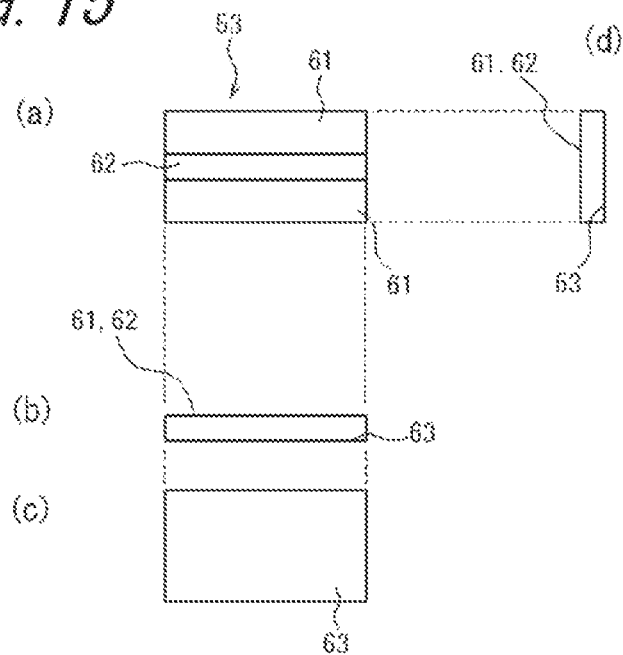
FIG. 15 is a diagram illustrating a first modification of the dispersion element of the wavelength selection switch according to the fifth embodiment.

FIG. 15 is a diagram illustrating the modification 1 of the dispersion element of the wavelength selection switch according to the fifth embodiment. In FIG. 15 and the following diagrams, for the dispersion element, (a) a front view, (b) a top view, (c) a back view and (d) a side view are illustrated similarly to FIG. 14. For the dispersion element 53 in FIG. 15, a substrate of a planar member is used, the transmission surface 61 and the reflection surface 62 are formed on one surface thereof, and the dispersion surface 63 is formed on the other surface. The arrangement of the reflection surface 62 when viewed in the front view is similar to the fifth embodiment. Also, the dispersion element 53 may have a prism shape instead of the planar member.

(Modification 2)

Figure 16:
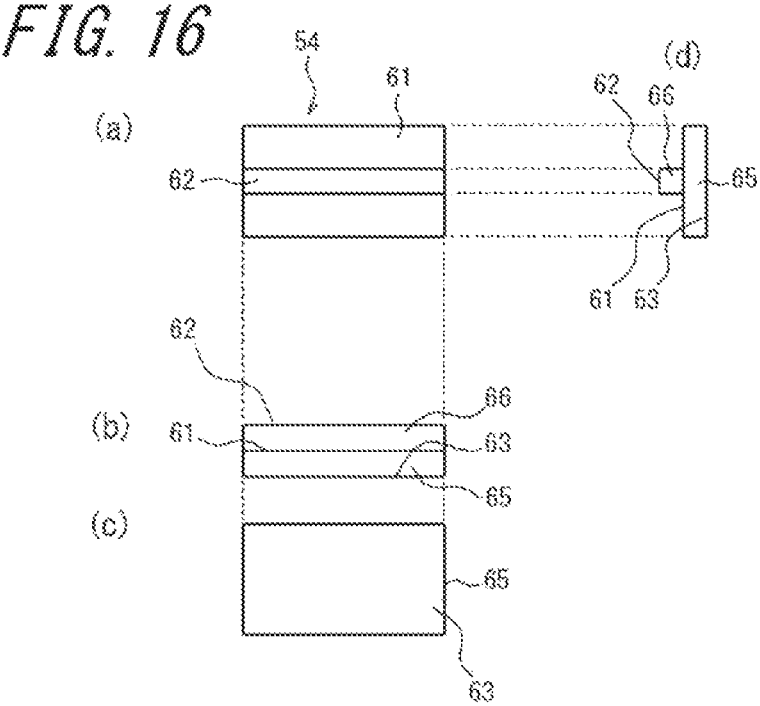
FIG. 16 is a diagram illustrating a second modification of the dispersion element of the wavelength selection switch according to the fifth embodiment.

FIG. 16 is a diagram illustrating the modification 2. For this dispersion element 54, a prismatic reflection member 66 is bonded at the center part in the first direction (y direction) of the surface on the side that the signal light of the diffraction member 65 is to be made incident. For the diffraction member 65, both sides with respect to the bonded part of the reflection member 66 of the surface on the side that the signal light is to be made incident are the transmission surface 61, and the surface on the opposite side is the dispersion surface 63. A surface of the reflection member 66 on the side that the signal light is received is the reflection surface 62. Also, the dispersion surface 63 of the diffraction member 65 may be provided on the surface on the side where the signal light is to be made incident instead of the transmission surface 61. Also, the diffraction member 65 may have a prism shape instead of the planar member.

(Modification 3)

Figure 17:
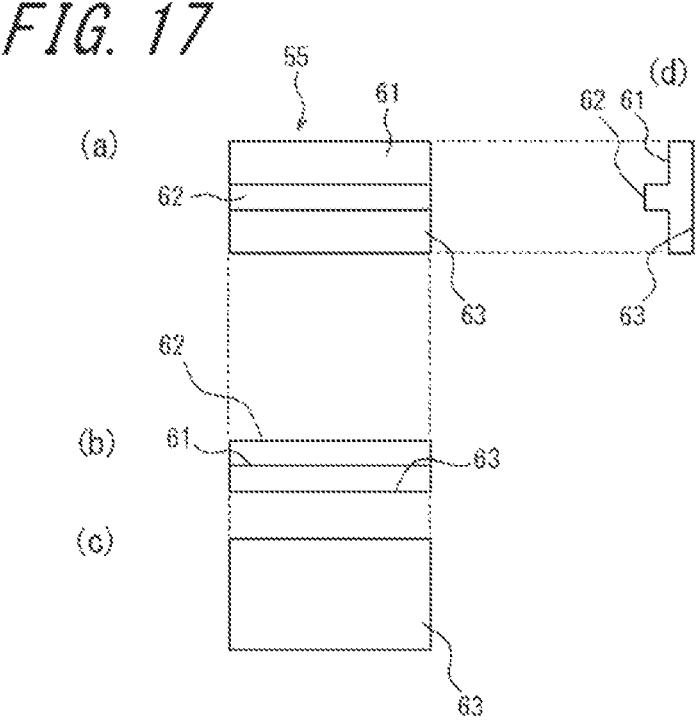
FIG. 17 is a diagram illustrating a third modification of the dispersion element of the wavelength selection switch according to the fifth embodiment.
Figure 18:
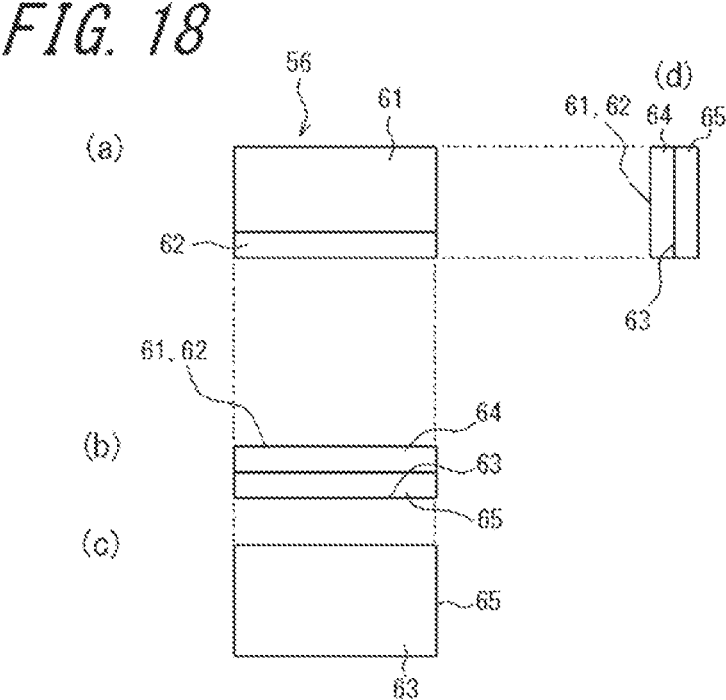
FIG. 18 is a diagram illustrating a fourth modification of the dispersion element of the wavelength selection switch according to the fifth embodiment.
Figure 19:
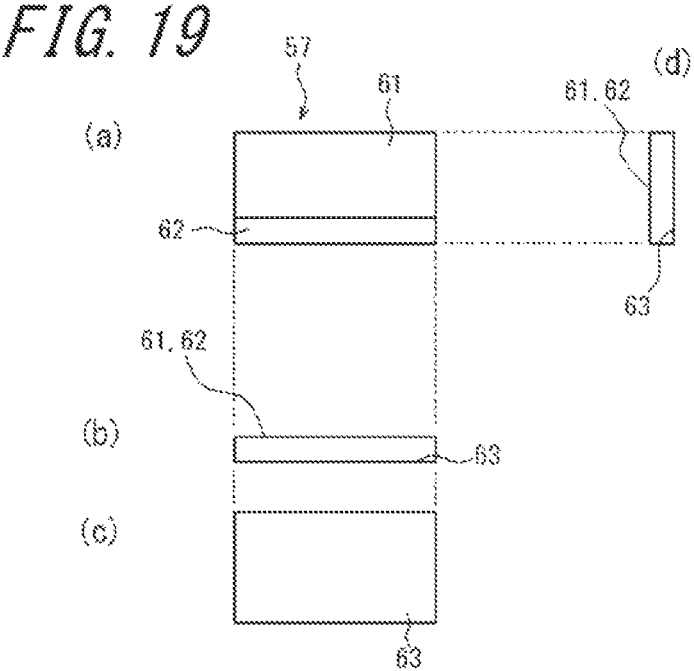
FIG. 19 is a diagram illustrating a fifth modification of the dispersion element of the wavelength selection switch according to the fifth embodiment.

FIG. 17 is a diagram illustrating the modification 3. For this dispersion element 55, the dispersion element 54 in FIG. 16 is constituted of one member. That is, a step is provided by shaving both sides so as to project the center part in the first direction (y direction) of the planar member, and the reflection surface 62 is formed at the center part. Also, both sides interposing the center part are the transmission surface 61, and the dispersion surface 63 is formed on the surface on the opposite side thereof. Also, the dispersion surface 63 may be provided not on the surface on the opposite side of the reflection surface 62 and the transmission surface 61, but on both sides interposing the center part where the reflection surface 62 is formed instead of the transmission surface 61.

(Modifications 4 to 7)

FIG. 18 to FIG. 21 are diagrams illustrating the modifications 4 to 7 of the dispersion element usable instead of the dispersion element 43 used in the wavelength selection switch according to the fourth embodiment. FIG. 18 to FIG. 21 illustrate a position where the reflection surface 62 is formed of dispersion elements 56 to 59 of the dispersion elements 52 to 55 illustrated in FIG. 14 to FIG. 17, is not the center part in the first direction (y direction) but one end part, respectively.

Sixth Embodiment

Figure 22:
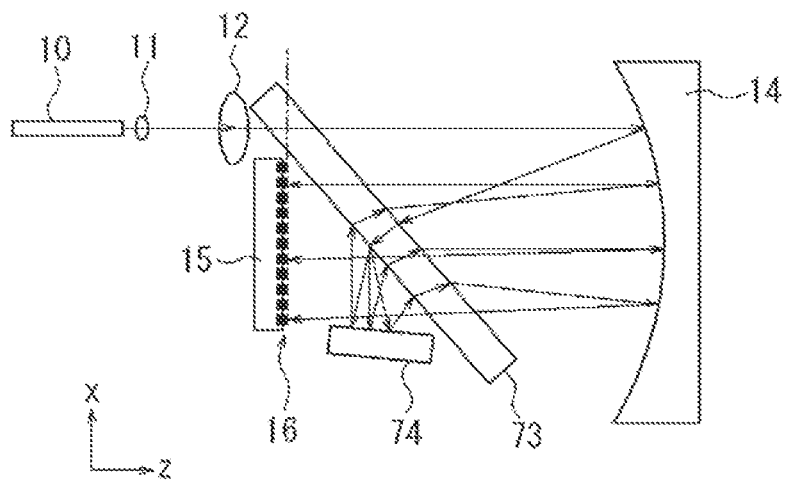
FIG. 22 is a top view illustrating a configuration of a wavelength selection switch according to a sixth embodiment.

FIG. 22 is a top view illustrating a configuration of the wavelength selection switch according to the sixth embodiment. For the wavelength selection switch, in the wavelength selection switch according to the first embodiment, instead of the dispersion element 13, a dispersion element 73 including a transmission-type dispersion part and a transmission-type non-dispersion part and a mirror 74 are disposed. The arrangement of the dispersion part and the non-dispersion part of the dispersion element 73 is similar to the dispersion element 13 of the first embodiment. Also, the mirror 74 is disposed at such a position that light diffracted by the dispersion element 73 of the signal light is reflected again to the dispersion element 73 and that the light of each wavelength made incident on and reflected by the deflection element 16 of the deflector 15 is not intercepted. The dispersion part of the dispersion element 73 and the mirror 74 configure a so-called Littman-Metcalf-type dispersion element. Since the light diffracted by the dispersion element 73 is reflected by the mirror 74 and is diffracted again by the dispersion element 73, by being transmitted and diffracted twice by the dispersion element 73, a dispersion angle can be increased. The other configurations and operations are similar to those of the first embodiment so that the same reference signs are assigned to the same components and descriptions are omitted.

According to this embodiment, effects similar to that of the first embodiment can be obtained, and further, since the Littman-Metcalf-type dispersion element with which the dispersion element 73 and the mirror 74 are combined is used, the dispersion angle in the dispersion element can be made larger. Thus, the dispersion element 73 and the light collecting mirror 14 can be brought to be closer, and the entire device can be made smaller in size.

Seventh Embodiment

Figure 23:
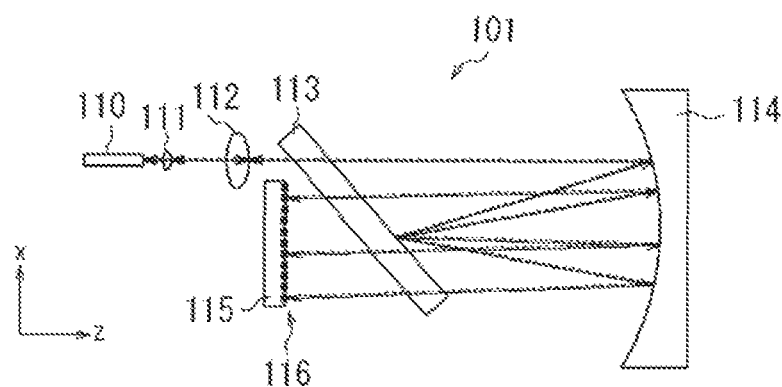
FIG. 23 is a top view illustrating a configuration of a wavelength selection switch according to a seventh embodiment.
Figure 24:
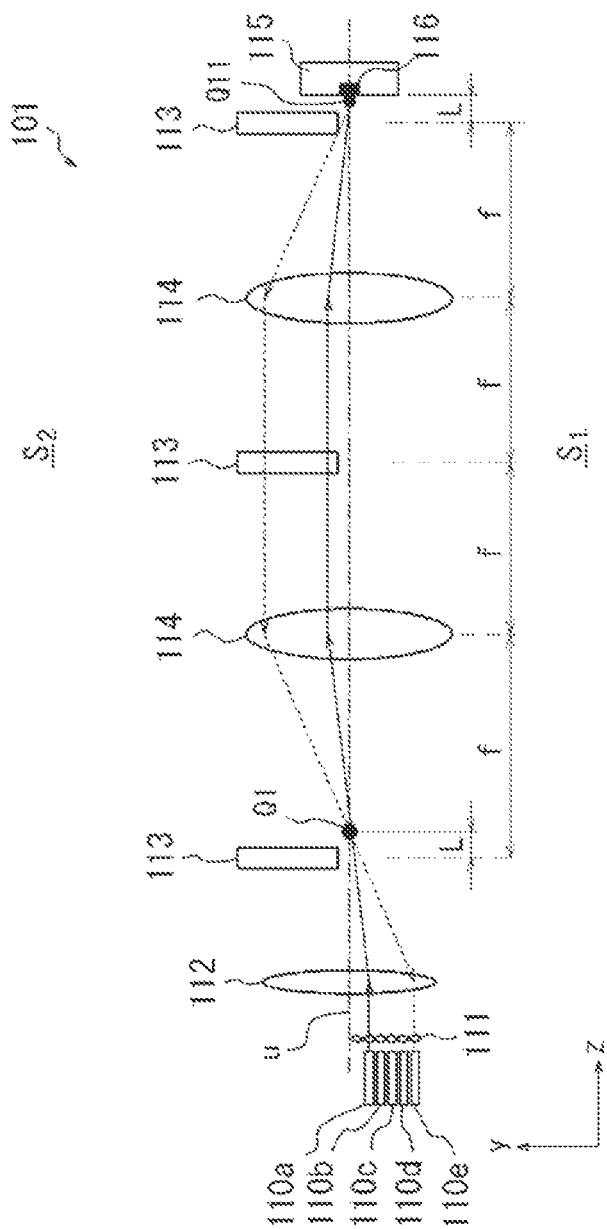
FIG. 24 is a side view developing and illustrating the wavelength selection switch in FIG. 23 along an optical path.
Figure 25:
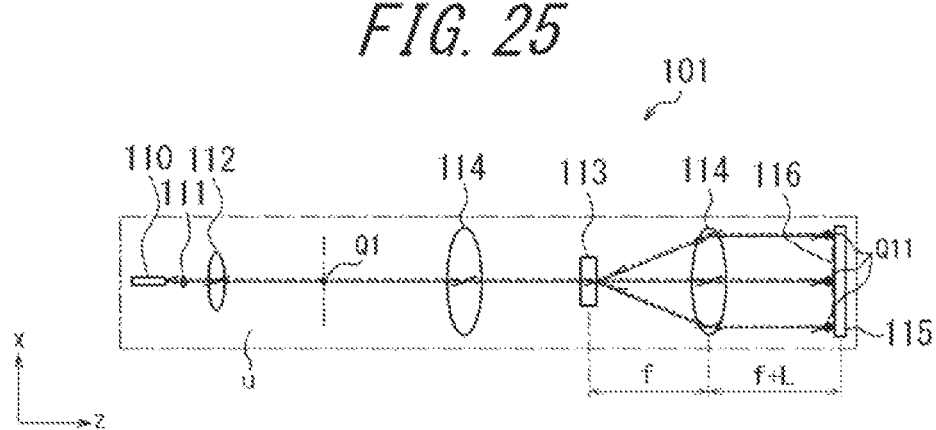
FIG. 25 is a top view developing and illustrating the wavelength selection switch in FIG. 23 along the optical path.

With reference to FIGS. 23 to 25, a wavelength selection switch according to the seventh embodiment will be described. FIG. 23 is a top view illustrating a configuration of the wavelength selection switch according to the seventh embodiment. FIG. 24 is a side view developing and illustrating a wavelength selection switch 101 in FIG. 23 along the optical path, and FIG. 25 is a top view developing and illustrating a wavelength selection switch 101 in FIG. 23 along the optical path. The wavelength selection switch 101 includes an input/output part 110, a microlens array 111, a light collecting lens (second light collecting element) 112, a dispersion element 113, a light collecting mirror (first light collecting element) 114, and a deflector 115.

As illustrated in FIG. 23, when viewed from the y direction, the input/output part 110, the microlens array 111 and the light collecting lens 112 are disposed in series along the optical path, and a part of a mirror surface of the light collecting mirror 114 intersects an extension line on the side of the light collecting lens 112. Also, the deflector 115 is disposed facing the light collecting mirror 114 at a position shifted so as not to interfere with the signal light which has passed through the light collecting lens 112, on the light collecting mirror 114 side of the light collecting lens 112. Furthermore, on the light collecting mirror 114 side of the deflector 115, the dispersion element 113 is disposed. A part of the dispersion element 113 overlaps with the optical path of the signal light between the light collecting lens 112 and the light collecting mirror 114 when viewed in the y direction but is shifted in the y direction as in FIG. 24 when viewed in the x direction. Here, the dispersion element 113 and the light collecting mirror 114 are separated by the focal distance f of the light collecting mirror 114. However, according to the accuracy demanded for the wavelength selection switch 101, the dispersion element 113 and the light collecting mirror 114 may be separated longer than or shorter than the focal distance f of the light collecting mirror 114.

As illustrated in FIG. 24, the input/output part 110 includes input/output ports 110a to 110e whose incident/emission surfaces are constituted by optical fibers disposed in series in a vertical direction (y direction). The input/output ports 110a to 110e are arrayed in a space (called a "first space $S_1$" hereinafter) which is one of two spaces separated by a plane u (first plane) away from the plane u by a distance equal to a port interval of the input/output ports, for instance. Here, the plane u is a virtual plane which passes through a light collecting point on a plurality of deflection elements 116 of the deflector 115 to be described later, and is orthogonal to the array direction (y direction) of the input/output ports 110a to 110e. The input/output ports 110a to 110e serve to input the wavelength-multiplexed signal light from the outside of the wavelength selection switch 101, or output the signal light to the outside. FIG. 24 illustrates an example of using the input/output port 110a as a port for input and emitting the dispersed light of a specific wavelength from the input/output port 110e. In FIG. 24, the signal light which is made incident from the input/output port 110a and reflected by the deflection element 116 is indicated by a solid line, and the light which is reflected by the deflection element 116 and emitted to the input/output port 110e is indicated by a broken line. Which of input/output ports 110a to 110e is to be used for input or for output can be appropriately designed. It is not necessary to use all the input/output ports 110a to 110e as an input port or an output port, and the input/output port which is not functioning as the input port or the output port may be present. One end of each optical fiber is present inside the wavelength selection switch 101, and the other end is connected with the outside of the wavelength selection switch 101. The number of the input/output ports can be various numbers, 110 or more, for instance, however, an example of five input/output ports is illustrated for simplicity.

Also, the respective input/output ports 110a to 110e and respective microlenses inside the microlens array 111 are paired. The respective microlenses convert the light inputted from the respective input/output ports 110a to 110e into a parallel luminous flux (collimated light), and couple the parallel luminous flux outputted toward the respective input/output ports 110a to 110e to the optical fibers. The respective microlenses are not limited to a spherical surface and may be an aspherical surface. Also, the light inputted into the wavelength selection switch 101 through the respective input/output ports 110a to 110e and the respective microlenses of the microlens array 111 and the light outputted from the wavelength selection switch 101 through the respective input/output ports 110a to 110e are respectively turned into the luminous fluxes that are parallel to each other.

In the following seventh to ninth embodiments, an advancing direction of the parallel light which has transmitted through the input/output ports 110a to 110e and the microlens array 111 is defined as an optical axis direction (z direction). The optical axis direction is also an optical axis direction of the light collecting lens 112. Also, an array direction of the incident/emission surfaces of the input/output ports 110a to 110e and the microlens array 111 is defined as a first direction (y direction). The optical axis direction and the first direction are orthogonal to each other. Furthermore, a direction orthogonal to the optical axis direction and the first direction (y direction) is respectively called a second direction (x direction). The second direction (x direction) is the dispersion direction of the signal light by the dispersion element 113. When a deflection member such as a mirror and a prism not illustrated in the figure is disposed in an optical path of the actual wavelength selection switch 101 in order to bend the optical path, descriptions of the x direction and the y direction are used on the premise of a virtual optical system in which such a deflection member is not provided.

The light collecting lens 112 is disposed on the optical path of the signal light made incident from the input/output ports 110a to 110e of the input/output part 110, and collects the parallel luminous fluxes thereof to a primary light collecting point (beam waist position) Q1. As illustrated in FIG. 24, the signal light emitted from the input/output part 110 disposed in the first space $S_1$ on the lower side of the plane u crosses the plane u at the primary light collecting point Q1, and passes through a second space $S_2$ (an upper side in FIG. 24).

The light collecting mirror 114 reflects the signal light which passes through the primary light collecting point Q1 and is diffused, in the second space $S_2$ different from the first space $S_1$ of the two spaces separated by the plane u, and makes the signal light be incident on the dispersion element 113 as the roughly parallel luminous flux. A reflection surface of the light collecting mirror 114 is a concave surface having a shape of a part of the spherical surface. In such a manner, by using the light collecting mirror 114, returning the optical path can be performed, the number of components can be reduced, and compact arrangement in a narrow area is made possible.

The dispersion element 113 is separated from the plane u by roughly a port interval of the input/output part 110, for instance, and is disposed only in the second space $S_2$ of the spaces separated by the plane u, as illustrated in FIG. 24. Also, as illustrated in FIG. 23, the dispersion element 113 is disposed such that a normal of the dispersion surface is inclined within the xz plane to the optical path of the signal light reflected by the light collecting mirror.

In the meantime, the signal light reflected by the light collecting mirror 114 is made incident on the dispersion element 113 as illustrated in FIG. 24. It is because that, the input/output ports 110a to 110e are separated from the plane u by roughly the port interval in the input/output part 110, and the signal light from the input/output ports 110a to 110e obliquely crosses the optical axis from the first space $S_1$ at the primary light collecting point Q1, is made incident on the second space $S_2$, is then turned into the light parallel to the plane u by the light collecting mirror 114 at a position a prescribed distance away from the plane u, and is made incident on the dispersion element 113. The dispersion element 113 is disposed by setting a distance from the plane u such that the signal light from the input/output ports 110a to 110e is reflected by the light collecting mirror 114 and is then made incident on the dispersion element 113.

When the signal light is dispersed into the plurality of light beams having different wavelengths in the dispersion element 113, the light of each wavelength is reflected again by the light collecting mirror 114, passes through a gap between the dispersion element 113 and the plane u, and is made incident on the corresponding deflection element 116 among the plurality of deflection elements of the deflector 115. Also, it is merely an example that the distance between the plane u and the dispersion element 113 is roughly set to the port interval of the input/output part 110. The distance between the plane u and the dispersion element 113 is designed in consideration of the arrangement of the input/output ports 110a to 110e, the light collecting lens 112, the dispersion element 113, the light collecting mirror 114, and the deflector 115, etc.

The deflector 115 includes the plurality of deflection elements 116 arrayed in the second direction (x direction) which is the dispersion direction. The deflector 115 is a MEMS mirror array, for instance, and the deflection elements 116 are micromirrors configuring the MEMS mirror array. For the deflection elements 116, the respective mirrors can be independently controlled to change the inclination. Especially, by changing the inclination within a yz plane in FIG. 24, the incident light of each wavelength is reflected in a height direction different from an incident direction toward the second space $S_2$ of the two spaces separated by the plane u. Also, as illustrated in FIG. 25, when viewed from the first direction (y direction), the dispersed light of each wavelength is made incident on the deflection element 116 vertically, and is reflected vertically when the signal light is outputted to the input/output part 110 with as small loss as possible. The number of the deflection elements 116 is not specially limited. Also, the interval, shape, or area of the respective deflection elements 116 may be the same or different.

The light of each wavelength dispersed in the dispersion element 113 is reflected by the light collecting mirror 114 and is collected to the corresponding deflection element 116 respectively. As described above, the plane u is a virtual plane in which the light passes through the light collecting point on the respective deflection elements 116, and is orthogonal to the array direction (y direction) of the input/output ports 110a to 110e.

Next, the details of the arrangement of the dispersion element 113, the light collecting mirror 114 and the deflector 115 will be described.

As described above, the dispersion element 113 and the light collecting mirror 114 are separated by the focal distance f of the light collecting mirror 114. Therefore, when the light of each wavelength dispersed in the dispersion element 113 is reflected by the light collecting mirror 114, the light is each collected near the dispersion element 113. Here, since the deflector 115 cannot be disposed at the same position as the dispersion element 113, as in FIG. 24, the deflector 115 is disposed at a position separated further from a focal position of the light collecting mirror 114 (that is, a position separated from the light collecting mirror 114 by f) by L. In this case, since it is needed to set a light collecting position (beam waist position) Q11 where beams are narrowed the most to the position of the deflection element 116 of the deflector 115 when collecting the light of each wavelength to the deflector 115, the light collecting mirror 114 is installed such that the position of the primary light collecting point Q1 which is a conjugate point with the deflection element 116 is a closer position to the side of the light collecting mirror 114 by L from the focal position of the light collecting mirror 114.

By disposing the dispersion element 113 between the light collecting mirror 114 and the deflector 115 in such a manner, of the light of each wavelength dispersed by the dispersion element 113, the light near the center wavelength of the range of the wavelength to be dispersed can be made incident almost vertically to the collecting mirror 114 in the second direction (x direction).

The light of each wavelength reflected by the respective deflection elements 116 returns the optical path, successively passes through between the dispersion element 113 and the plane u in the second space $S_2$, the light collecting mirror 114, the dispersion element 113 and the light collecting mirror 114, is made incident on the first space $S_1$ from the second space $S_2$ at the primary light collecting point Q1, passes through a lower part of the dispersion element 113, and is outputted through the light collecting lens 112 to the prescribed input/output ports 110a to 110e of the input/output part 110.

According to this embodiment, since the dispersion element 113 is disposed only in one space (second space $S_2$) of the two spaces separated by the plane u that includes the plurality of light collecting points of the deflection element 116 and is orthogonal to the first direction (y direction), the dispersion element 113 does not obstruct the optical path of the signal light passing through between the input/output part 110 and the light collecting mirror 114 and between the light collecting mirror 114 and the deflector 115 or the light dispersed into wavelengths. Thus, the wavelength selection switch 101 according to this embodiment allows the configuration like FIG. 1 of the first embodiment when viewing the optical path from the first direction while using the light collecting mirror 114 as the light collecting element. Thus, there is no need to eccentrically dispose the light collecting mirror 114 to the dispersion element 113. If eccentrically disposing the light collecting mirror 114, a need occurs to dispose a prism for light collecting position correction in order to make the light incident on the deflection element 116 be incident roughly vertically when viewed from the array direction (y direction) of the ports. In this embodiment, for the configuration, the light to be made incident on the deflection element 116 can be made incident roughly vertically when viewed from the first direction (y direction) as in FIG. 1 without using the prism for the light collecting position correction. Thus, the generation of noise light due to arrangement of a deflection prism can be avoided.

Also, since the dispersion element 113 is disposed so as to be inclined in the second direction (x direction) to the reflection surface of the deflection element 116 of the deflector 115, and is disposed so as to be shifted in the first direction, it is possible to suppress the noise generation by the multiple reflection between the deflection element 116 and the dispersion element 113.

Eighth Embodiment

Figure 26:
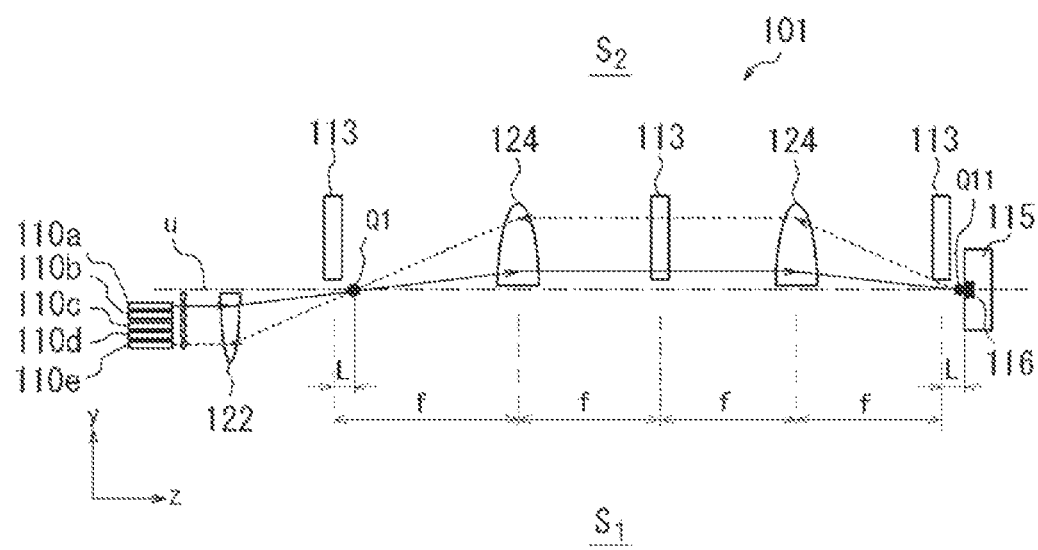
FIG. 26 is a side view developing and illustrating a wavelength selection switch according to an eighth embodiment along an optical path.

FIG. 26 is a side view developing and illustrating the wavelength selection switch 101 according to the eighth embodiment along the optical path. For the wavelength selection switch 101 according to this embodiment, since the light passes through only one of the two spaces separated by the plane u for the light collecting lens 112 and the light collecting mirror 114 in the seventh embodiment, the light collecting lens 112 and the light collecting mirror 114 serve as a light collecting lens 122 and a light collecting mirror 124 with a shape of only one space when viewed from the plane u. The light collecting lens 122 is a lens only on the side of the first space $S_1$ similarly to the input/output ports 110a to 110e, and the light collecting mirror 124 is a mirror only on the side of the second space $S_2$ similarly to the dispersion element 113. The other configurations are the same as those of the seventh embodiment so that the same reference signs are assigned to the same components and descriptions are omitted.

As it is clear from comparison between FIG. 26 and FIG. 24 of the seventh embodiment, even when the wavelength selection switch 101 is configured in this manner, the signal light made incident from the input/output ports passes through the optical path similarly to the seventh embodiment and is dispersed by the dispersion element 113, and the dispersed light of each wavelength is reflected by the deflection element 116, passes through the optical path similarly to the seventh embodiment and is emitted from the input/output part 110. Thus, in this embodiment, effects similar to that of the seventh embodiment can be obtained. Furthermore, since half of the light collecting mirror 114, which is a relatively large member inside the wavelength selection switch 101, can be eliminated, the device can be smaller in size.

Ninth Embodiment

Figure 27:
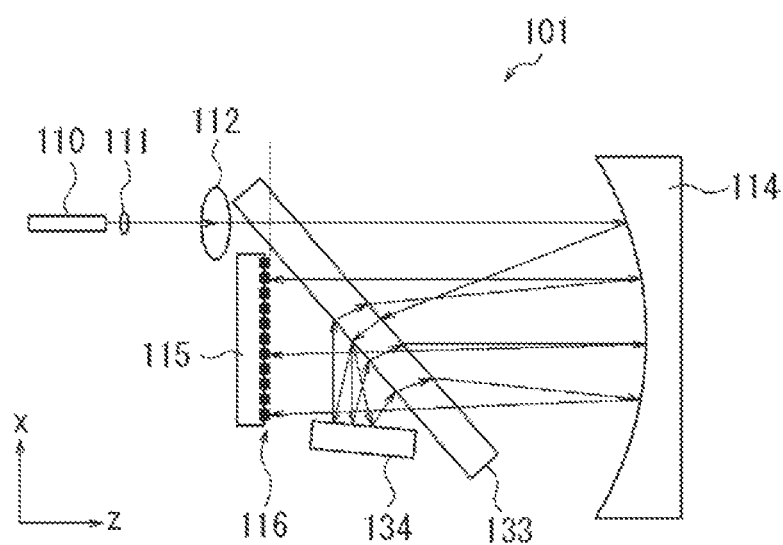
FIG. 27 is a top view illustrating a configuration of a wavelength selection switch according to a ninth embodiment.

FIG. 27 is a top view illustrating a configuration of the wavelength selection switch 101 according to the ninth embodiment. For the wavelength selection switch, a transmission-type dispersion element 133 and a mirror 134 are disposed instead of the dispersion element 113 in the wavelength selection switch according to the seventh embodiment. The entire shape, size and arrangement of the dispersion element 133 are similar to those of the dispersion element 113 of the seventh embodiment. Also, the mirror 134 is disposed at such a position that light diffracted by the dispersion element 133 of the signal light is reflected again to the dispersion element 133 and the light of each wavelength made incident on and reflected by the deflection element 116 of the deflector 115 is not intercepted. The dispersion element 133 and the mirror 134 configure a so-called Littman-Metcalf-type dispersion element. Since the light diffracted at the dispersion element 133 is reflected by the mirror 134 and is diffracted again by the dispersion element 133, by being transmitted through and diffracted by the dispersion element 133 twice, a dispersion angle can be increased. The other configurations and operations are similar to those of the seventh embodiment so that the same reference signs are assigned to the same components and descriptions are omitted.

According to this embodiment, effects similar to that of the seventh embodiment can be obtained, and further, since the Littman-Metcalf-type dispersion element with which the dispersion element 133 and the mirror 134 are combined is used, the dispersion in the dispersion element can be made larger. Thus, the dispersion element 133 and the light collecting mirror 114 can be brought to be closer, and the entire device can be made smaller in size.

Tenth Embodiment

Figure 28A:
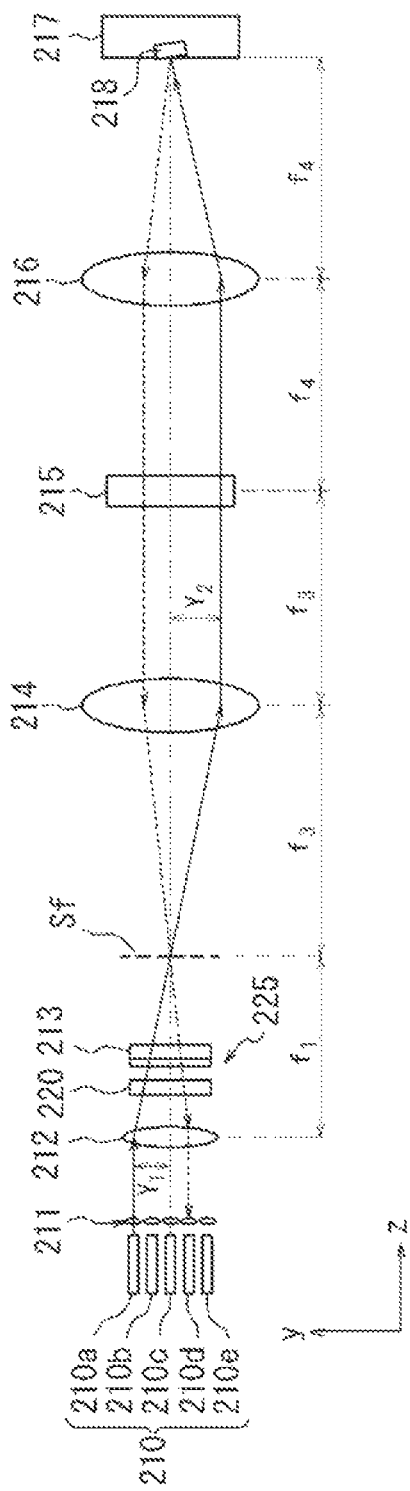
FIG. 28A is a side view generally illustrating a configuration of a wavelength selection switch according to a tenth embodiment.
Figure 28B:
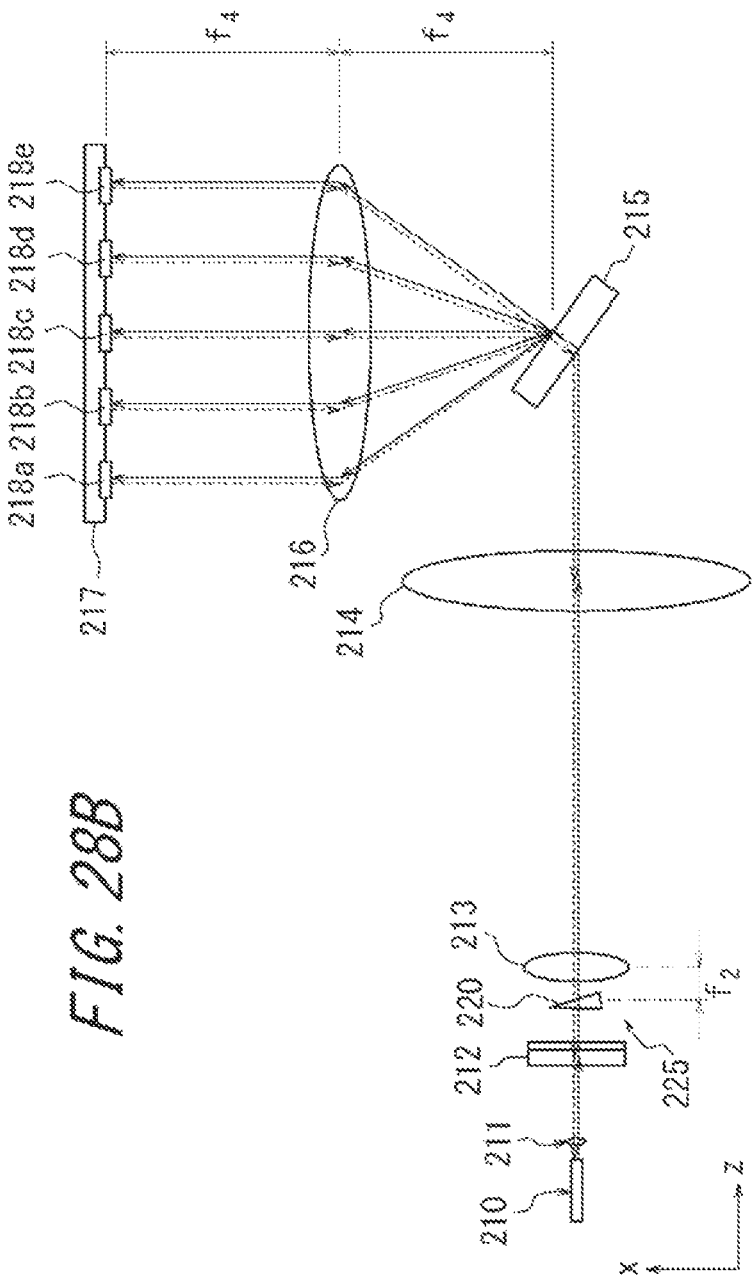
FIG. 28B is a top view of the wavelength selection switch in FIG. 28A.

FIG. 28A and FIG. 28B are a side view and a top view roughly illustrating a configuration of a wavelength selection switch according to the tenth embodiment, respectively. The wavelength selection switch includes an input/output part 210, a microlens array 211, an incident position deviation correction element 220, cylindrical lenses 212 and 213, a lens 214 configuring a parallel luminous flux forming element, a dispersion part 215 having a dispersion element (diffraction grating), a lens 216 configuring a light collecting element, and a deflector 217 configuring a deflection part.

Figure 29A:
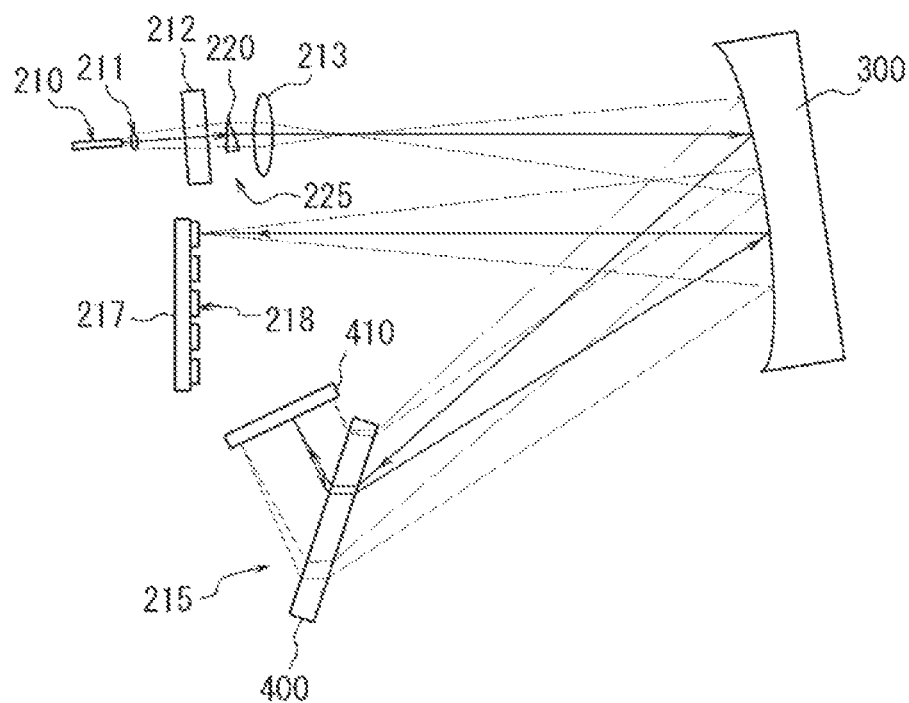
FIG. 29A is a top view illustrating one example of a concrete configuration of the wavelength selection switch of the tenth embodiment.
Figure 29B:
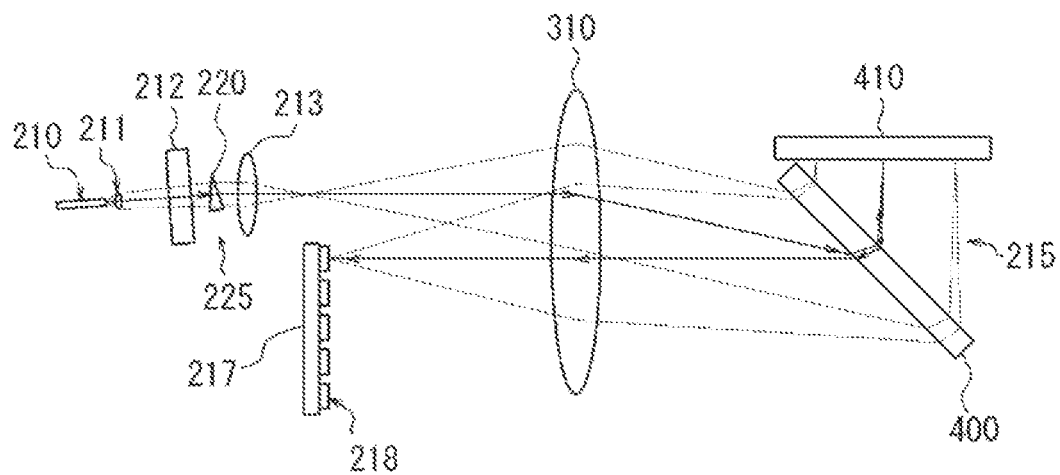
FIG. 29B is a top view illustrating another example of the concrete configuration of the wavelength selection switch of the tenth embodiment.

The configuration illustrated in FIG. 28A and FIG. 28B is a schematic diagram for illustrating an optical function, and is the configuration like the top view illustrated in FIG. 29A or FIG. 29B, more specifically. That is, the lenses 214 and 216 of FIG. 28A and FIG. 28B are constituted by the same light collecting mirror 300 in FIG. 29A, and are constituted by the same light collecting lens 310 in FIG. 29B.

The dispersion part 215 may comprise a transmission-type diffraction grating for which a grating parallel to the first direction (y direction) is formed on the dispersion surface as illustrated in FIG. 28A and FIG. 28B or may be a Littman-Metcalf configuration including a transmission-type diffraction grating 400 and a reflection mirror 410 as illustrated in FIG. 29A and FIG. 29B. Also, though not shown in the figure, it may be a reflection-type diffraction grating. The dispersion part 215 which has a high resolution of the light of each wavelength and a larger dispersion angle is desirable.

In FIG. 28A and FIG. 28B, the input/output part 210 includes input ports 210a to 210c and 210e and an output port 210d comprising optical fibers that are disposed in array. The input ports 210a to 210c and 210e and the output port 210d input the wavelength-multiplexed signal light from the outside of the wavelength selection switch and output the signal light to the outside. Hereinafter, for the convenience of descriptions, the input ports 210a to 210c and 210e and the output port 210d are collectively represented as the input/output ports 210a to 210e appropriately.

One end of each optical fiber is present inside the wavelength selection switch, and the other end is connected with an external device. The number of the input/output ports is 10 or more, for instance, and in FIG. 28A, only five input/output ports 210a to 210e centering on the input/output port 210c are illustrated for convenience.

Also, the respective input/output ports 210a to 210e and respective microlenses inside the microlens array 211 are paired. The microlenses convert the light inputted from the corresponding input/output ports 210a to 210c and 210e into a parallel luminous flux, and couple the parallel luminous flux outputted toward the input/output port 210d to the optical fiber of the input/output port 210d.

In the following tenth to fourteenth embodiments, an advancing direction of the parallel light which has transmitted through the input/output ports 210a to 210e and the microlens array 211 is defined as an optical axis direction (z direction: horizontal direction in FIG. 28A). The optical axis direction is also an optical axis direction of the optical system composed of the cylindrical lenses 212 and 213 and the lens 214. Also, an array direction of the input/output ports 210a to 210e and the microlens array 211 is defined as a first direction (y direction: direction orthogonal to z direction in FIG. 28A). Furthermore, a direction orthogonal to the z direction and the y direction is respectively called a second direction (x direction). When a deflection member such as a mirror and a prism not illustrated in the figure is disposed in an optical path of the actual wavelength selection switch in order to bend the optical path, descriptions of the x direction and the y direction are used on the premise of a virtual optical system in which such a deflection member is not provided.

The cylindrical lens 212 is a lens which contracts a luminous flux in the y direction, that is, which has refractive power in the y direction. A focal distance in the y direction by the cylindrical lens 212 is f1. The cylindrical lens (anamorphic lens) 13 is a lens which contracts the luminous flux in the x direction, that is, which has refractive power only in the x direction. The cylindrical lens 213 is disposed such that a focal position in the x direction coincides with a light collecting position in the y direction by the cylindrical lens 212. That is, the focal distance of the cylindrical lens 213 is shorter than the focal distance f1 of the cylindrical lens 212. Thus, input light which is turned into the parallel luminous flux by the microlens array 211 is collected roughly on a primary light collecting surface Sf through the incident position deviation correction element 220, the cylindrical lens 212 and the cylindrical lens 213. The incident position deviation correction element 220, the cylindrical lens 212 and the cylindrical lens 213 configure a beam shaping optical system 225.

The incident position deviation correction element 220 is a transmission-type optical element having a vertical angle in the x direction. The vertical angle in the x direction is changed depending on a position in the y direction. The incident position deviation correction element 220 is disposed so as to coincide with a position of a front-side focal distance f2 of the cylindrical lens 213.

A front-side focal position of the lens 214 coincides with the focal position of the input light by the incident position deviation correction element 220, the cylindrical lens 212 and the cylindrical lens 213. In other words, the front-side focal position of the lens 214 is positioned on the primary light collecting surface Sf. Furthermore, the optical axis of the optical system including the cylindrical lenses 212 and 213 and the lens 214 is disposed so as to pass through the input/output port 210c, for instance.

Also, the dispersion part 215 is disposed at such a position that both of a distance between the primary light collecting surface Sf and the lens 214 and a distance between the lens 214 and a dispersion (diffraction) surface of the dispersion part 215 are respectively a focal distance f3 of the lens 214.

As illustrated in FIG. 28B, the input light transmitted through the lens 214 is turned into the parallel luminous flux, is made incident on the dispersion part 215, and is diffracted at different angles for the respective wavelengths in the x direction on the dispersion surface of the dispersion part 215. That is, the dispersion part 215 separates the input light into the light of each wavelength included in the input light. Also, for simplicity, in FIG. 28A, the optical path in the z direction from the input/output part 210 to the deflector 217 is linearly illustrated. Furthermore, the lens 216 and the deflector 217 are disposed such that a distance from the dispersion surface of the dispersion part 215 to the lens 216 and a distance from the lens 216 to a deflection element surface (mirror surface) of deflection elements 218 of the deflector 217 are a focal distance f4 of the lens 216, respectively.

Thus, as illustrated in FIG. 28B, the light of each wavelength dispersed in the dispersion part 215 is turned into converged luminous fluxes that are parallel to each other by the lens 216, and made incident roughly vertically on deflection elements 218a to 218e corresponding to the respective wavelengths. Also, as illustrated in FIG. 28A, the input light which has passed through the light collecting point on the primary light collecting surface Sf is dispersed in the dispersion part 215, and is then collected at a height position where the optical axis of the lens 216 and the deflection element surface of the deflection elements 218 intersect within the yz plane. This means that the input light inputted from any of the input/output ports 210a to 210c and 210e is collected to the deflection elements 218 (any of the deflection elements 218a to 218e according to the wavelength) at the same height position.

The deflector 217 is a MEMS mirror array, for instance, and the deflection elements 218 are micromirrors configuring the MEMS mirror array. The deflection elements 218 are disposed in parallel at the height position of the optical axis of the lens 216 corresponding to the separated wavelength. For the deflection elements 218, the respective mirrors can be independently controlled to change the inclination. Especially, by changing the inclination within the yz plane in FIG. 28A, the incident light of each wavelength is reflected in a height direction different from an incident direction. Also, as illustrated in FIG. 28B, when viewed from the y direction, it is desirable that the light of each wavelength is made incident on the deflection elements 218a to 218e vertically, and is reflected vertically.

Also, an inclination control direction of the micromirrors is not limited to the yz plane. For instance, the inclination can be given for a rotation axis orthogonal to a rotation axis when inclined to the yz plane. By giving such an inclination, when viewed from the y direction, the light of the wavelength made incident on the micromirror is reflected in a direction different from the incident direction, crosstalk from the adjacent input port to the output port is suppressed and arbitrary optical attenuation can be given. Also, while only five deflection elements 218 are illustrated in FIG. 28B, the number of the deflection elements 218 is not limited to five.

The light of each wavelength reflected by the deflection elements 218a to 218e passes through the lens 216, is diffracted at the dispersion part 215, passes through the optical path in the opposite direction to the input light, and is outputted to the input/output port 210d other than those used for input in the input/output part 210.

Also, which input/output ports 210a to 210e is to be used for input or for output can be appropriately designed. That is, only the input/output port 210a may be used for input, and the other input/output ports for output, or the plurality of ports for input and the plurality of ports for output may be provided. FIG. 28A and FIG. 28B illustrate the case where, when the input/output ports 210a to 210c and 210e are the input ports and the input/output port 210d is the output port, the wavelength-multiplexed input light is inputted from the input/output port 210a and the output light of a specific wavelength is outputted from the input/output port 210d.

In FIG. 28A, for the input/output port 210a, a distance (image height) from the optical axis of the optical system by the cylindrical lenses 212 and 213 and the lens 214 is Y1. The input light from the input/output port 210a is collected on the primary light collecting surface Sf by the beam shaping optical system 225 as indicated by a solid line in FIG. 28A, is then turned into parallel light of which distance from the optical axis is Y2 by the lens 214, is dispersed into the respective wavelengths by the dispersion part 215, passes through the lens 216 and is collected to the deflection elements 218a to 218e for the respective wavelengths.

Here, when outputting the light of at least one specific wavelength of the light inputted to the deflection elements 218a to 218e from the input/output port 210d, the deflection direction of the corresponding deflection element 218 is controlled, and the light of the specific wavelength is reflected in a prescribed direction as indicated by a broken line in FIG. 28A. The light of the specific wavelength reflected by the deflection element 218 passes through the lens 216, and outputted from the input/output port 210d through the dispersion part 215, the lens 214, the beam shaping optical system 225 and the corresponding microlens of the microlens array 211. When there are the plurality of light beams of the wavelengths to be outputted to the same input/output ports 210d, the plurality of light beams of the wavelengths are multiplexed in the dispersion part 215.

Next, a function of the beam shaping optical system 225 will be described with reference to FIG. 30. FIG. 30 is a diagram for describing a behavior of a beam from the input/output ports 210a to 210e to the vicinity of the light collecting point in FIG. 28 and in the vicinity of the deflection element 218. In the diagram, the input/output port 210a and the input/output port 210c are both used as the ports for input.

First, in this embodiment, the cylindrical lens 212 with the refractive power in the Y direction and the cylindrical lens 213 with the refractive power in the x direction are disposed at different positions on the optical path, and the cylindrical lens 213 is provided with the greater refractive power. That is, the optical system has a larger numerical aperture in the x direction. Therefore, on the primary light collecting surface Sf, the input light from the input/output port 210c is an elliptic spot B1 as indicated by a solid line in FIG. 30. The elliptic spot B1 is image-formed as an elliptic spot B2 on the deflection element surface Sm in conjugate relationship as indicated by the solid line in FIG. 30 by the lenses 214 and 216.

In this embodiment, since the lenses 214 and 216 comprise the same element, the elliptic spots B1 and B2 are in the conjugate relationship of equal magnification and are almost the same shape. To be exact, while the magnification in the y direction is 1, the magnification in the x direction is slightly shifted from 1 since the light made incident on the dispersion part 215 at an incident angle other than Littrow is beam-shaped. Since the spot is separated for each wavelength by the dispersion part 215, the plurality of spots are lined in parallel in the horizontal direction which is the separation direction of the wavelength.

Here, in order to switch many wavelengths by the wavelength selection switch, it is needed to make a frequency interval of the light of each wavelength included in the input light narrower. Especially, in 50-GHz spacing that an occupancy wavelength bandwidth is narrow, it is needed to collect light at the spot of the narrower width using the deflection element 218 narrower in the separation direction of the wavelength. As in this embodiment, by shaping the spot shape of the beam on the deflection element surface Sm into an elliptic shape having a mirror axis in the dispersion direction of the dispersion part 215 by using the beam shaping optical system 225, the resolution of the wavelength is increased, and the occurrence of crosstalk due to incidence of the light of the different wavelength on the same deflection element 218 is prevented.

Also, the incident position deviation correction element 220 has a function of correcting port dependency of a center wavelength deviation generated by the lens 216.

Figure 31A:
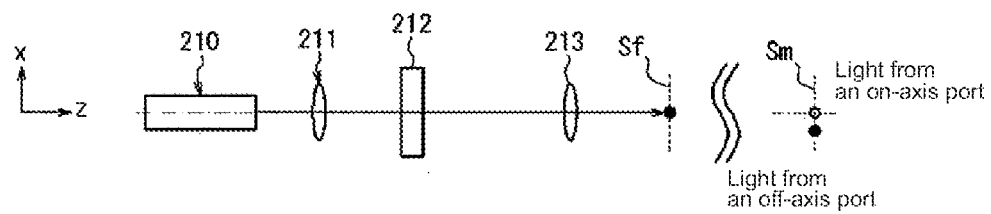
FIG. 31A is a diagram illustrating a behavior of a beam near the beam shaping optical system and a deflection part when there is no incident position deviation correction element, in the configuration of the wavelength selection switch of the tenth embodiment.

Here, when the incident position deviation correction element 220 is not provided, the light separated into the respective wavelengths to be emitted from the dispersion part 215 generates inter-port dependency of the center wavelength deviation according to an aberration of the lens 216. FIG. 31A is a diagram illustrating the behavior of the beam near the beam shaping optical system 225 and the deflector 217 in a configuration without the incident position deviation correction element 220.

Figure 31B:
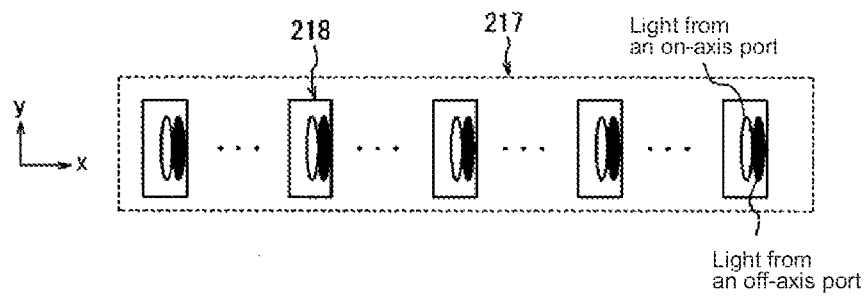
FIG. 31B is a diagram illustrating a center wavelength deviation of an incident beam on a deflection element surface which is caused by the configuration in FIG. 31A.

In this case, on the deflection element surface Sm, the light from an off-axis port is made incident on a position shifted in the x direction with respect to the light from an on-axis port. That is, the light separated into each wavelength is made eccentric in the same direction with respect to the optical axis of the lens 216 and made incident. As a result, the center wavelength deviation tends to be generated in the same direction (the array direction of the deflection element 218) for all the wavelengths as illustrated in FIG. 31B. It is clear that the center wavelength deviation depends on the height of the port and becomes more evident as the number of ports is increased. Then, the center wavelength deviation leads to degradation of the communication quality of the wavelength selection switch, such as the degradation of a transmission band, the degradation of coupling efficiency due to destruction of the optical conjugate relationship of the input/output ports and occurrence of the crosstalk to the other input/output ports of the light not to be coupled.

Figure 31C:
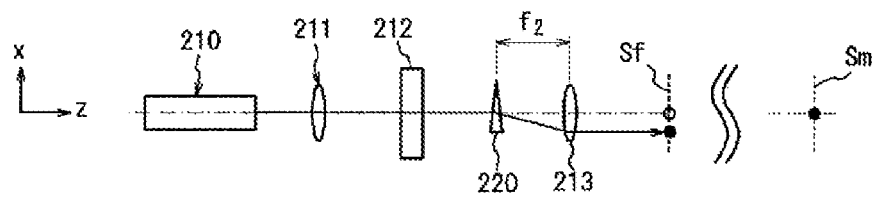
FIG. 31C is a diagram illustrating a behavior of the beam near the beam shaping optical system and the deflection part in the wavelength selection switch of the tenth embodiment.

In this embodiment, in order to correct the port dependency of such a center wavelength deviation, the incident position deviation correction element 220 is provided. FIG. 31C is a diagram illustrating the behavior of the beam near the beam shaping optical system 225 and the deflector 217 in the configuration in this embodiment provided with the incident position deviation correction element 220. In the configuration, the light from the off-axis port is deflected to light with an angle different from the light from the on-axis port within the xz plane when being emitted from the incident position deviation correction element 220 installed at the front-side focal position of the cylindrical lens 213. Therefore, the light from the off-axis port is at the same angle within the xz plane as that of the light from the on-axis port when emitted from the cylindrical lens 213, but is made incident on the primary light collecting surface Sf at a position shifted in an x axis direction.

Here, when only the light of one wavelength is extracted and taken into consideration, since the primary light collecting surface Sf and the deflection element surface Sm are in the conjugate relationship, parallel movement of the spot in the x axis direction on the primary light collecting surface Sf causes the parallel movement of the spot in the x axis direction (the array direction of the deflection element 218) on the deflection element surface Sm. Thus, the port dependency of the center wavelength deviation to be caused in the optical system of the subsequent stage can be corrected. Also, since the incident position deviation correction element 220 is provided on the front-side focal position of the cylindrical lens 213, influence on the incident angle within the xz plane onto the primary light collecting surface Sf is small. Therefore, the incident angle within the xz plane is hardly influenced on the deflection element surface Sm as well.

Figure 31D:
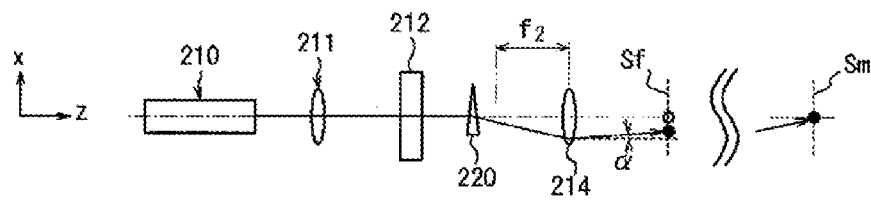
FIG. 31D is a diagram illustrating another arrangement example of the incident position correction element in the wavelength selection switch of the tenth embodiment.

The incident position deviation correction element 220 can be disposed in front of the front-side focal position of the cylindrical lens 213 as illustrated in FIG. 31D. In this case, the light inputted from the respective input/output ports is collected in a y axis direction toward the primary light collecting surface Sf by the action of the cylindrical lens 212. Therefore, by providing the incident position deviation correction element 220 on a position near the cylindrical lens 212, a correction effect can be made to act on the light from the respective ports in the state of separating the light from the respective input/output ports more. However, in this case, since an incident angle change cc within the xz plane onto the deflection element surface Sm is generated simultaneously, the correct effect is possible only in an allowable range of the incident angle determined by characteristics of the deflection element. Also, if an allowable range of the incident angle to the deflection element is satisfied, the incident position deviation correction element 220 can be disposed behind the front-side focal position of the cylindrical lens 213. In this description, the arrangement range of the incident position deviation correction element 220 is called as the vicinity of the front-side focal position of the cylindrical lens 213. To be more optimum, it is preferable to configure the cylindrical lens 213 so as to separate the front-side focal position and rear-side focal position of the cylindrical lens 213.

Next, a concrete configuration example of the incident position deviation correction element 220 will be described.

Figure 32A:
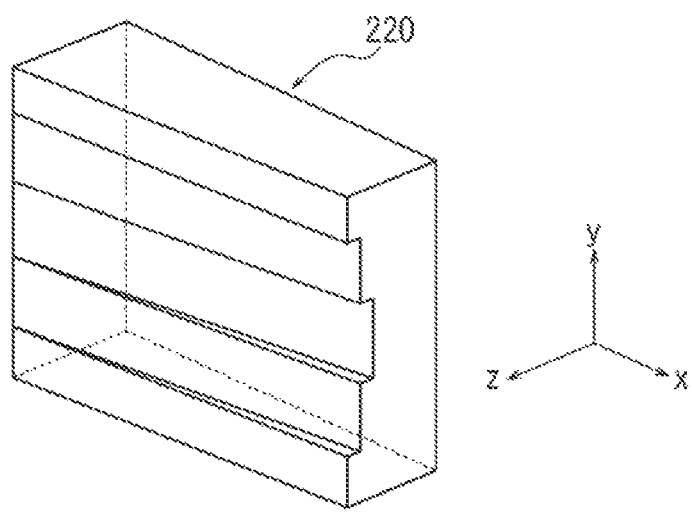
FIG. 32A is a perspective view schematically illustrating a configuration of one example of the incident position deviation correction element in the wavelength selection switch of the tenth embodiment.
Figure 32B:
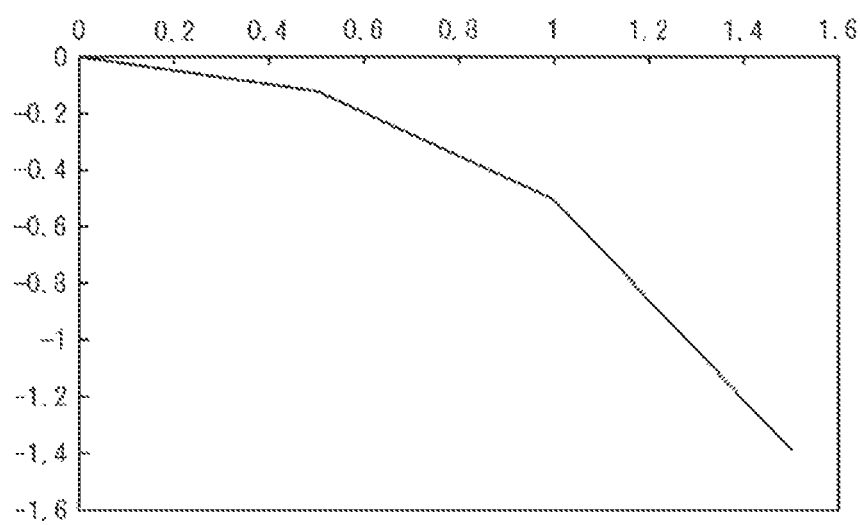
FIG. 32B is a diagram illustrating change of a vertical angle from a center part of a refraction surface to a height of input/output ports of the incident position deviation correction element in FIG. 32A.

FIG. 32A is a perspective view illustrating a configuration of one example of the incident position deviation correction element 220 in FIG. 28A and FIG. 28B. FIG. 32B is a diagram illustrating change (vertical axis) of the vertical angle from a center part of a refraction surface to the height (horizontal axis) of the input/output ports of the incident position deviation correction element 220 in FIG. 32A. FIG. 32A schematically illustrates the configuration corresponding to five input/output ports, and FIG. 32B illustrates the change of the vertical angle corresponding to a representative input/output port of ten or more actually provided input/output ports. The incident position deviation correction element 220 comprises a light transmissive member such as glass. In FIG. 32A, a front side is a surface for giving different center wavelength deviation correction effects to the respective input/output ports, and the back surface side is a plane. Actually, it is preferable to turn the plane side to the input/output port side.

Also, for the incident position deviation correction element 220, the vertical angle within the xz plane is made discretely different by the position in the first direction (y direction). More specifically, a boundary of the refraction surfaces corresponding to the respectively different input/output ports 210a to 210e is provided with a step so that the light from each input/output ports is made incident on the position of each uniform vertical angle, while the light from the different input/output ports is made incident on a surface having the different vertical angle. Thus, the incident position onto the deflection element surface Sm of the luminous flux passing through a position separated from the optical axis in the y direction is shifted in a direction of offsetting the center wavelength deviation generated by the optical system of the subsequent stage. Also, it is desirable that the incident position deviation correction element 220 has the configuration symmetrical in the y direction to the optical axis.

Figure 33A:
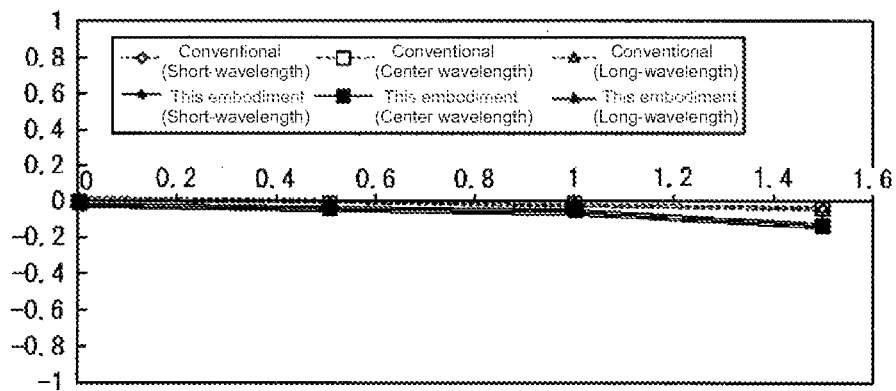
FIG. 33A is a diagram illustrating a simulation result of an incident angle within an xz plane of input light on a deflection element surface to the height of the input/output ports in the wavelength selection switch of the tenth embodiment.
Figure 33B:
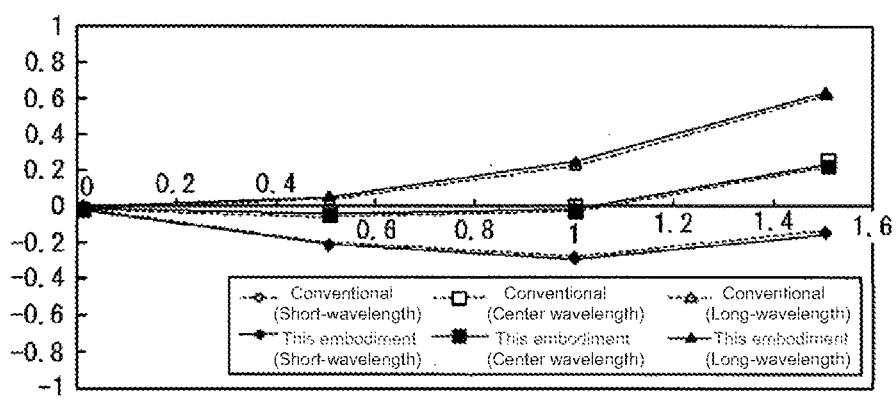
FIG. 33B is a diagram illustrating a simulation result of an incident position deviation in a y-axis direction of the input light on the deflection element surface to the height of the input/output ports in the wavelength selection switch of the tenth embodiment.
Figure 33C:
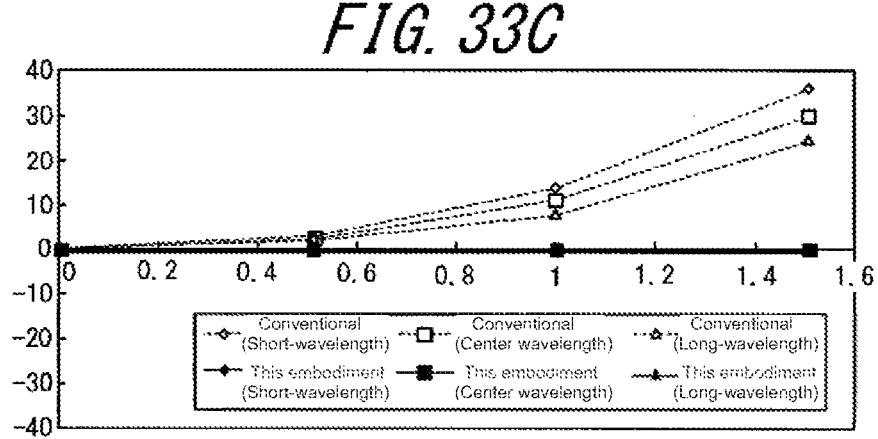
FIG. 33C is a diagram illustrating a simulation result of an incident position deviation (center wavelength deviation) in an x-axis direction of the input light on the deflection element surface to the height of the input/output ports in the wavelength selection switch of the tenth embodiment.

FIG. 33A to FIG. 33C are diagrams illustrating respective simulation results of the incident angle within the xz plane (FIG. 33A), the incident position deviation in the y axis direction (FIG. 33B), and the incident position deviation in the x axis direction (FIG. 33C) of the input light on the deflection element surface Sm to the height (horizontal axis) of the input/output ports. Also, in FIG. 33A to FIG. 33C, the solid line indicates the simulation results in the case of using the incident position deviation correction element 220 illustrated in FIG. 32A and FIG. 32B, and the broken line indicates the simulation results in the case of disposing the same optical system in the subsequent stage without using the incident position deviation correction element 220. Also, in FIG. 33A and FIG. 33B, for the vertical axis, allowable values of the design are respectively standardized as 1 and relatively expressed and an absolute value is not indicated. As clarified from FIG. 33A to FIG. 33C, by the incident position deviation correction element 220, only the incident position deviation (center wavelength deviation) indicated in FIG. 33C can be effectively corrected without affecting the other characteristics indicated in FIG. 33A and FIG. 33B.

As described above, the wavelength selection switch according to this embodiment includes the incident position deviation correction element 220 which corrects the input light inputted from the input/output ports 210a to 210c and 210e so as not to generate the center wavelength deviation on the deflection element surface of the respective deflection elements 218 no matter from which input/output ports 210a to 210c and 210e the input light is inputted, and collects the input light. Thus, the light of each wavelength dispersed by the dispersion part 215 can be highly accurately collected on the deflection element surface of the deflection element 218 independent of the position of the input/output ports 210*a* to 210*c* and 210*e* to which the input light is inputted. Therefore, the degradation of the transmission band caused by the center wavelength deviation, the degradation of the coupling efficiency due to the destruction of the optical conjugate relationship of the input/output ports, and the crosstalk to the other input/output ports of the light not to be coupled can be suppressed, and the communication quality can be improved.

Also, since the incident position deviation correction element 220 is provided inside the beam shaping optical system 225 which tentatively collects the input light inputted from the input/output ports 210*a* to 210*c* and 210*e* to the primary light collecting surface Sf, the configuration can be small in size.

Also, the light collecting mirror 300 or the light collecting lens 310 has the same function as that of the lenses 214 and 216 in FIG. 28A and FIG. 28B. By such arrangement, the light can be converged/parallelized by the same optical element in the preceding stage and subsequent stage of the dispersion part 215. Thus, it is not needed to increase a device size within a plane vertical to the arrangement direction of the input/output ports in order to avoid physical interference of different lens elements. Also, since it is not needed to avoid the physical interference, the degree of freedom of selecting the dispersion element is increased.

Eleventh Embodiment

Figure 34A:
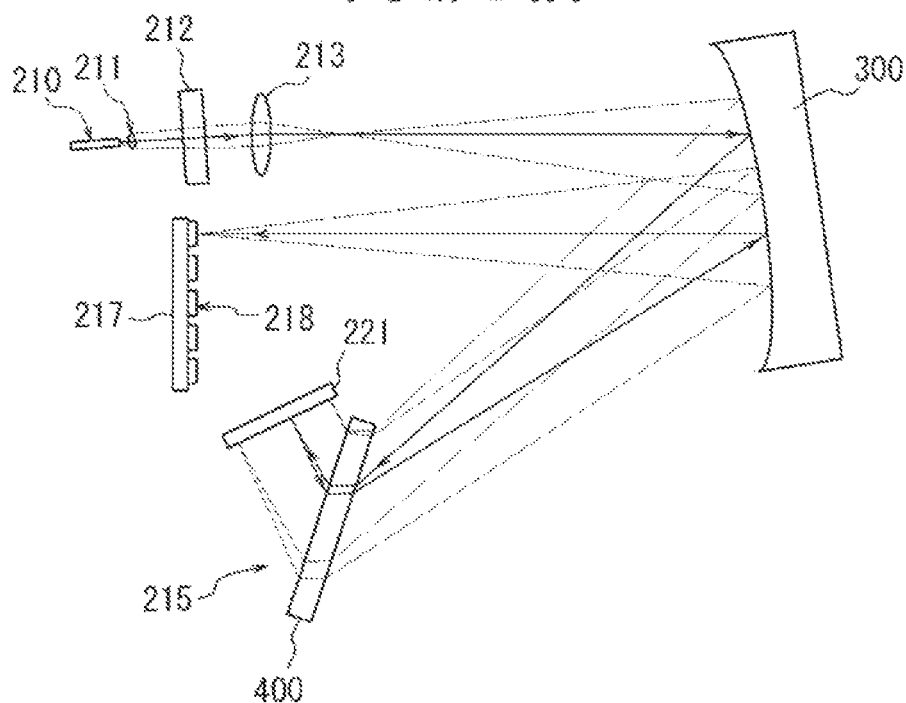
FIG. 34A is a top view illustrating a configuration of a wavelength selection switch according to an eleventh embodiment.

FIG. 34A is a top view illustrating a configuration of the wavelength selection switch according to the eleventh embodiment. For the wavelength selection switch according to this embodiment, in the configuration illustrated in FIG. 29A, a function of the incident position deviation correction element 220 and a function of the reflection mirror 410 configuring the dispersion part 215 of the Littman-Metcalf configuration are provided in one incident position deviation correction element 221. Since the other configurations are the same as those of the tenth embodiment, the same reference signs are assigned to the same components and descriptions are omitted.

Figure 34B:
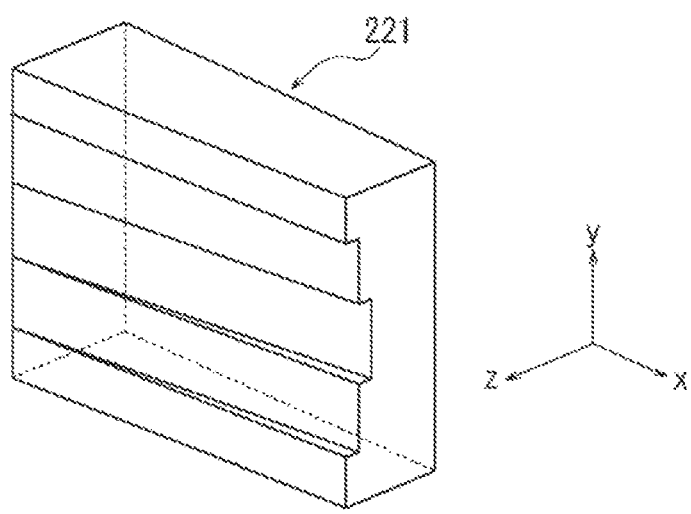
FIG. 34B is a perspective view schematically illustrating a configuration of one example of an incident position deviation correction element in FIG. 34A.
Figure 34C:
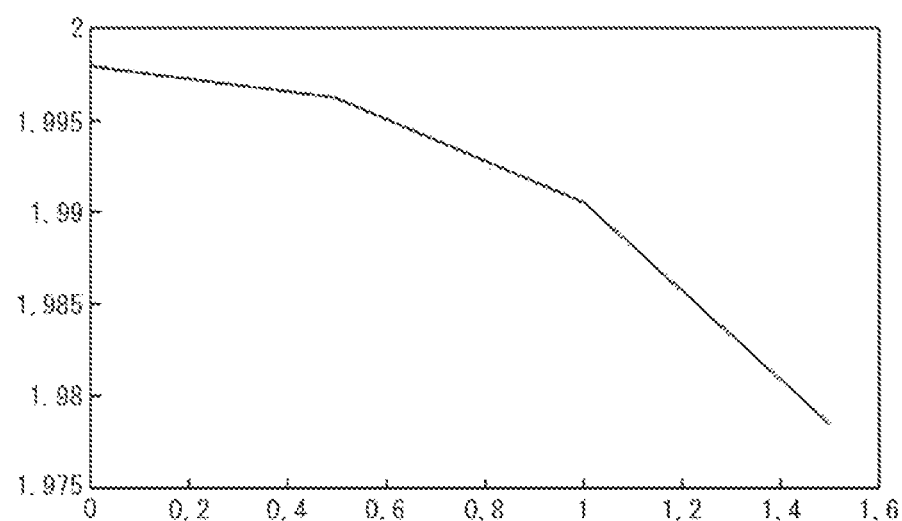
FIG. 34C is a diagram illustrating a reflection surface angle of the incident position deviation correction element in FIG. 34B.

FIG. 34B is a perspective view illustrating a configuration of one example of the incident position deviation correction element 221 in FIG. 34A. FIG. 34C is a diagram illustrating a reflection surface angle (vertical axis) to the height (horizontal axis) of the input/output ports of the incident position deviation correction element 221 in FIG. 34B. Also, FIG. 34B schematically illustrates the configuration corresponding to five input/output ports, and FIG. 34C illustrates the change of the vertical angle corresponding to a representative input/output port of ten or more actually provided input/output ports. For the incident position deviation correction element 221, a normal direction within the xz plane of the reflection surface is made discretely different by the position in the first direction (y direction). More specifically, a boundary of the reflection surfaces corresponding to the respectively different input/output ports 210*a* to 210*e* is provided with a step so that the light from each input/output port is made incident on the position of each uniform normal direction within the xz plane, while the light from each different input/output port is made incident on a surface having the different normal direction within the xz plane. Thus, the incident position onto the deflection element surface Sm of the luminous flux passing through a position separated from the optical axis in the y direction is shifted in a direction of offsetting the center wavelength deviation.

Also, it is desirable that the incident position deviation correction element 221 has the configuration symmetrical in the y direction to the optical axis.

Next, the action of the incident position deviation correction element 221 will be described. As illustrated in FIG. 28A, the deflector 217 and the dispersion part 215 are provided at a distance of f4 respectively to the lens 216. Therefore, a position deviation at the position of the deflector 217 is equivalent to an angle deviation in the dispersion part 215. Thus, in this embodiment, by changing the reflection surface angle of the incident position deviation correction element 221 in the dispersion part 215 so as to correspond to the input/output ports 210*a* to 210*e*, the correction effects similar to that of the tenth embodiment can be obtained.

Figure 35A:
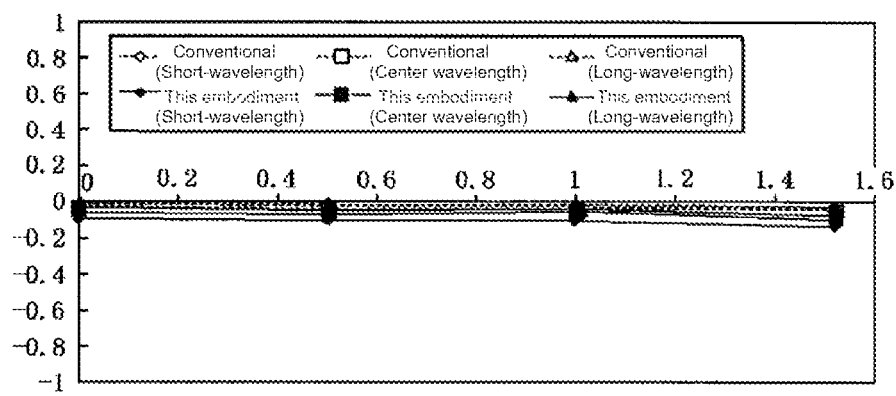
FIG. 35A is a diagram illustrating a simulation result of an incident angle within an xz plane of the input light on a deflection element surface to the height of input/output ports in the wavelength selection switch of the eleventh embodiment.
Figure 35B:
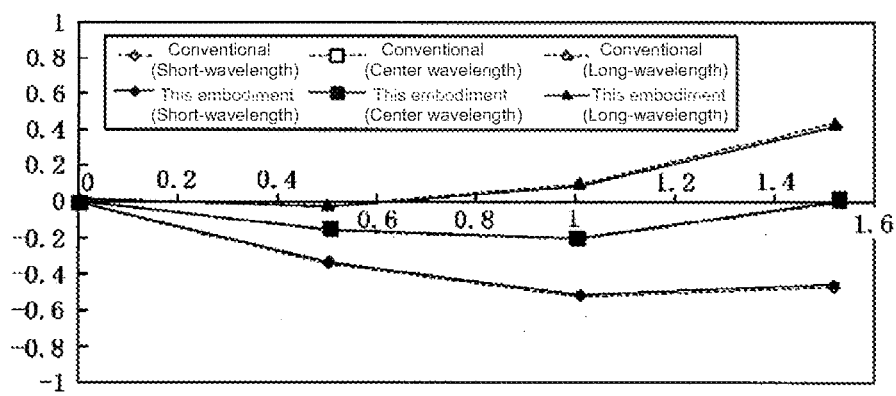
FIG. 35B is a diagram illustrating a simulation result of the incident position deviation in the y-axis direction of the input light on the deflection element surface to the height of the input/output ports in the wavelength selection switch of the eleventh embodiment.
Figure 35C:
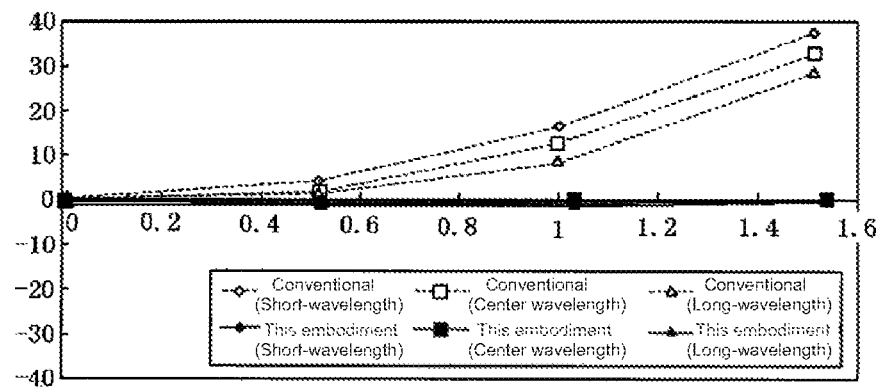
FIG. 35C is a diagram illustrating a simulation result of the incident position deviation (center wavelength deviation) in the x-axis direction of the input light on the deflection element surface to the height of the input/output ports in the wavelength selection switch of the eleventh embodiment.

FIG. 35A to FIG. 35C are diagrams illustrating respective simulation results of the incident angle within the xz plane (FIG. 35A), the incident position deviation in the y axis direction (FIG. 35B), and the incident position deviation in the x axis direction (FIG. 35C) of the input light on the deflection element surface Sm to the height (horizontal axis) of the input/output ports. Also, in FIG. 35A to FIG. 35C, the solid line indicates the simulation results in the case of using the incident position deviation correction element 221 illustrated in FIG. 34B, and the broken line indicates the simulation results in the case of disposing the optical system which is the same except that the incident position deviation correction element 221 is not used. Also, in FIG. 35A and FIG. 35B, for the vertical axis, allowable values of the design are respectively standardized as 1 and relatively expressed and an absolute value is not indicated. As clarified from FIG. 35A to FIG. 35C, by the incident position deviation correction element 221, only the incident position deviation (center wavelength deviation) indicated in FIG. 35C can be effectively corrected without affecting the other characteristics indicated in FIG. 35A and FIG. 35B.

As described above, the wavelength selection switch according to this embodiment includes the incident position deviation correction element 221 which corrects the input light inputted from the input/output ports 210*a* to 210*c* and 210*e* so as not to generate the center wavelength deviation on the deflection element surface Sm of the respective deflection elements 218 no matter from which input/output ports 210*a* to 210*c* and 210*e* the input light is inputted, and collects the input light. Thus, similarly to the case of the tenth embodiment, the light of each wavelength dispersed by the dispersion part 215 can be highly accurately collected on the deflection element surface Sm of the deflection element 218 independent of the position of the input/output ports 210*a* to 210*c* and 210*e* to which the input light is inputted. Therefore, similarly to the case of the tenth embodiment, the degradation of the transmission band caused by the center wavelength deviation, the degradation of the coupling efficiency due to the destruction of the optical conjugate relationship of the input/output ports, and the crosstalk to the other input/output ports of the light not to be coupled can be suppressed, and the communication quality can be improved.

In this embodiment, since the function of the incident position deviation correction element is added to the mirror which functions as an element of the dispersion part 215 of the Littman-Metcalf configuration, the configuration is not accompanied by increase in the number of components. Also, in the dispersion part 215, since the input light inputted from the input/output ports 210*a* to 210*c* and 210*e* is made incident roughly in parallel within the yz plane, the separation degree of the input light can be increased. Thus, since the incidence of a part of the input light on a reflection surface part corresponding to the other input/output ports can be suppressed with high accuracy, unintended crosstalk can be suppressed.

Also, in this embodiment, the incident position deviation correction element 221 may add angle change within the xz plane to each input light inputted from the input/output ports 210a to 210c and 210e near the dispersion part 215 separated from the light collecting mirror 300 (the lens 216 in FIG. 28A) by f4. Thus, the angle of the refraction surface of the diffraction grating 400 may be changed for each port or a refraction-type element as illustrated in the tenth embodiment may be added to the dispersion part 215.

Twelfth Embodiment

Figure 36A:
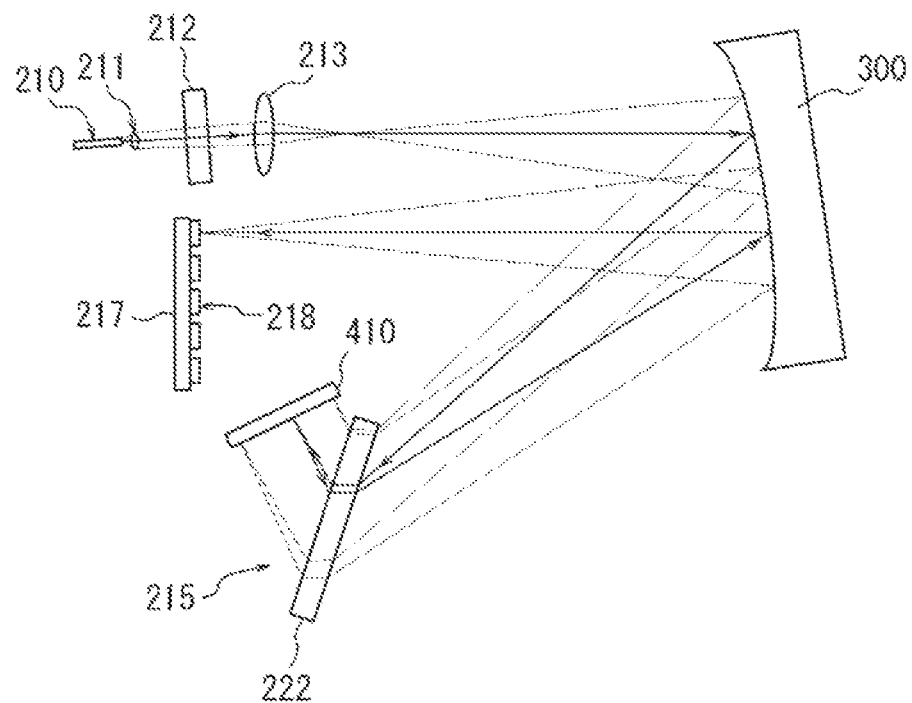
FIG. 36A is a top view illustrating a configuration of a wavelength selection switch according to a twelfth embodiment.

FIG. 36A is a top view illustrating a configuration of the wavelength selection switch according to the twelfth embodiment. For the wavelength selection switch according to this embodiment, in the configuration illustrated in FIG. 29A, a function of the incident position deviation correction element 220 and a function of the diffraction grating 400 configuring the dispersion part 215 of the Littman-Metcalf configuration are provided in one incident position deviation correction element 222. Since the other configurations are the same as those of the tenth embodiment, the same reference signs are assigned to the same components and descriptions are omitted.

Figure 36B:
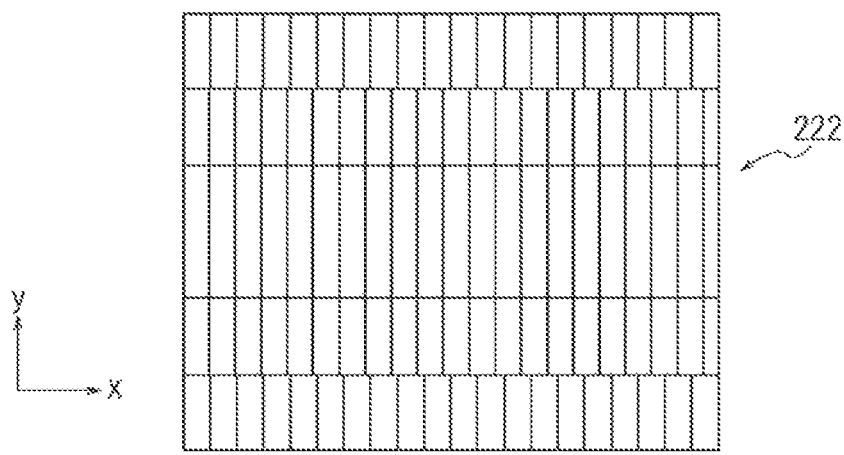
FIG. 36B is a front view illustrating a configuration of one example of an incident position deviation correction element in FIG. 36A.
Figure 36C:
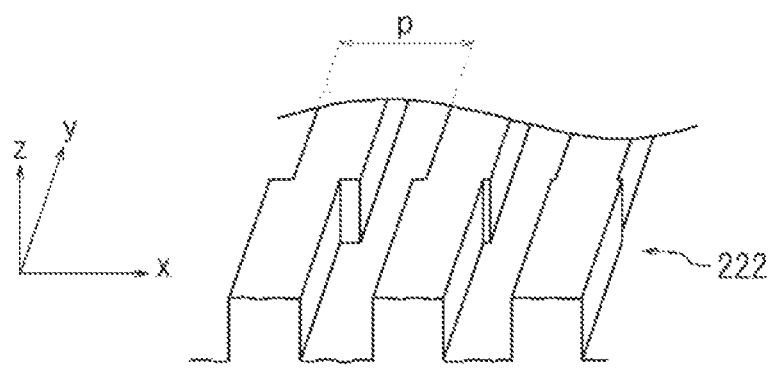
FIG. 36C is a partially enlarged perspective view of the incident position deviation correction element in FIG. 36B.
Figure 36D:
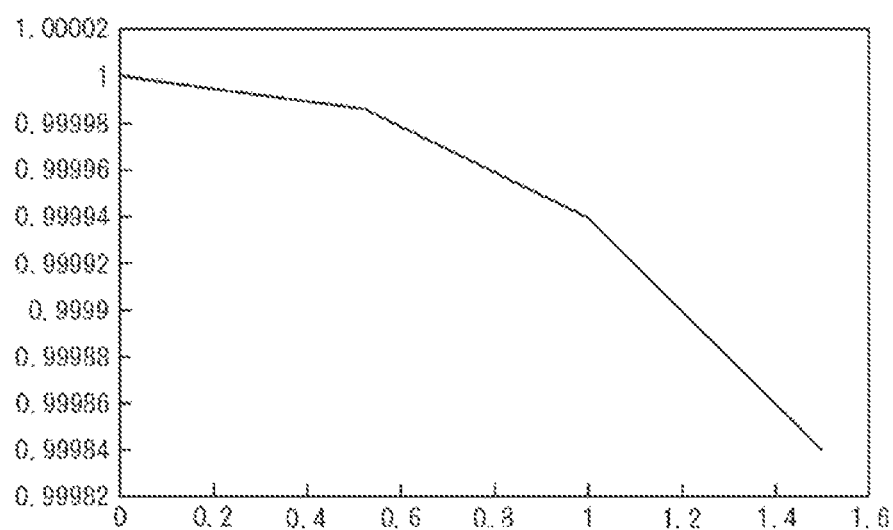
FIG. 36D is a diagram illustrating pitch change (relative value) of a diffraction grating of the incident position deviation correction element in FIG. 36B.

FIG. 36B and FIG. 36C are a front view and a partially enlarged perspective view illustrating a configuration of one example of the incident position deviation correction element 222 in FIG. 36A. Also, FIG. 36D is a diagram illustrating the pitch change of the diffraction grating to the height (horizontal axis) of the input/output ports of the incident position deviation correction element 222 by a relative value (vertical axis). Also, FIG. 36B schematically illustrates the configuration corresponding to five input/output ports, and FIG. 36D illustrates the pitch change corresponding to a representative input/output port of ten or more actually provided input/output ports. The incident position deviation correction element 222 has a plurality of areas in the y axis direction as illustrated in FIG. 36B and FIG. 36C, and a pitch p of the diffraction grating is different for each of the respective areas. Also, the inside of each area comprises the diffraction grating formed of a fixed pitch p. More specifically, the light from the respective input/output ports is made incident on the respectively uniform area, however, the light from the different input/output ports is made incident on the different area. Also, at the boundary of the areas corresponding to the respectively different input/output ports 210a to 210e, a grating shape is discontinuous. Thus, the incident position onto the deflection element surface Sm of the luminous flux passing through a position separated from the optical axis in the first direction (y direction) is shifted in a direction of offsetting the center wavelength deviation. Also, it is desirable that the incident position deviation correction element 222 is in the configuration symmetrical in the y direction to the optical axis.

Next, the action of the incident position deviation correction element 222 will be described. As illustrated in FIG. 28A, the deflector 217 and the dispersion part 215 are provided at a distance of f4 respectively to the lens 216. Therefore, a position deviation at the position of the deflector 217 is equivalent to an angle deviation in the dispersion part 215. Thus, in this embodiment, by changing the reflection surface angle of the incident position deviation correction element 222 in the dispersion part 215 so as to correspond to the input/output ports 210a to 210e, the correction effects similar to that of the tenth embodiment can be obtained.

Figure 37A:
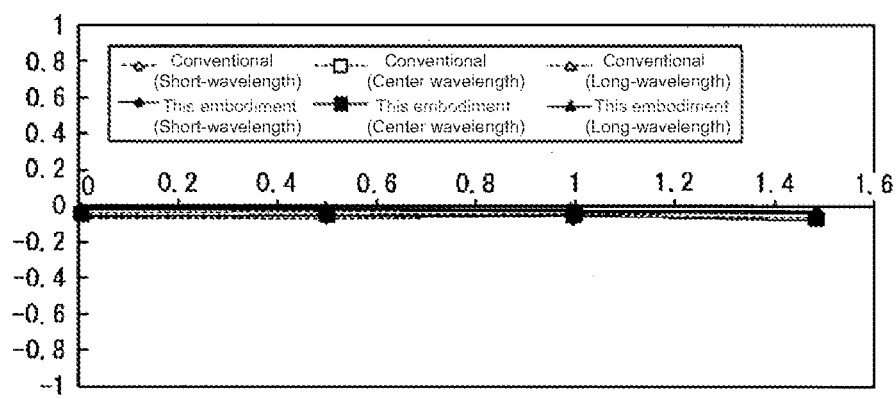
FIG. 37A is a diagram illustrating a simulation result of an incident angle within the xz plane of an input light on the deflection element surface to the height of input/output ports in the wavelength selection switch of the twelfth embodiment.
Figure 37B:
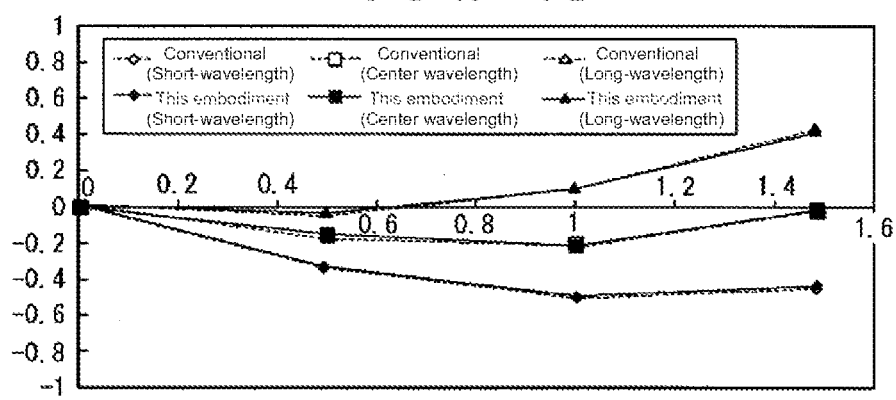
FIG. 37B is a diagram illustrating a simulation result of the incident position deviation in the y-axis direction of the input light on the deflection element surface to the height of the input/output ports in the wavelength selection switch of the twelfth embodiment.
Figure 37C:
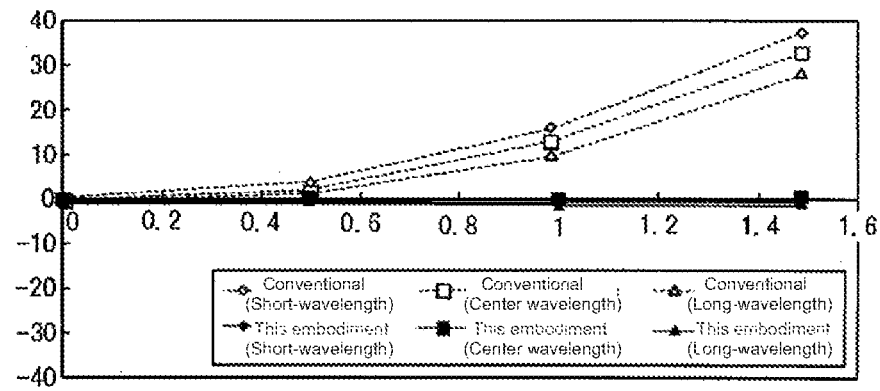
FIG. 37C is a diagram illustrating a simulation result of the incident position deviation (center wavelength deviation) in the x-axis direction of the input light on the deflection element surface to the height of the input/output ports in the wavelength selection switch of the twelfth embodiment.

FIG. 37A to FIG. 37C are diagrams illustrating respective simulation results of the incident angle within the xz plane (FIG. 37A), the incident position deviation in the y axis direction (FIG. 37B), and the incident position deviation in the x axis direction (FIG. 37C) of the input light on the deflection element surface Sm to the height (horizontal axis) of the input/output ports. Also, in FIG. 37A to FIG. 37C, the solid line indicates the simulation results in the case of using the incident position deviation correction element 222 illustrated in FIG. 36B and FIG. 36C, and the broken line indicates the simulation results in the case of disposing the same optical system except that the incident position deviation correction element 222 is not used. Also, in FIG. 37A and FIG. 37B, for the vertical axis, allowable values of the design are respectively standardized as 1 and relatively expressed and an absolute value is not indicated. As clarified from FIG. 37A to FIG. 37C, by the incident position deviation correction element 222, only the incident position deviation (center wavelength deviation) indicated in FIG. 37C can be effectively corrected without affecting the other characteristics indicated in FIG. 37A and FIG. 37B.

As described above, the wavelength selection switch according to this embodiment includes the incident position deviation correction element 222 which corrects the input light inputted from the input/output ports 210a to 210c and 210e so as not to generate the center wavelength deviation on the deflection element surface of the respective deflection elements 218 no matter from which input/output ports 210a to 210c and 210e the input light is inputted, and collects the input light. Thus, similarly to the case of the above-described embodiments, the light of each wavelength dispersed by the dispersion part 215 can be highly accurately collected on the deflection element surface of the deflection element 218 independent of the position of the input/output ports 210a to 210c and 210e to which the input light is inputted. Therefore, similarly to the case of the above-described embodiments, the degradation of the transmission band caused by the center wavelength deviation, the degradation of the coupling efficiency due to the destruction of the optical conjugate relationship of the input/output ports, and the crosstalk to the other input/output ports of the light not to be coupled can be suppressed, and the communication quality can be improved.

Also, in this embodiment, since the function of the incident position deviation correction element is added to the diffraction grating which functions as an element of the dispersion part 215 of the Littman-Metcalf configuration, the configuration is not accompanied by increase in the number of components. Also, in the dispersion part 215, since the input light inputted from the input/output ports 210a to 210c and 210e is made incident roughly in parallel within the yz plane, the separation degree of the input light can be increased. Thus, since the incidence of a part of the input light on a reflection surface part corresponding to the other input/output ports can be suppressed with high accuracy, unintended crosstalk can be suppressed.

Furthermore, since the diffraction grating is generally manufactured using a lithography technique using a mask or using a master, by setting a condition once, the incident position deviation correction element 222 for which the relative value of the pitch p in each area is fixed can be manufactured more easily with superior reproducibility over the case of controlling an external shape.

Thirteenth Embodiment

Figure 38A:
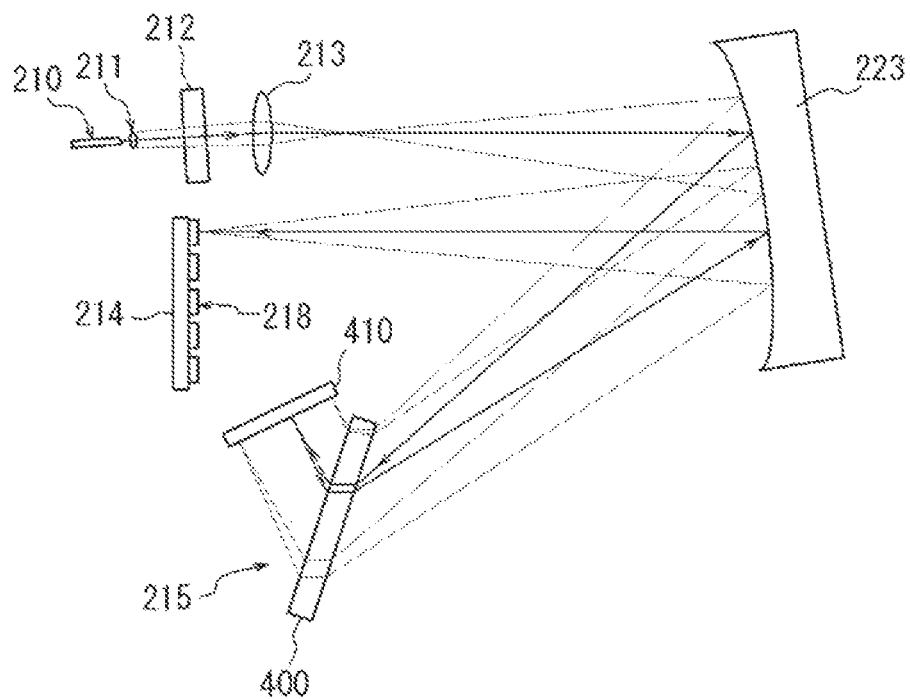
FIG. 38A is a top view illustrating a configuration of a wavelength selection switch according to a thirteenth embodiment.

FIG. 38A is a top view illustrating a configuration of the wavelength selection switch according to the thirteenth embodiment. For the wavelength selection switch according to this embodiment, in the configuration illustrated in FIG. 29A, a function of the incident position deviation correction element 220 and a function of the light collecting mirror 300 are provided in one incident position deviation correction element 223. Since the other configurations are the same as the tenth embodiment, the same reference signs are assigned to the same components and descriptions are omitted.

Figure 38B:
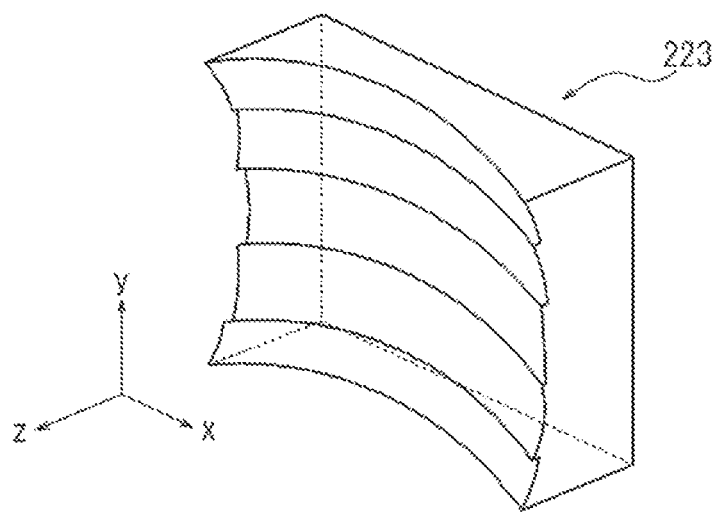
FIG. 38B is a perspective view illustrating a configuration of one example of an incident position deviation correction element in FIG. 38A.
Figure 38C:
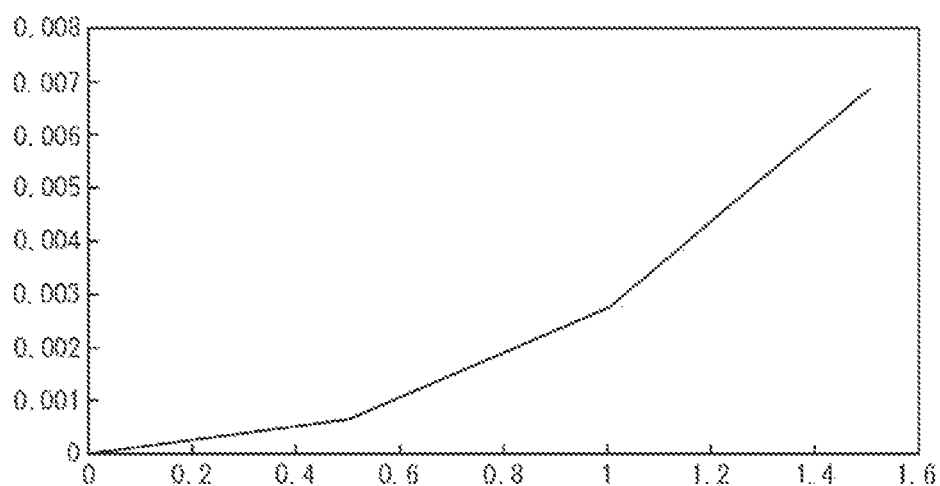
FIG. 38C is a diagram illustrating a relative value of a plane-normal angle of the incident position deviation correction element in FIG. 38B.

FIG. 38B is a perspective view illustrating a configuration of one example of the incident position deviation correction element 223 in FIG. 38A. FIG. 38C is a diagram illustrating relative values (vertical axis) of a plane-normal angle θ to the height (horizontal axis) of the input/output ports of the incident position deviation correction element 223 in FIG. 38B. Also, FIG. 38B schematically illustrates the configuration corresponding to five input/output ports, and FIG. 38C illustrates the relative value of the plane-normal angle θ corresponding to a representative input/output port of ten or more actually provided input/output ports. The incident position deviation correction element 223, as illustrated in FIG. 38B, has a plurality of areas in the y axis direction, and the angle θ within the xz plane of plane-normal is different in each of the respective areas. Also, inside of each area comprises a continuous surface that can be described by one continuous function of x, y. Here, the continuous function of x, y is, for example, a spherical surface, a parabolic surface or a general aspherical surface or the like. Then, the light from the respective input/output ports is made incident on the respectively uniform areas, however, the light from the different input/output ports is made incident on the different areas.

Figure 39A:
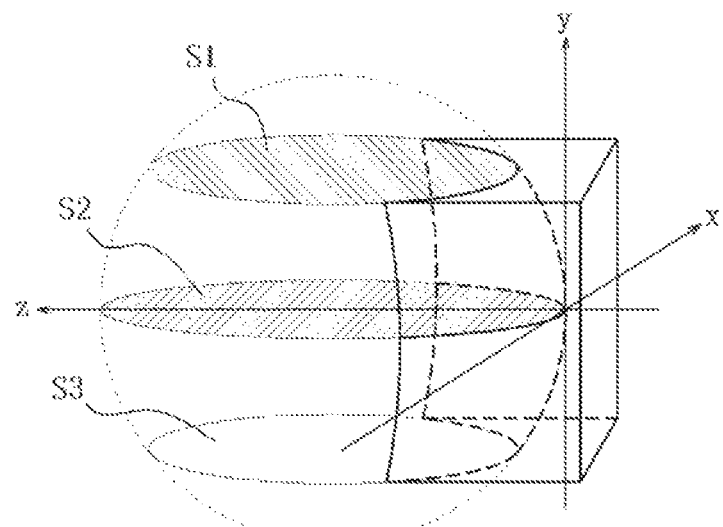
FIG. 39A is a diagram illustrating a spherical mirror shape when not having an incident position deviation correction function.
Figure 39B:
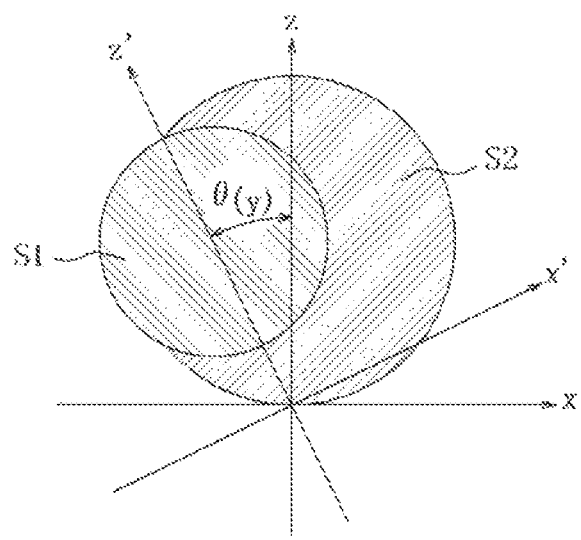
FIG. 39B is a diagram for describing the spherical mirror shape when having the incident position deviation correction function.

Next, the configuration of the incident position deviation correction element 223 will be described further in detail while referring to FIG. 39A and FIG. 39B. Here, for simplicity, a spherical mirror shape will be described. FIG. 39A illustrates a configuration of a normal spherical mirror without an incident position deviation correction function. FIG. 39B illustrates a configuration of a spherical mirror with the incident position deviation correction function. In the case of the normal spherical mirror without the incident position deviation correction function, as illustrated in FIG. 39A, respective xz cross sections S1, S2, and S3 at positions different in the y axis direction have a concentric circular shape within the xz plane.

In contrast, as in this embodiment, in the case of the spherical mirror with the incident position deviation correction function, as illustrated in FIG. 39B, a spherical core is different within the xz plane for each area corresponding to the incident position of the light from the different input/output ports. FIG. 39B illustrates the case where the spherical cores of xz cross sections S1 and S2 of spherical surfaces corresponding to the respective areas of two different input/output ports are different within the xz plane by θ(y) on the xz plane. Also, within both areas, the centers of the circles of the cross sections coincide with each other. Here, a rotation angle amount θ(y) of the respective areas corresponding to the incident position of the light from the different input/output ports is defined by a rotation amount when a y axis at a surface top on the optical axis is the rotation axis, for instance. Thus, the incident position onto the deflection element surface Sm of the luminous flux passing through a position separated from the optical axis in the y direction is shifted in a direction of offsetting the center wavelength deviation. Also, it is desirable that the incident position deviation correction element 223 has the configuration symmetrical in the y direction to the optical axis.

Next, the action of the incident position deviation correction element 223 will be described with reference to FIG. 40. Here, the case of making three parallel light beams R1 to 3 be incident on the incident position deviation correction element 223 is considered. An xz cross section at the center part in the y axis direction is indicated by Sc, the xz cross section at the end in the y axial direction is indicated by Se, and the plane-normal at the incident position of the light beam R2 on the respective cross sections is indicated by nc and ne, respectively.

Figure 40:
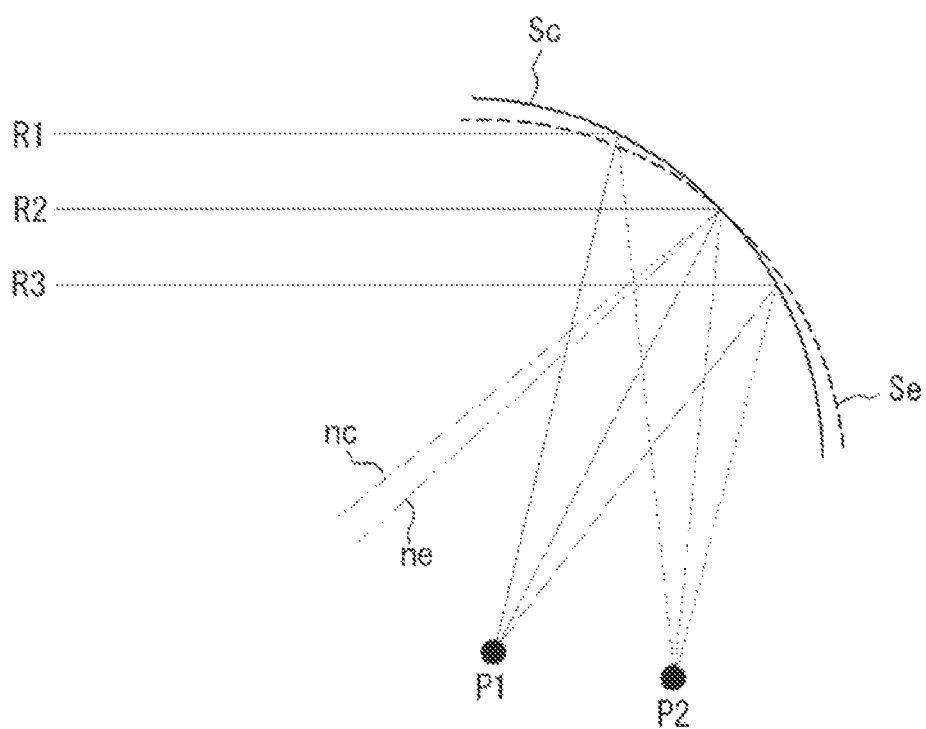
FIG. 40 is a diagram for describing an operation of the incident position deviation correction element in the wavelength selection switch of the thirteenth embodiment.

In FIG. 40, the light beams R1 to R3 made incident on the cross section Sc are converged to a point P1 correspondingly to the focal distance of the incident position deviation correction element 223. Also, the light beams R1 to R3 made incident on the cross section Se are converged to a point P2 on the xz plane different from the point P1 correspondingly to the focal distance of the incident position deviation correction element 223. When the light beam is traced back, the light beams emitted from the points P1 and P2 respectively act on the cross sections Sc and Se and are emitted in a direction parallel to the light beam R1. Here, as illustrated in FIG. 28A, the dispersion part 215 is provided at a distance of f4 to the lens 216. Thus, the points P1 and P2 are equivalent to a position where the dispersion part 215 is provided.

Also, the input light from the respective input/output ports which is reflected in the cross sections Sc and Se, is dispersed to angles different for the respective wavelengths at different positions P1 and P2 of the dispersion part 215, and is emitted toward the cross sections Sc and Se again. That is, the light of the respective wavelengths made incident again on the incident position deviation correction element 223 after dispersion in the dispersion part 215 is to be emitted from the incident position deviation correction element 223 roughly in parallel with the input light from the respective input/output ports within the xz plane. Therefore, the incident position deviation correction element 223 can offer the correction effect of the port dependency of the center wavelength deviation on the deflection element surface of the respective deflection elements 218 by controlling the incident/emission angles for the dispersion part 215.

Figure 41A:
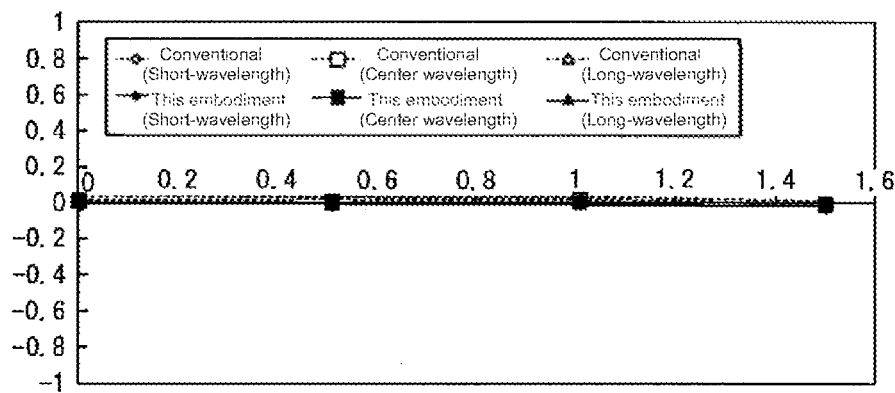
FIG. 41A is a diagram illustrating a simulation result of an incident angle within the xz plane of an input light on a deflection element surface to the height of input/output ports in the wavelength selection switch of the thirteenth embodiment.
Figure 41B:
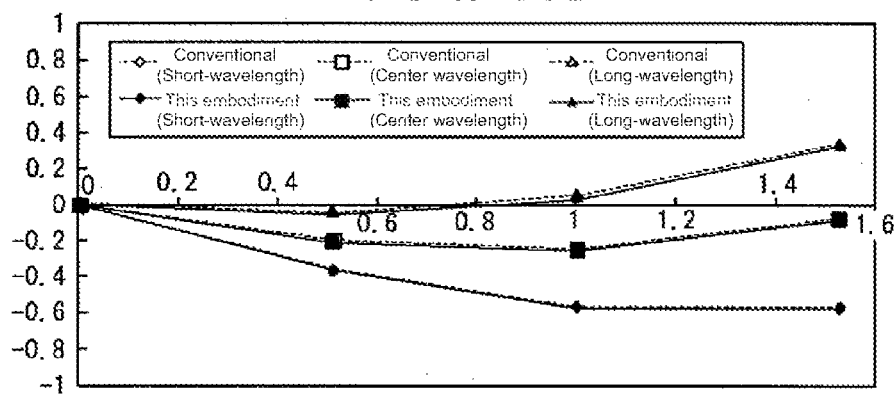
FIG. 41B is a diagram illustrating a simulation result of the incident position deviation in the y-axis direction of the input light on the deflection element surface to the height of the input/output ports in the wavelength selection switch of the thirteenth embodiment.
Figure 41C:
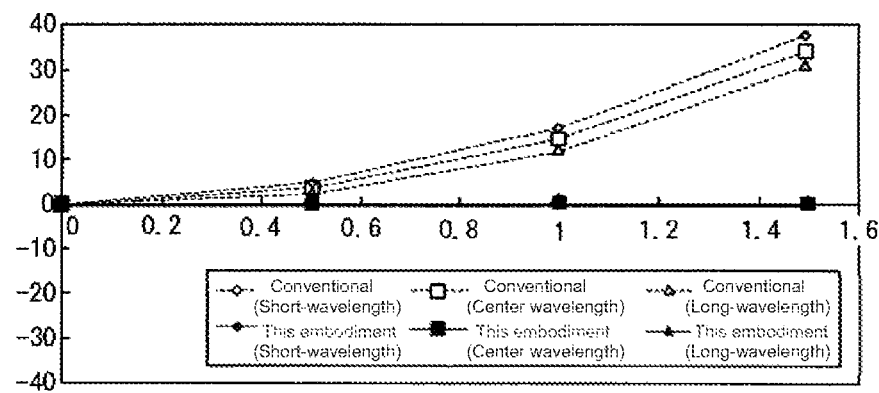
FIG. 41C is a diagram illustrating a simulation result of the incident position deviation (center wavelength deviation) in the x-axis direction of the input light on the deflection element surface to the height of the input/output ports in the wavelength selection switch of the thirteenth embodiment.

FIG. 41A to FIG. 41C are diagrams illustrating respective simulation results of the incident angle within the xz plane (FIG. 41A), the incident position deviation in the y axis direction (FIG. 41B), and the incident position deviation in the x axis direction (FIG. 41C) of the input light on the deflection element surface Sm to the height (horizontal axis) of the input/output ports. Also, in FIG. 41A to FIG. 41C, the solid line indicates the simulation results in the case of using the incident position deviation correction element 223 illustrated in FIG. 38B, and the broken line indicates the simulation results in the case of disposing the same optical system except that the incident position deviation correction element 223 is not used. Also, in FIG. 41A and FIG. 41B, for the vertical axis, allowable values of the design are respectively standardized as 1 and relatively expressed and an absolute value is not indicated. As clarified from FIG. 41A to FIG. 41C, by the incident position deviation correction element 223, only the incident position deviation (center wavelength deviation) indicated in FIG. 41C can be effectively corrected without affecting the other characteristics indicated in FIG. 41A and FIG. 41B.

As described above, the wavelength selection switch according to this embodiment includes the incident position deviation correction element 223 which corrects the input light inputted from the input/output ports 210a to 210c and 210e so as not to generate the center wavelength deviation on the deflection element surface Sm of the respective deflection elements 218 no matter from which input/output ports 210a to 210c and 210e the input light is inputted, and collects the input light. Thus, similarly to the case of the above-described embodiments, the light of each wavelength dispersed by the dispersion part 215 can be highly accurately collected on the deflection element surface Sm of the deflection element 218 independent of the position of the input/output ports 210a to 210c and 210e to which the input light is inputted. Therefore, similarly to the case of the above-described embodiments, the degradation of the transmission band caused by the center wavelength deviation, the degradation of the coupling efficiency due to the destruction of the optical conjugate relationship of the input/output ports, and the crosstalk to the other input/output ports of the light not to be coupled can be suppressed, and the communication quality can be improved.

Since the function of the incident position deviation correction element is added to the light collecting mirror 300, the configuration is not accompanied by increase in the number of components. Also, in the light collecting mirror 300, since the input light inputted from the input/output ports 210a to 210c and 210e is made incident roughly in parallel within the yz plane, the separation degree of the input light can be increased. Thus, since the incidence of a part of the input light on a reflection surface part corresponding to the other input/output ports can be suppressed with high accuracy, unintended crosstalk can be suppressed. Also, since the light collecting mirror 300 forms images on a surface of the deflection element 218, adjustment while viewing a final performance is easy, and efficient assembly is made possible.

Fourteenth Embodiment

Figure 42A:
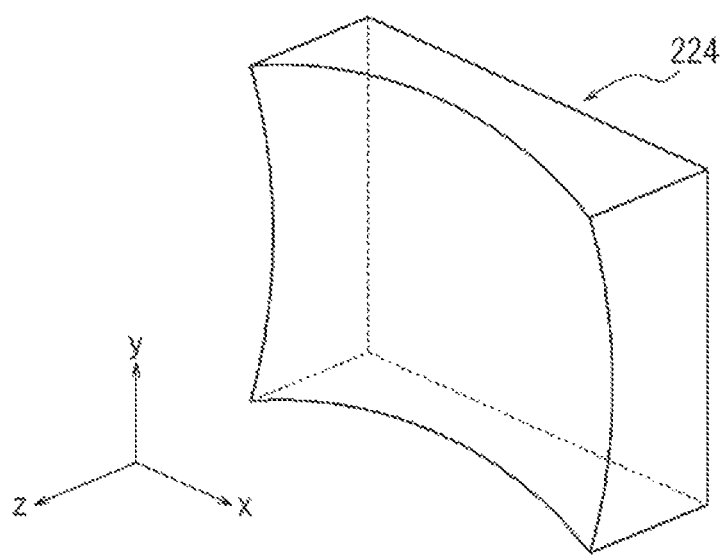
FIG. 42A is a perspective view illustrating one example of an incident position deviation correction element of a wavelength selection switch according to a fourteenth embodiment.

FIG. 42A is a perspective view illustrating one example of an incident position deviation correction element of a wavelength selection switch according to the fourteenth embodiment. For an incident position deviation correction element 224, the reflection surface of the incident position deviation correction element 223 in the thirteenth embodiment is formed into one continuous reflection surface.

Figure 42B:
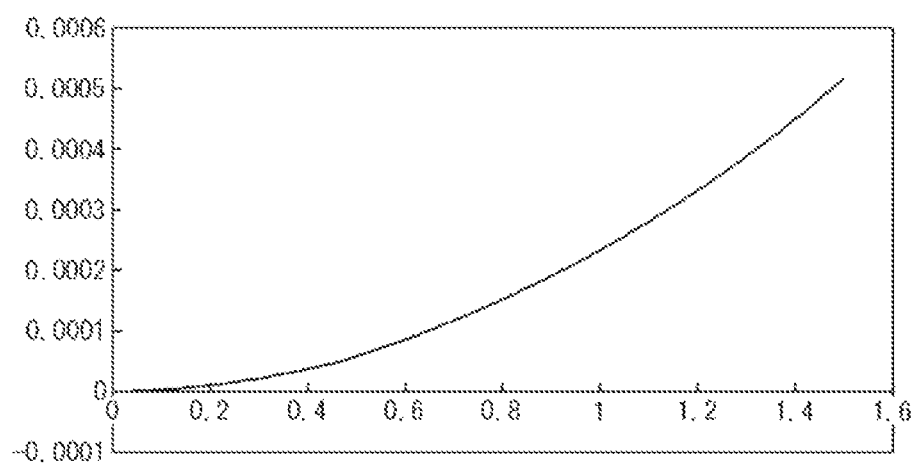
FIG. 42B is a diagram illustrating a relative value of a plane-normal angle of the incident position deviation correction element in FIG. 42A.

FIG. 42B is a diagram illustrating a relative value (vertical axis) of a plane-normal angle θ to the height (horizontal axis) of the input/output ports of the incident position deviation correction element 224 in FIG. 42A. As it is clear from FIG. 42B, for the reflection surface of the incident position deviation correction element 224, the plane-normal angle θ within the xz plane is continuously different according to the value of y. Thus, similarly to the case of the thirteenth embodiment, by controlling the incident/emission angles to the dispersion part 215, the correction effect of the port dependency of the center wavelength deviation on the deflection element surface of the respective deflection elements 218 can be obtained.

Figure 43A:
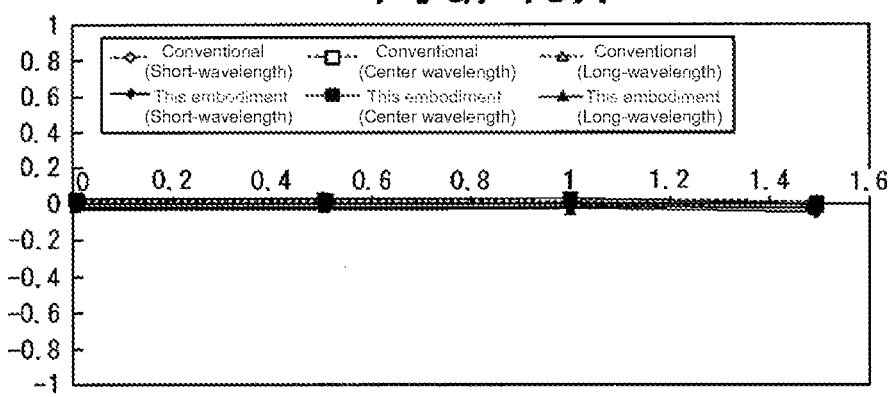
FIG. 43A is a diagram illustrating a simulation result of an incident angle within the xz plane of an input light on a deflection element surface to the height of input/output ports in the wavelength selection switch of the fourteenth embodiment.
Figure 43B:
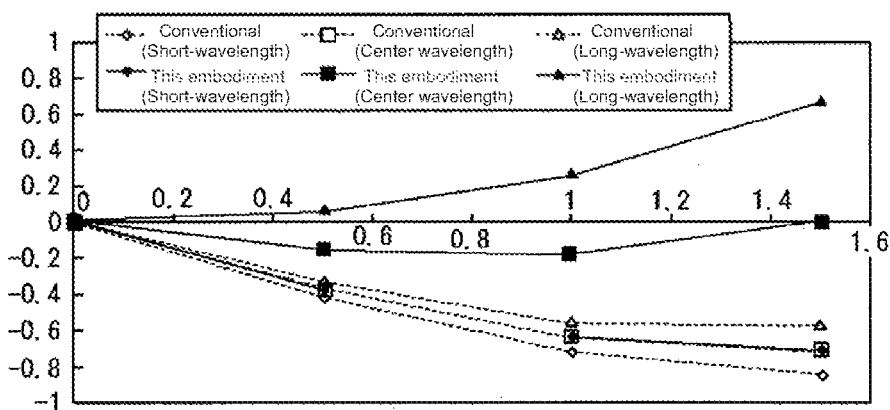
FIG. 43B is a diagram illustrating a simulation result of the incident position deviation in the y-axis direction of the input light on the deflection element surface to the height of the input/output ports in the wavelength selection switch of the fourteenth embodiment.
Figure 43C:
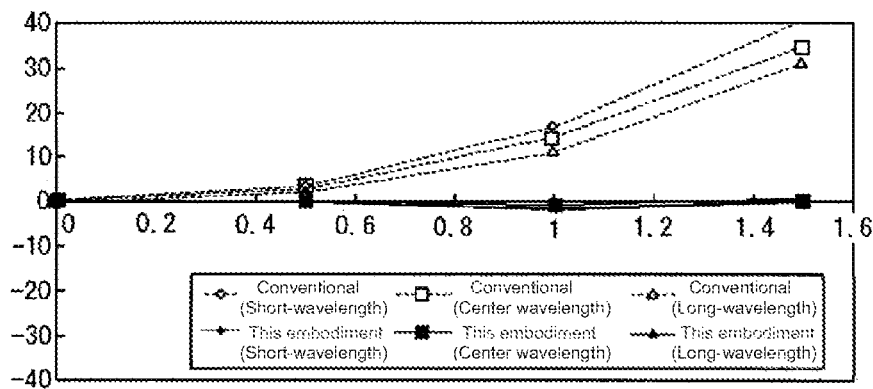
FIG. 43C is a diagram illustrating a simulation result of the incident position deviation (center wavelength deviation) in the x-axis direction of the input light on the deflection element surface to the height of the input/output ports in the wavelength selection switch of the fourteenth embodiment.
Figure 44:
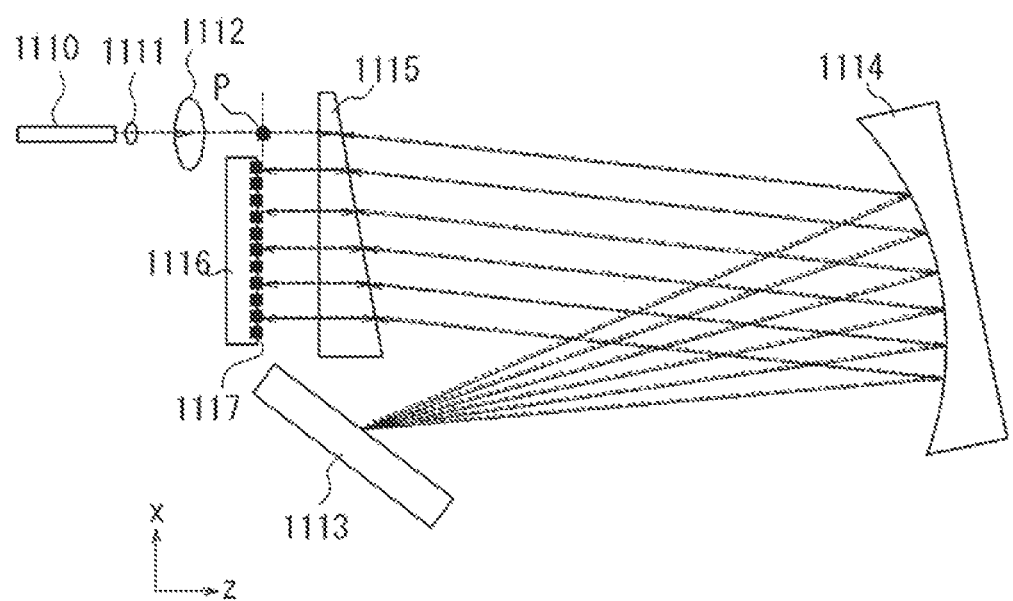
FIG. 44 is a top view illustrating a configuration of a wavelength selection switch according to a conventional example.
Figure 45:
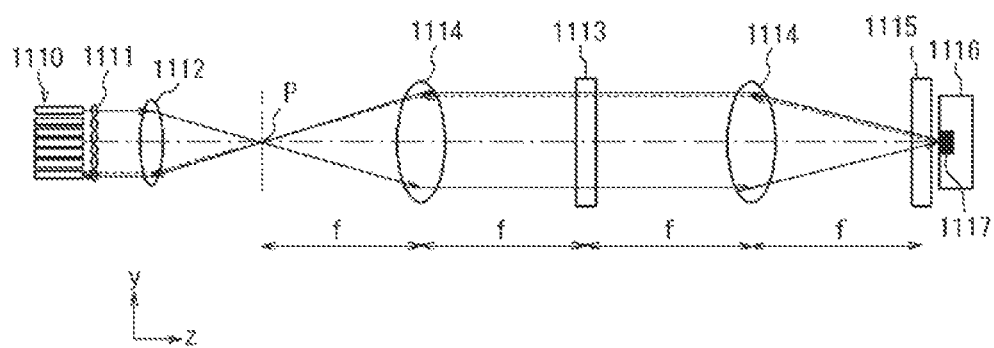
FIG. 45 is a side view developing and illustrating the wavelength selection switch in FIG. 44 along an optical path.
Figure 46:
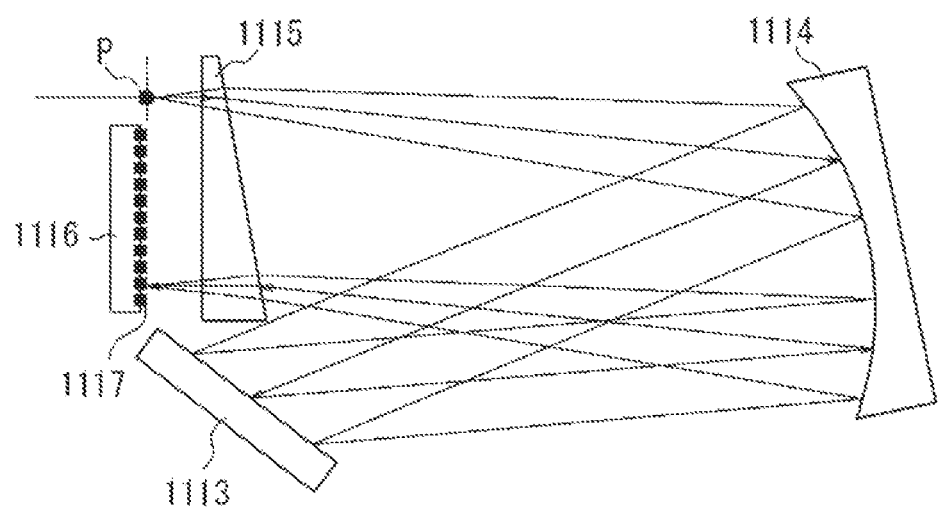
FIG. 46 is a diagram illustrating spread of a luminous flux passing through the wavelength selection switch in FIG. 44, and arrangement of a deflection element and a deflection prism.
Figure 47:
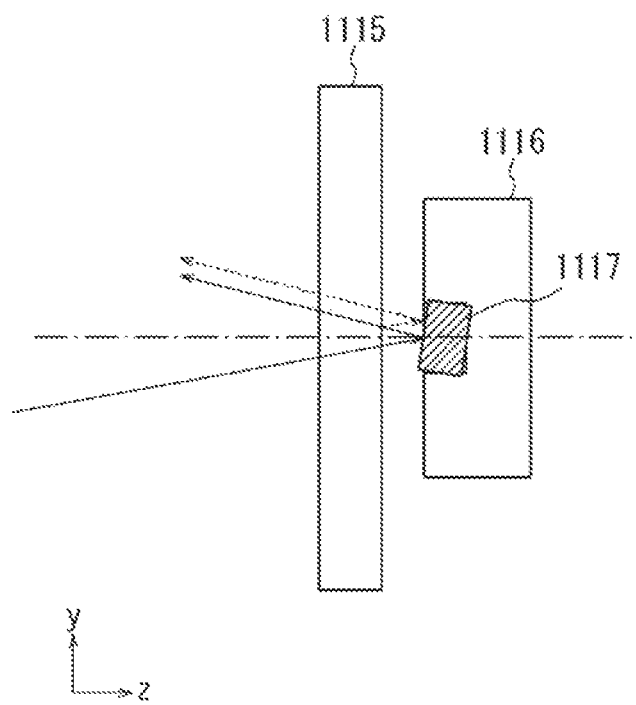
FIG. 47 is a diagram describing multiple reflection between the deflection element and the deflection prism.

FIG. 43A to FIG. 43C are diagrams illustrating respective simulation results of the incident angle within the xz plane (FIG. 43A), the incident position deviation in the y axis direction (FIG. 43B), and the incident position deviation in the x axis direction (FIG. 43C) of the input light on the deflection element surface Sm to the height (horizontal axis) of the input/output ports. Also, in FIG. 43A to FIG. 43C, the solid line indicates the simulation results in the case of using the incident position deviation correction element 224 illustrated in FIG. 42A, and the broken line indicates the simulation results in the case of disposing the same optical system except that the incident position deviation correction element 224 is not used. Also, in FIG. 43A and FIG. 43B, for the vertical axis, allowable values of the design are respectively standardized as 1 and relatively expressed and an absolute value is not indicated.

As clarified from FIG. 43A to FIG. 43C, the correction effect of the incident position deviation (center wavelength deviation) by the incident position deviation correction element 224 illustrated in FIG. 43C is extremely greater than influence exerted to the other characteristics indicated in FIG. 43A and FIG. 43B. Also, in this embodiment, since the incident position deviation correction element 224 comprises a continuous surface, as illustrated in FIG. 43B, the incident position deviation in the y axis direction is slightly generated but the influence thereof is not so great. Therefore, the port dependency of the incident position deviation (center wavelength deviation) can be effectively corrected without affecting the other performances in this embodiment as well.

As described above, the wavelength selection switch according to this embodiment includes the incident position deviation correction element 224 which corrects the input light inputted from the input/output ports 210a to 210c and 210e so as not to generate the center wavelength deviation on the deflection element surface Sm of the respective deflection elements 218 no matter from which input/output ports 210a to 210c and 210e the input light is inputted, and collects the input light. Thus, similarly to the case of the above-described embodiments, the light of each wavelength dispersed by the dispersion part 215 can be highly accurately collected on the deflection element surface Sm of the deflection element 218 independent of the position of the input/output ports 210a to 210c and 210e to which the input light is inputted. Therefore, similarly to the case of the above-described embodiments, the degradation of the transmission band caused by the center wavelength deviation, the degradation of the coupling efficiency due to the destruction of the optical conjugate relationship of the input/output ports, and the crosstalk to the other input/output ports of the light not to be coupled can be suppressed, and the communication quality can be improved.

Since the function of the incident position deviation correction element is added to the light collecting mirror 300, the configuration is not accompanied by increase in the number of components. Also, since the incident position deviation correction element 224 comprises the continuous surface, compared to the case of having a discrete surface configuration, unintended crosstalk can be suppressed. Furthermore, since the light collecting mirror 300 forms images on a surface of the deflection element 218, adjustment while viewing a final performance is easy, and efficient assembly is made possible.

Also, the present invention is not limited only to the above-described embodiments and many modifications and changes are possible.

For instance, in the first to sixth embodiments, although the vertical direction orthogonal to the optical axis direction (z direction) of the input light outputted from the input/output ports is defined as the first direction (y direction) and the horizontal direction is defined as the second direction (x direction), the first direction (y direction) is not limited to the vertical direction, and the second direction (x direction) is not limited to the horizontal direction. The first direction (y direction) and the second direction (x direction) may be two directions that are orthogonal to the advancing direction of the input light and are orthogonal to each other. That is, the configuration that the end faces of the input/output ports are arrayed in the horizontal direction and the dispersion is performed in the vertical direction is also possible.

Also, although the microlens array 11 is disposed in order to collimate the light made incident from the input/output ports 10a to 10f, the configuration without the microlens array 11 is also possible. Furthermore, although the light collecting lens 12 is used as the optical element for collecting the light to the primary light collecting point, the light collecting mirror and cylindrical lens or the like can be combined and used instead.

In the seventh to ninth embodiments, although the vertical direction orthogonal to the optical axis direction (z direction) of the input light outputted from the input/output ports 110a to 110e is defined as the first direction (y direction) and the horizontal direction is defined as the second direction (x direction), the first direction (y direction) is not limited to the vertical direction, and the second direction (x direction) is not limited to the horizontal direction. The first direction (y direction) and the second direction (x direction) may be two directions that are orthogonal to the advancing direction of the input light and are orthogonal to each other. That is, the configuration that the incident/emission surfaces of the input/output ports are arrayed in the horizontal direction and the dispersion is performed in the vertical direction is also possible.

Also, although the microlens array 111 is disposed in order to collimate the light made incident from the input/output ports 110a to 110f, the configuration without the microlens array 111 is also possible. Furthermore, although the light collecting lens 112 is used as the optical element for collecting the light to the primary light collecting point, the light collecting mirror and cylindrical lens or the like can be combined and used instead.

Furthermore, in the seventh to fourteenth embodiments, although a single member functions as the incident position deviation correction element, a plurality of members may be made to function as the incident position deviation correction element. In this case, by selecting the respective members so as to cancel with each other variations of correction ability as the incident position deviation correction element which is caused by manufacturing variations of the respective members, the yield of the members can be practically improved.

EXPLANATIONS OF LETTERS OR NUMERALS

1 Wavelength selection switch
2 Dispersion element
3 Light collecting element
4 Light collecting surface
10 Input/output part
10a to 10f Input/output port
11 Microlens array
12 Light collecting lens
13, 23, 33, 43 Dispersion element
13a, 23a, 33a, 43a Dispersion part
13b, 23b, 33b, 43b Non-dispersion part
14 Light collecting mirror
15 Deflector
16 Deflection element
52 to 59 Dispersion element
61 Transmission surface
62 Reflection surface
63 Dispersion surface
64 Reflection/transmission member
65 Diffraction member
66 Reflection member
73 Dispersion element
74 Mirror
101 Wavelength selection switch
102 Dispersion element
103 Light collecting element
104 Light collecting surface
110 Input/output part
110a to 110e Input/output port
111 Microlens array
112, 122 Light collecting lens
113, 133 Dispersion element
114, 124 Light collecting mirror
115 Deflector
116 Deflection element
134 Mirror
110 Input/output port
111 Microlens array
112 Light collecting lens
113 Dispersion element
114 Light collecting element (light collecting mirror)
115 Deflection prism
116 Deflector
120 Light collecting surface
210 Input/output part
210a to 210e Input/output port
211 Microlens array
212, 213 Cylindrical lens
214, 216 Lens
215 Dispersion part
217 Deflector
218, 218a to 218e Deflection element
220, 221, 222, 223, 224 Incident position deviation correction element
225 Beam shaping optical system
300 Light collecting mirror
310 Light collecting lens
400 Diffraction grating
410 Reflection mirror
1110 Input/output port
1111 Microlens array
1112 Primary light collecting lens
1113 Dispersion element
1114 Light collecting element (light collecting mirror)
1115 Deflection prism
1116 Deflector
1120 Light collecting surface
D Dispersion point
Q1 Primary light collecting point
Q11 Light collecting point

The invention claimed is:

1. A wavelength selection switch comprising:
an input/output part including a plurality of input/output ports for inputting and outputting wavelength-multiplexed signal light;
a reflection-type first light collecting element disposed on an optical path of the signal light from the input/output part;
a dispersion element including a dispersion part for dispersing the signal light into a plurality of light beams having different wavelengths and a non-dispersion part without a dispersion action; and a plurality of deflection elements arrayed in a dispersion direction of the signal light by the dispersion element, wherein the first light collecting element makes the signal light from the input/output part be incident on the dispersion part of the dispersion element, and collects the plurality of light beams dispersed by the dispersion part to the deflection elements through the non-dispersion part of the dispersion element, respectively, and the deflection elements deflect at least one of the plurality of light beams collected to the deflection elements so as to be emitted from a prescribed input/output port of the plurality of input/output ports.

2. The wavelength selection switch according to claim 1, wherein the at least one of the plurality of light beams collected to the deflection elements is emitted to the prescribed input/output port successively through the non-dispersion part of the dispersion element, the first light collecting element, the dispersion part of the dispersion element and the first light collecting element.

3. The wavelength selection switch according to claim 1, comprising
a second light collecting element for collecting the signal light from the input/output part to a position separated from the first light collecting element by a focal distance of the first light collecting element, between the input/output part and the first light collecting element.

4. The wavelength selection switch according to claim 1, wherein the deflection elements, the first light collecting element, and the dispersion element are disposed such that a distance between the deflection elements and the first light collecting element is longer than a distance between the dispersion element and the first light collecting element, for an advancing direction of the signal light.

5. The wavelength selection switch according to claim 1, wherein the dispersion element and the first light collecting element are disposed so as to be separated by a focal distance of the first light collecting element.

6. The wavelength selection switch according to claim 1, wherein the non-dispersion part of the dispersion element is configured by a transmission member which transmits the signal light.

7. The wavelength selection switch according to claim 6, wherein, for the dispersion element, an incident surface on a side of the first light collecting element of the transmission member of the non-dispersion part and a dispersion surface of the dispersion part are formed on a same plane.

8. The wavelength selection switch according to claim 1, wherein the non-dispersion part of the dispersion element is configured by a reflection member which reflects the signal light.

9. The wavelength selection switch according to claim 8, wherein, for the dispersion element, a reflection surface of the non-dispersion part and a dispersion surface of the dispersion part are formed on a same plane.

10. The wavelength selection switch according to claim 1, wherein the dispersion element includes a first surface and a second surface which are not on a same plane, the first surface having a reflection surface, the second surface having a dispersion surface, the dispersion part disperses the signal light from the input/output part into the plurality of light beams by the dispersion surface provided on the second surface, and the non-dispersion part reflects the plurality of light beams collected by the first light collecting element on the reflection surface provided on the first surface and collects the plurality of light beams to the deflection elements.

11. The wavelength selection switch according to claim 10, wherein the first surface further includes a transmission surface, and the dispersion part transmits the signal light from the input/output part through the transmission surface provided on the first surface and disperses the signal light into the plurality of light beams on the dispersion surface provided on the second surface.

12. A wavelength selection switch comprising:
an input/output part including a plurality of input/output ports for inputting and outputting wavelength-multiplexed signal light, in which incident/emission surfaces are arrayed in a first direction;
a reflection-type first light collecting element disposed on an optical path of the signal light from the input/output part;
a dispersion element for dispersing the signal light reflected by the first light collecting element into a plurality of light beams having different wavelengths; and
a plurality of deflection elements arrayed in a dispersion direction of the signal light by the dispersion element, on a side different from the side where the first light collecting element is disposed with respect to the dispersion element,
wherein
the first light collecting element reflects the plurality of light beams dispersed by the dispersion element and collects the plurality of light beams to the deflection element, respectively,
the deflection elements deflect at least one of the plurality of light beams collected to the deflection elements so as to be emitted from a prescribed input/output port of the plurality of input/output ports, and
when a virtual plane which includes a light collecting point on the deflection elements where the plurality of light beams are collected respectively and is orthogonal to the first direction is defined as a first plane, the dispersion element is disposed only in one of two spaces separated by the first plane.

13. The wavelength selection switch according to claim 12, comprising a second light collecting element for collecting the signal light from the input/output part to a primary light collecting point between the input/output part and the first light collecting element,
wherein the input/output ports are disposed in a space different from the one of the two spaces separated by the first plane.

14. The wavelength selection switch according to claim 12, comprising a second light collecting element for collecting the signal light from the input/output part to a primary light collecting point between the input/output part and the first light collecting element,
wherein a reflection position in the first light collecting element of the plurality of light beams dispersed by the dispersion element and the input/output ports are positioned in mutually different spaces separated by the first plane.

15. The wavelength selection switch according to claim 12, wherein the dispersion element and the first light collecting element are disposed so as to be separated by a focal distance of the first light collecting element.

16. The wavelength selection switch according to claim 12,
wherein the deflection elements, the first light collecting element, and the dispersion element are disposed such that a distance between the deflection elements and the first light collecting element is longer than a distance between the dispersion element and the first light collecting element, for an advancing direction of the signal light.

17. The wavelength selection switch according to claim 13,
wherein the primary light collecting point is formed between the first light collecting element and the dispersion element.

18. A wavelength selection switch comprising:
at least one input port;
a dispersion part for dispersing wavelength-multiplexed input light inputted from the input port into light of each wavelength;
a light collecting element for collecting the light of each wavelength dispersed by the dispersion part;
a deflection part where a plurality of deflection elements for respectively deflecting the light of each wavelength collected by the light collecting element are arrayed;
at least one output port for outputting the light of each wavelength deflected in the deflection part as output light; and
an incident position deviation correction element disposed in an optical path of the input light inputted from the input port, for correcting a deviation of an incident position in an array direction of the deflection elements of the light of each wavelength with respect to the deflection elements which is caused on the basis of arrangement of the input port.

19. The wavelength selection switch according to claim 18, comprising a parallel luminous flux forming element for guiding the input light inputted from the input port to the dispersion part as a parallel luminous flux.

20. The wavelength selection switch according to claim 19,
wherein the light collecting element and the parallel luminous flux forming element are the same member.

21. The wavelength selection switch according to claim 19, comprising a beam shaping optical system for shaping the input light inputted from the input port so as to turn a spot of the light of each wavelength collected on the deflection elements into an elliptic shape,
wherein the parallel luminous flux forming element guides the input light shaped by the beam shaping optical system to the dispersion part as the parallel luminous flux.

22. The wavelength selection switch according to claim 21,
wherein the incident position deviation correction element is disposed inside the beam shaping optical system.

23. The wavelength selection switch according to claim 18,
wherein
the dispersion part includes a dispersion element for dispersing the input light into light of each wavelength, and a reflection element for reflecting the light of each wavelength dispersed by the dispersion element and making the light of each wavelength be incident on the dispersion element again, and
the incident position deviation correction element is formed integrally with the reflection element.

24. The wavelength selection switch according to claim 18,
wherein
the dispersion part includes a diffraction grating for dispersing the input light into the light of each wavelength, and
the incident position deviation correction element is formed integrally with the diffraction grating.

25. The wavelength selection switch according to claim 24,
wherein the diffraction grating has a plurality of areas of different grating pitches, which function as the incident position deviation correction element, in an arrangement direction of the input port and the output port.

26. The wavelength selection switch according to claim 18,
wherein the incident position deviation correction element is formed integrally with the light collecting element.

27. The wavelength selection switch according to claim 26,
wherein the incident position deviation correction element is configured by a continuous surface.

* * * * *